United States Patent
Wee et al.

(10) Patent No.: US 11,595,287 B2
(45) Date of Patent: Feb. 28, 2023

(54) COMMUNICATION METHOD FOR WIRELESS TERMINAL DEVICE, COMMUNICATION METHOD FOR WIRELESS BASE STATION DEVICE, WIRELESS TERMINAL DEVICE, AND WIRELESS BASE STATION DEVICE

(71) Applicant: Panasonic Intellectual Property Corporation of America, Torrance, CA (US)

(72) Inventors: Yao Huang Gaius Wee, Singapore (SG); Hiroyuki Motozuka, Kanagawa (JP); Masataka Irie, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 76 days.

(21) Appl. No.: 16/436,968

(22) Filed: Jun. 11, 2019

(65) Prior Publication Data

US 2019/0296996 A1    Sep. 26, 2019

Related U.S. Application Data

(63) Continuation of application No. PCT/JP2017/045416, filed on Dec. 19, 2017.
(Continued)

(30) Foreign Application Priority Data

Dec. 12, 2017 (JP) ............................. JP2017-237894

(51) Int. Cl.
*H04B 7/06* (2006.01)
*H04L 43/12* (2022.01)
(Continued)

(52) U.S. Cl.
CPC ............... *H04L 43/12* (2013.01); *H04B 7/06* (2013.01); *H04B 7/0617* (2013.01);
(Continued)

(58) Field of Classification Search
CPC ...... H04L 43/12; H04W 16/28; H04W 74/08; H04W 24/08; H04W 48/14; H04W 48/16;
(Continued)

(56) References Cited

U.S. PATENT DOCUMENTS 8,504,110 B2    8/2013 Chandra et al.
9,887,755 B2 *  2/2018 Kim ..................... H04B 7/0617
(Continued)

FOREIGN PATENT DOCUMENTS

CN    102783201 A    11/2012
EP    2106037 B1    11/2016
(Continued)

OTHER PUBLICATIONS

International Search Report of PCT application No. PCT/JP2017/045416 dated Feb. 20, 2018.
(Continued)

*Primary Examiner* — Gregory B Sefcheck
*Assistant Examiner* — Joshua Smith
(74) *Attorney, Agent, or Firm* — Seed IP Law Group LLP

(57) ABSTRACT

A method for use of a wireless terminal device includes transmitting a Probe request frame by using a quasi-omni antenna pattern in a first channel if beam-forming training with a wireless base station device is not completed, selecting the wireless base station device as a connection destination if a Probe response frame corresponding to the Probe request frame is received from the wireless base station device, and performing the beam-forming training with the wireless base station device in a second channel if a time (Continued)

period for receiving the Probe response frame from the wireless base station device has passed.

14 Claims, 45 Drawing Sheets

Related U.S. Application Data

(60) Provisional application No. 62/439,731, filed on Dec. 28, 2016.

(51) Int. Cl.
*H04W 24/08* (2009.01)
*H04W 16/28* (2009.01)
*H04W 74/08* (2009.01)

(52) U.S. Cl.
CPC ........... *H04W 16/28* (2013.01); *H04W 24/08* (2013.01); *H04W 74/08* (2013.01)

(58) Field of Classification Search
CPC ...... H04B 7/06; H04B 7/0617; H04B 7/0695; H04B 7/0421; H04B 7/0619; H04B 17/318
See application file for complete search history.

(56) References Cited

U.S. PATENT DOCUMENTS

| | | | |
|---|---|---|---|
| 10,742,285 B1* | 8/2020 | Chu | H04B 7/0617 |
| 2009/0097395 A1* | 4/2009 | Zhang | H04B 7/0626 370/203 |
| 2010/0103045 A1* | 4/2010 | Liu | H04L 43/0847 342/372 |
| 2010/0215027 A1* | 8/2010 | Liu | H04B 7/0408 370/338 |
| 2010/0265922 A1 | 10/2010 | Bracha | |
| 2011/0205969 A1 | 8/2011 | Ahmad et al. | |
| 2011/0255487 A1* | 10/2011 | Jain | H04B 7/0695 370/329 |
| 2012/0287797 A1* | 11/2012 | Basson | H04W 16/28 370/252 |
| 2013/0225165 A1* | 8/2013 | Das | H04W 48/16 455/434 |
| 2016/0020843 A1* | 1/2016 | Li | H04L 65/80 375/267 |
| 2016/0044711 A1* | 2/2016 | Lou | H04W 72/1284 370/338 |
| 2016/0061933 A1* | 3/2016 | Chung | G01S 11/08 455/456.1 |
| 2016/0174206 A1 | 6/2016 | Xia et al. | |
| 2016/0190686 A1 | 6/2016 | Gao et al. | |
| 2016/0255660 A1* | 9/2016 | Son | H04B 7/0619 370/329 |
| 2016/0267781 A1* | 9/2016 | Papay | G08C 17/02 |
| 2016/0269157 A1* | 9/2016 | Soriaga | H04B 7/0452 |
| 2016/0269159 A1* | 9/2016 | Soriaga | H04B 7/0617 |
| 2016/0285583 A1* | 9/2016 | Kasher | H04B 7/0695 |
| 2016/0380685 A1* | 12/2016 | Kash | H04B 7/0617 370/329 |
| 2017/0064583 A1* | 3/2017 | Roy | H04W 36/0009 |
| 2017/0317726 A1* | 11/2017 | Abdallah | H04B 7/0617 |
| 2018/0255571 A1 | 9/2018 | Irie et al. | |
| 2018/0310230 A1* | 10/2018 | Niu | H04W 48/12 |
| 2019/0007822 A1 | 1/2019 | Wee et al. | |

FOREIGN PATENT DOCUMENTS

| | | |
|---|---|---|
| JP | 2012-524457 A | 10/2012 |
| JP | 2013-520937 A | 6/2013 |
| JP | 2016-526856 A | 9/2016 |
| JP | 2017-163540 A | 9/2017 |
| WO | 2017/077686 A1 | 5/2017 |

OTHER PUBLICATIONS

IEEE Std 802.11ad(TM)-2012, IEEE Standard for Information Technology-, Telecommunications and information exchange between systems, Local and metropolitan area networks-, Specific requirements, Part 11: Wireless LAN Medium Access Control (MAC) and Physical Layer (PHY) Specifications, Amendment 3: Enhancements for Very High Throughput in the 60 GHz Band, Dec. 28, 2012 (pp. 278-314, pp. 337-339).

IEEE Std 802.11ad(TM)-2012, IEEE Standard for Information Technology-, Telecommunications and information exchange between systems, Local and metropolitan area networks-, Specific requirements, Part 11: Wireless LAN Medium Access Control (MAC) and Physical Layer (PHY) Specifications, Amendment 3: Enhancements for Very High Throughput in the 60 GHz Band, Dec. 28, 2012 (All Pages).

The Extended European Search Report dated Oct. 14, 2019 for the related European Patent Application No. 17888138.9.

Gaius Wee (Panasonic): "Fast BSS discovery; 11-16-1571-00-00ay-fast-bss-discovery", IEEE Draft 11-16-1571-00-OOAY-FAST-BSS-DISCOVERY, IEEE-SA Mentor, Piscataway, NJ USA, vol. 802. 11ay Dec. 22, 2016 (Dec. 22, 2016), pp. 1-22, XP068112300, Retrieved from the Internet: URL:https://mentor.ieee.org/802.11/dcn/16/11-16-1571-00-00ay-fast-bss-discovery.pptx [retrieved on Dec. 22, 2016].

Nitsche Thomas et al.: "IEEE 802.11ad: directional 60 GHz communication for multi-Gigabit-per-second Wi-Fi [Invited Paper]", IEEE Communications Magazine, IEEE Service Center, Piscataway, US, vol. 52, No. 12, Dec. 1, 2014 (Dec. 1, 2014), pp. 132-141, XP011567636, ISSN: 0163-6804, DOI: 10.1109/MCOM.2014. 6979964 [retrieved on Dec. 8, 2014].

Taiwanese Search Report dated Feb. 26, 2021 for the related Taiwanese Patent Application No. 106145762, 2 pages. (With English Translation).

English Translation of Colombian Office Action dated Jul. 12, 2021 for the related Colombian Patent Application No. NC2019/0006388, 12 pages.

Indian Examination Report dated Dec. 3, 2021 for the related Indian Patent Application No. 201947024480.

English Translation of Colombia Office Action dated Nov. 29, 2021 for the related Colombia Patent Application Mo NC2019/0006388, 22 pages.

English Translation of Chinese Search Report dated Oct. 26, 2021 for the related Chinese Patent Application No. 201780074651.7.

* cited by examiner

FIG. 22

| Quasi-omni Indicator element | Element ID | Length | Element ID Extension | TX EIRP | Quasi-omni RX Antenna Gain |
|---|---|---|---|---|---|
| Octets: | 1 | 1 | 0 or 1 | 1 | 1 |

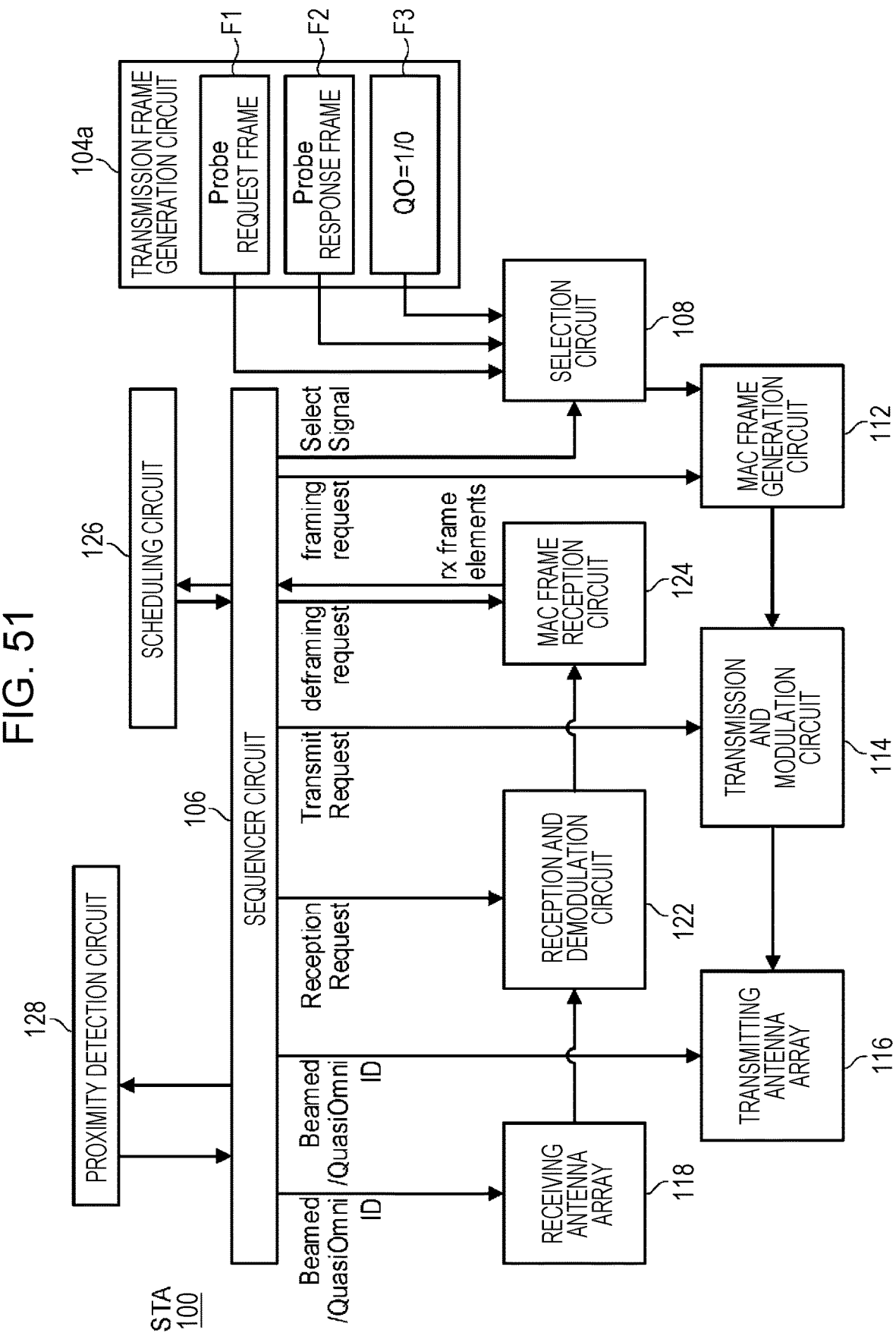

COMMUNICATION METHOD FOR WIRELESS TERMINAL DEVICE, COMMUNICATION METHOD FOR WIRELESS BASE STATION DEVICE, WIRELESS TERMINAL DEVICE, AND WIRELESS BASE STATION DEVICE

BACKGROUND

1. Technical Field

The present disclosure relates to a communication method for use of a wireless terminal device, a communication method for use of a wireless base station device, a wireless terminal device, and a wireless base station device.

2. Description of the Related Art

IEEE 802.11 is one of wireless LAN related standards. For example, IEEE 802.11 includes IEEE 802.11ad standard (hereinafter referred to as "11 ad standard") (refer to, for example, IEEE 802.11ad (registered trademark)—2012, pp. 278 to 314, and pp. 337 to 339).

The procedure by which a terminal (an STA) discovers another STA to make initial connection with the STA is called "discovery". To achieve high-speed connection required for applications using 60 GHz millimeter wave communication (communication in proximity) (e.g., an automatic ticket gate, data download at a data kiosk, and a backup wireless line which substitute and/or supplements a wired network in a data center), high-speed discovery of 100 ms or less has been studied.

SUMMARY

Existing STAs complete the beam-forming and, thereafter, complete the discovery. In this case, completion of the discovery is delayed by the amount of time required for beam-forming.

One non-limiting and exemplary embodiment provides a communication method for use of a wireless terminal device, a communication method for use of a wireless base station device, a wireless terminal device, and a wireless base station device improved so as to complete discovery at high speed.

In one general aspect, the techniques disclosed here feature a method for use of a wireless terminal device. The method includes transmitting a Probe request frame by using a quasi-omni antenna pattern in a first channel if beam-forming training with a wireless base station device is not completed, selecting the wireless base station device as a connection destination if a Probe response frame corresponding to the Probe request frame is received from the wireless base station device, and performing the beam-forming training with the wireless base station device in a second channel if a time period for receiving the Probe response frame from the wireless base station device has passed.

According to the communication method for use of a wireless terminal device, the communication method for use of a wireless base station device, the wireless terminal device, and the wireless base station device of one aspect of the present disclosure, the discovery can be completed at high speed.

It should be noted that these general or specific embodiments may be implemented as a system, an apparatus, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 22 is a diagram illustrating an example of a Quasi-omni Indicator element according to Modification 2-4;

FIG. 51 is a diagram illustrating an example of the configuration of an STA according to the fifth embodiment.

DETAILED DESCRIPTION

Embodiments of the present disclosure are described in detail below with reference to the accompanying drawings as appropriate. However, in some cases, too detailed description is avoided. For example, a detailed description of well-known matters and redundant description on substantially the same configuration may be removed. This is to avoid the unnecessary redundancy of the following description and to facilitate understanding by those skilled in the art.

It is to be noted that the accompanying drawings and the following description are provided to enable those skilled in the art to fully understand the present disclosure, and are not intended to be used to limit the claimed subject matter.

Active Scan

Figure 1:
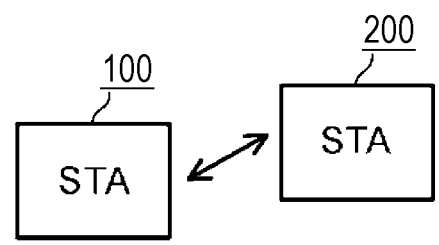
FIG. 1 is a diagram illustrating an example of the overall configuration relating to an active scan.

FIG. 1 is a diagram illustrating an example of an overall configuration relating to an active scan.

One type of discovery performed by an STA 100 to discover another STA (e.g., an STA 200) is an "active scan". The STA 100 performs an active scan and discovers the STA 200 (Peer STA, a connection destination STA). For example, the STA 200 is an AP (Access Point), a PCP (PBSS Control Point), or an STA other than an AP and a PCP.

Figure 2:
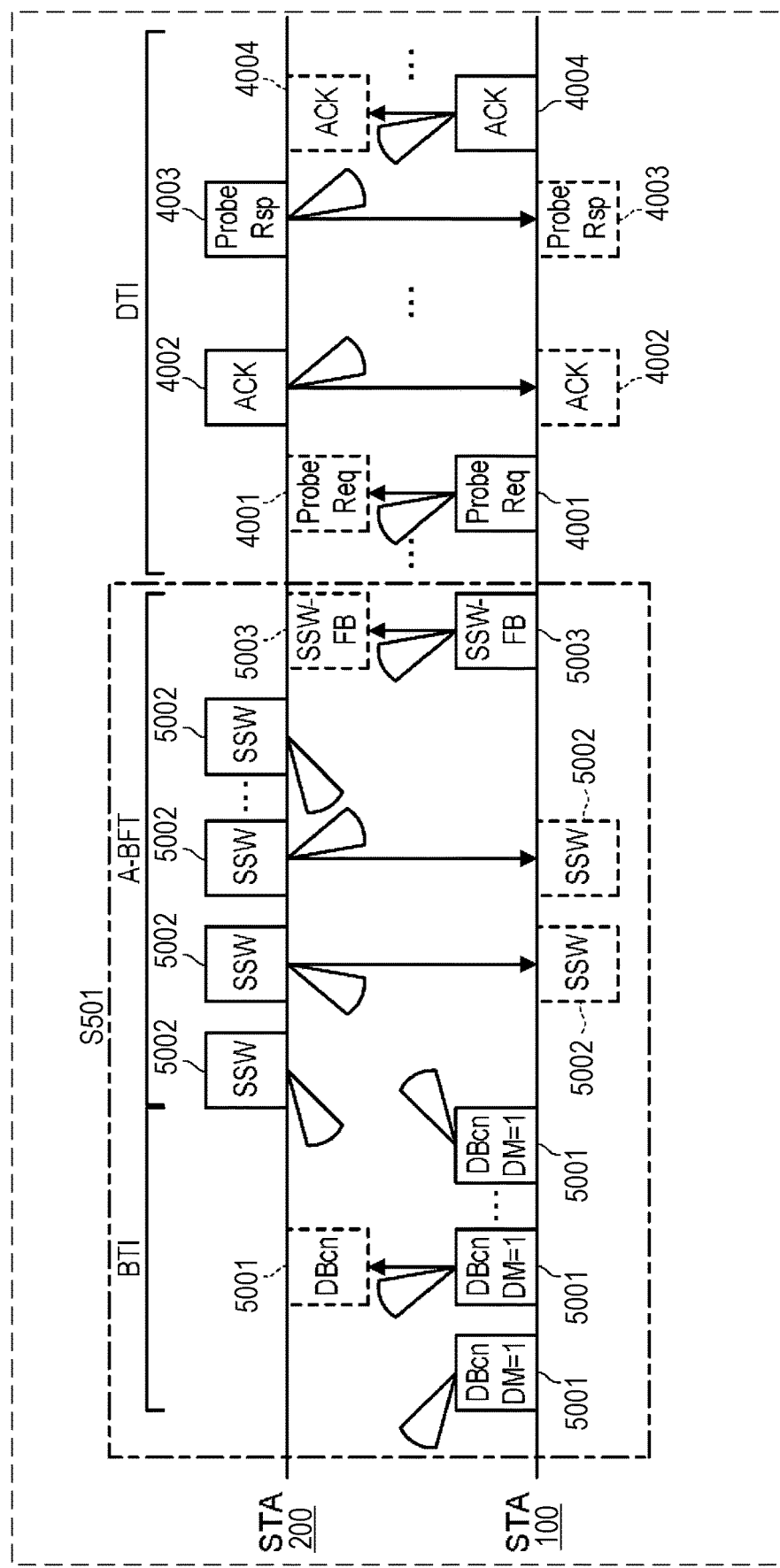
FIG. 2 is a diagram illustrating an example of the procedure for an active scan performed by an STA.

FIG. 2 is a diagram illustrating an example of the procedure for an active scan performed by the STA 100.

In the 60 GHz band used for 60-GHz millimeter wave communication, propagation loss is large. For this reason, communication using an Omni antenna or a Quasi-Omni antenna is sometimes difficult. In some cases, communication is enabled by performing beam-forming training in BTI and A-BFT described below, determining the best sector of a transmitting antenna array, and performing directional transmission.

As illustrated in FIG. 2, the BI (Beacon Interval) includes BTI (Beacon Transmission Interval), A-BFT (Association-BeamForming training) interval, and DTI (Data Transfer Interval).

In the BTI, the STA 100 and the STA 200 receive or transmit a transmission sector sweep using a DMG Beacon (DBcn) frame 5001.

For example, the STA 100 transmits a plurality of DMG Beacon frames 5001 while switching transmission sectors (transmission beams). The STA 200 receives each of the DMG Beacon frames 5001 and measures the reception strength and/or the reception quality.

In the A-BFT interval, the STA 100 and the STA 200 transmit or receive a transmission sector sweep using a sector sweep (SSW) frame 5002. In addition, the STA 100 and the STA 200 receive or transmit the SSW feedback (SSW-FB) frame 5003.

For example, the STA 200 switches the transmission sector (the transmission beam) for each of the SSW frames 5002 and transmits the SSW frame 5002. The STA 100 receives the SSW frame 5002, measures the reception strength and/or the reception quality, and transmits an SSW-FB frame 5003 including the result of measurement to the STA 200. The STA 200 receives the SSW-FB frame and completes the BFT.

As BFT, the STA 100 that performs an active scan determines the best sector of the transmitting antenna array (the beam suitable for transmission) during the BTI and the A-BFT interval. As used herein, the term "beam" refers to antenna directivity. When completing the BFT, the STA 100 transmits a Probe request frame 4001 in a Probe exchange process. Upon receiving the Probe request frame 4001, the STA 200 transmits an ACK frame 4002 and transmits a Probe response frame 4003.

After the STA 100 receives the ACK frame 4002 from the STA 200 and receives the Probe response frame 4003, the STA 100 transmits an ACK frame 4004. At this time, the discovery for the STA 200 is completed.

If BFT is not performed, the STA 100 performs Omni-directional communication. However, since the propagation loss is large in the 60-GHz millimeter wave communication, it may be difficult to make an omni-directional transmission signal reach an AP/PCP 300.

The STA 100 acquires information regarding the connection destination terminal (for example, the STA 200) and a BSS (Basic Service Set) through a Probe exchange process for exchanging a Probe request frame and a Probe response frame. The STA 100 determines the connection destination on the basis of the acquired information. For example, the STA 100 determines whether to connect to the STA 200 or another terminal.

At this time, according to the 11ad standard, the A-BFT interval is shared with other STAs that have received the DMG Beacon frame 5001.

Figure 3:
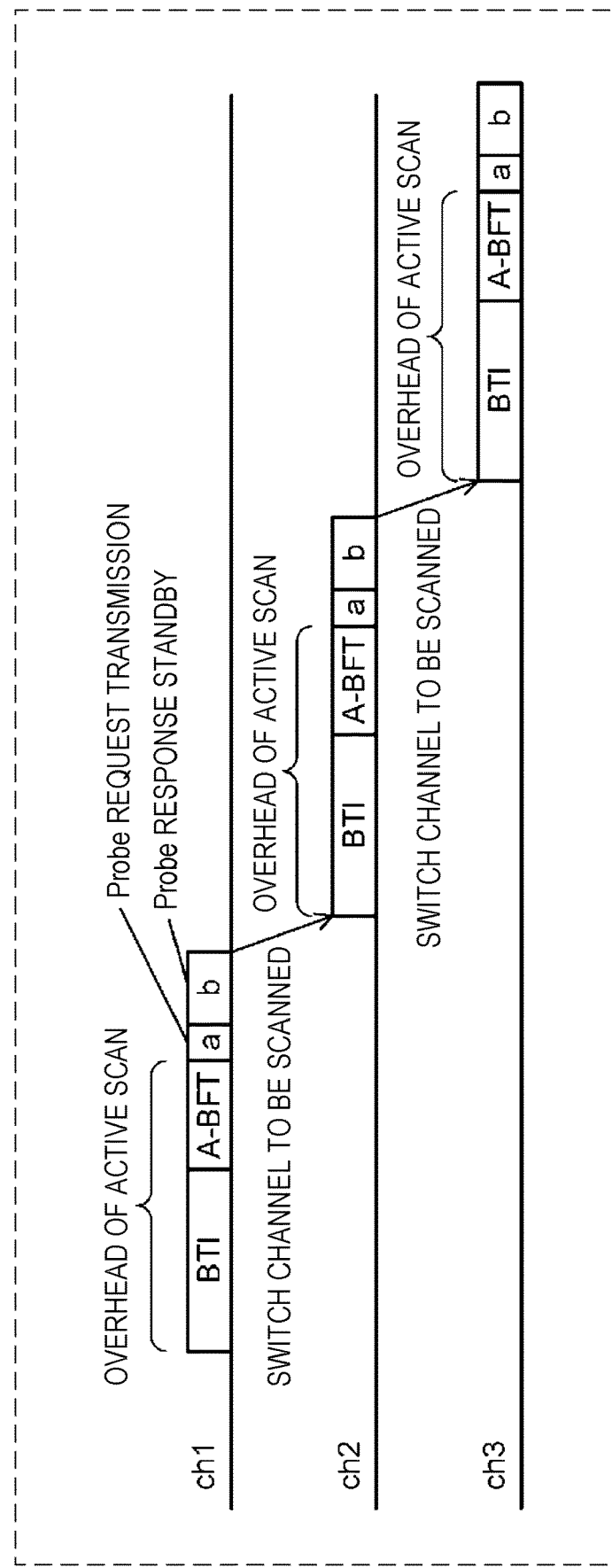
FIG. 3 is a diagram illustrating an example of the procedure by which an STA performs an active scan on a plurality of channels.

FIG. 3 is a diagram illustrating an example of the procedure by which the STA 100 performs an active scan on a plurality of channels.

In one example, as illustrated in FIG. 3, the STA 100 may execute the above-described active scan procedure with a plurality of channels ch 1, ch 2, and ch 3 and may discover a BSS in a channel that differs from the channel of the discovered BSS (and the connection destination terminal).

At this time, the STA 100 performs transmission sector sweep in the BTI interval of the active scan in order to discover a faraway connection destination terminal which is hard to discover with omni-directionality and quasi-omni-directionality. However, when the STA 100 has a larger number of transmission sectors (for example, 128 sectors), the time required for the transmission sector sweep in the BTI interval increases and, thus, the time required for the discovery increases. Accordingly, the time required for the initial connection may increase. Similarly, when the connection destination terminal (for example, the STA 200) has a large number of transmission sectors (for example, 128 sectors), the time required for the transmission sector sweep in the A-BFT interval increases and, thus, the time required for the discovery increases. Accordingly, the time required for the initial connection may increase.

In addition, if the STA 100 and STA 200 fail to transmit and receive feedback for the transmission sector sweep, the STA 100 and STA 200 retry the transmission sector sweep. Accordingly, the time required for discovery may increase. Furthermore, the increase in the time required for discovery may give many interference signals to other STAs.

Still furthermore, since, as illustrated in FIG. 3, the above-described active scan procedure involves discovery using a plurality of channels ch 1, ch 2, and ch 3, the time required for discovery may further increase. The increase in the time required for discovery may give many interference signals to other STAs.

In order to solve the above-described problems, the present inventors have conceived the idea of the present disclosure.

First Embodiment—Scenario 1

Figure 4:
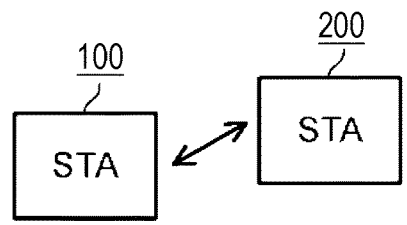
FIG. 4 is a diagram illustrating an example of an overall configuration relating to scenario 1 according to a first embodiment.

FIG. 4 is a diagram illustrating an example of an overall configuration relating to scenario 1 according to the first embodiment.

The STA 100 is an active scan STA. The STA 200 is a connection destination STA. The STA 200 is, for example, a PCP/AP STA. However, the STA 200 may be a non-PCP/AP STA, a non-PCP STA, or a non-AP. In addition, the STA 100 is, for example, a wireless terminal device. The STA 200 is, for example, a wireless base station device.

Figure 5:
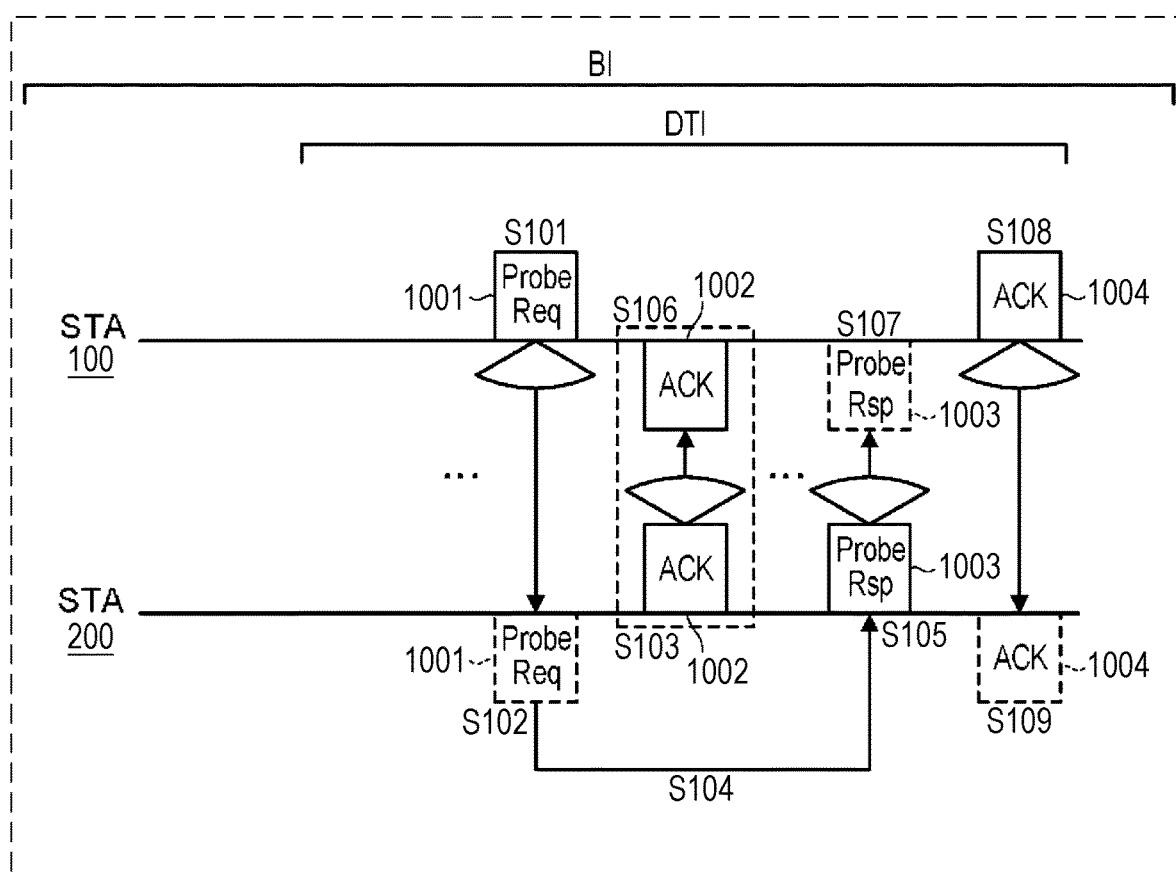
FIG. 5 is a diagram illustrating an example of the procedure by which an STA performs discovery of another STA according to the first embodiment.

FIG. 5 is a diagram illustrating an example of the procedure by which the STA 100 performs discovery of another STA 200 according to the first embodiment.

A scenario in which the STA 100 uses a broadcast address as a transmission destination address is described first.

In step S101, before performing the beam-forming training with the STA 200 indicated by the BTI and the A-BFT in FIG. 2, the STA 100 that performs an active scan sets up a transmitting antenna array 116 (refer to FIG. 7) so as to have a quasi-omni antenna pattern in a first Beacon Interval (BI). Subsequently, the STA 100 sets the RA (Receiver Address) field of the Probe request frame 1001 to a broadcast address and, thereafter, transmits the Probe request frame 1001.

In step S102, the connection destination STA 200 receives the Probe request frame 1001. If the RA field of the received Probe request frame 1001 indicates a broadcast address, the STA 200 does not perform ACK transmission. That is, steps S103 and S106 are skipped (step S104).

If a broadcast address is included in the RA field of the received Probe request frame 1001, the STA 200 sets up the transmitting antenna array 116 to have a quasi-omni antenna pattern in step S105 even when the beam-forming training with the STA 100 is not completed. Thereafter, the STA 200 transmits, to the STA 100, a Probe response frame 1003 including discovery information. The STA 200 may set the RA field of the Probe response frame 1003 to the address of the STA 100 or may set the RA field to the broadcast address.

If, in step S107, the STA 100 determines that the Probe response frame 1003 has been received, the STA 100 determines that the STA 200 is present at a distance (a proximity distance) at which communication can be made by using the quasi-omni antenna pattern. Thus, in step S108, the STA 100 sends an ACK frame 1004 to the STA 200. Subsequently, in step S109, the STA 200 receives the ACK frame 1004. In this manner, the STA 100 completes the discovery of the STA 200.

However, if, in step S107, the STA 100 determines that the Probe response frame 1003 has not been received from the STA 200, the STA 100 determines that any one of the connection destination STAs (the STA 200 and other STAs (not illustrated)) is not present at a proximity distance. If the STA 100 determines that a connection destination STA is not present at a proximity distance, the STA 100 may perform beam-forming training. The process is described in detail below with reference to FIG. 14.

Figure 6:
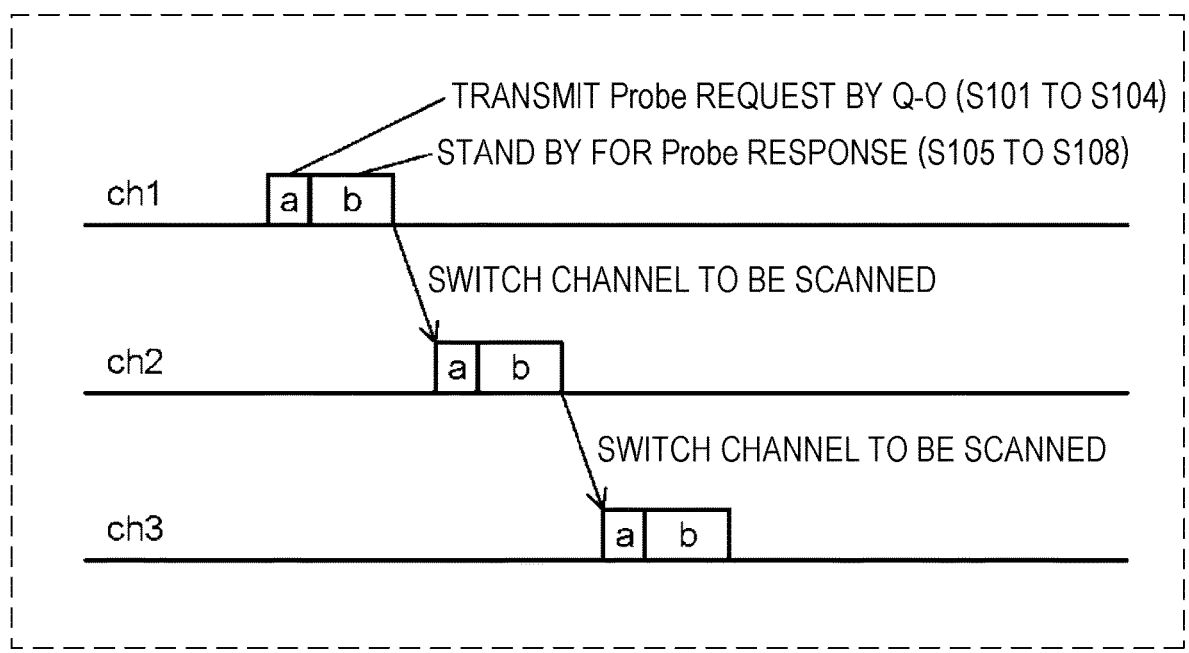
FIG. 6 is a diagram illustrating an example of how discovery is sequentially performed on a plurality of wireless channels according to the first embodiment.

FIG. 6 is a diagram illustrating an example of how discovery is sequentially performed on a plurality of wireless channels according to the first embodiment.

To discover the intended connection destination, the STA 100 may repeat steps S101 to S109 on a plurality of wireless channels. For example, as illustrated in FIG. 6, the STA 100 may sequentially perform discovery in accordance with the procedure illustrated in FIG. 5 on a plurality of wireless channels (for example, ch 1, ch 2, and ch 3). In this case, the STA 100 performs discovery in accordance with the procedure illustrated in FIG. 5 on ch 1. Upon receiving a Probe response frame 1003 (S106), the STA 100 may suspend the procedure at S107 and the subsequent steps and switch the wireless channel for a transmission and modulation circuit 114 to another wireless channel (for example, ch 2). Thereafter, the STA 100 may transmit a Probe request frame 1001 at S101 in accordance with the procedure illustrated in FIG. 5.

A scenario in which the STA 100 uses a unicast address as the address of a transmission destination is described below.

Referring again to FIG. 5, in step S101, the STA 100 that performs an active scan sets up the transmitting antenna array 116 so as to have a quasi-omni antenna pattern in the first beacon interval (BI) before performing the beam-forming training with the STA 200 indicated by BTI and A-BFT illustrated in FIG. 2. Subsequently, the STA 100 sets the RA (Receiver Address) field of the Probe request frame 1001 to the unicast address of the STA 200 and transmits the Probe request frame 1001.

Note that the STA 100 already knows the unicast address of the STA 200 in, for example, the following cases:

When the STA 100 receives a beacon frame from the STA 200.

When the STA 100 receives, from another STA, a Neighbor list including the unicast address of the STA 200.

When the STA 200 broadcasts the MAC address in the 60-GHz band (used by the 11ad standard) by another communication technique, such as Wi-Fi or NFC.

In step S102, the connection destination STA 200 receives the Probe request frame 1001.

When the unicast address of the STA 200 is included in the RA field of the received Probe request frame 1001, the STA 200 sets up the transmitting antenna array 116 so as to have a quasi-omni antenna pattern (step S103) even if the beam-forming training with the STA 100 is not completed. Thereafter, the STA 200 transmits an ACK frame 1002 to the STA 100. Subsequently, in step S105, the STA 200 sets up the transmitting antenna array 116 so as to have a quasi-omni antenna pattern and transmits, to the STA 100, a Probe response frame 1003 including discovery information.

In step S106, the STA 100 determines whether the ACK frame 1002 has been received from the STA 200. In step S107, the STA 100 determines whether a Probe response frame 1003 including discovery information has been received from the STA 200.

If the STA 100 determines that it has received the ACK frame 1002 and the Probe response frame 1003, the STA 100 determines that the STA 200 is present at a distance at which the STA 100 can communicate with the STA 200 by using the quasi-omni antenna pattern (a proximity distance). In step S108, the STA 100 transmits an ACK frame to the STA 200. Subsequently, in step S109, the STA 200 receives the ACK frame. In this way, the STA 100 completes discovery of the STA 200.

However, if the STA 100 determines that it has not received the ACK frame 1002 and the Probe response frame 1003, the STA 100 determines that the STA 200 is not present at a proximity distance. If the STA 100 determines that the STA 200 is not present at a proximity distance, the STA 100 may transmit a DMG Beacon frame and perform beam-forming training. The process is described in detail below with reference to FIG. 14.

However, if the STA 100 has received the ACK frame 1002 transmitted by the STA 200, the STA 100 may transmit a Probe response frame to the STA 200 (not illustrated).

As described above, the STA 100 sets the RA field of the Probe request frame 1001 to a unicast address (for example, the unicast address of the STA 200), sets up the transmitting antenna array 116 so as to have a quasi-omni antenna pattern, and transmits a Probe request frame 1001. Subsequently, the STA 100 determines whether it has received the ACK frame 1002 and the Probe response frame 1003. In this manner, the STA 100 can determine whether the connection destination STA set in the RA field (for example, STA 200) is present at a proximity distance.

Figure 7:
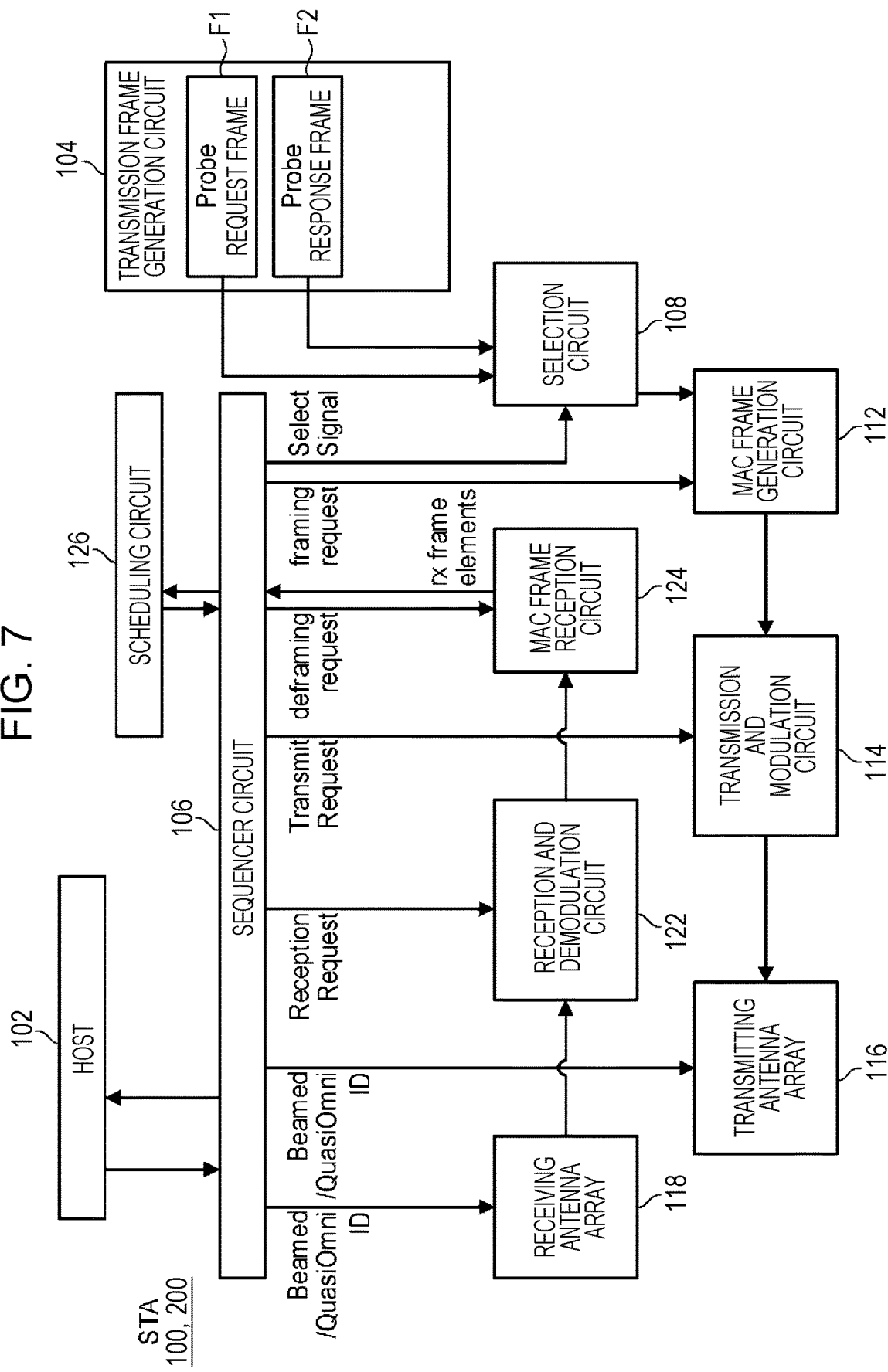
FIG. 7 is a diagram illustrating an example of the configuration of an STA according to the first embodiment.

FIG. 7 is a diagram illustrating an example of the configuration of the STAs 100 and 200 according to the first embodiment.

Each of the STAs 100 and 200 includes a host 102, a transmission frame generation circuit 104, a sequencer circuit 106, a selection circuit 108, a MAC frame generation circuit 112, the transmission and modulation circuit 114, the transmitting antenna array 116, a receiving antenna array 118, a reception and demodulation circuit 122, a MAC frame reception circuit 124, and a scheduling circuit 126.

The host 102 executes an application and requests the sequencer circuit to start discovery, to start initial connection, to start data communication, to input transmission data, and to acquire reception data. In one example, the host 102 includes a circuit or a CPU for executing an application and provides these functions by executing the application.

The transmission frame generation circuit 104 generates frame data F1 of the Probe request frame and frame data F2 of the Probe response frame and inputs the frame data F1 and F2 to the selection circuit 108.

The sequencer circuit 106 controls circuits included in the STA 100 to provide the MAC and PHY functions defined by the 11ad standard and the 11ay standard. In addition, the sequencer circuit 106 controls the circuits included in the STA 100 so as to perform the procedure according to the present disclosure illustrated in FIG. 5 and other figures.

For example, in FIG. 5, the sequencer circuit 106 determines whether to transmit the Probe request frame F1 by using the quasi-omni antenna pattern. To perform transmission by using the quasi-omni antenna pattern, the sequencer circuit 106 sets up the scheduling circuit 126 to determine the transmission timing and sets up the selection circuit 108 to select the data of the Probe request frame F1. Subsequently, the sequencer circuit 106 sets up the MAC frame generation circuit 112 to generate the MAC frame of the Probe request frame F1 and sets up parameters (for example, an MCS) used by the transmission and modulation circuit 114 to transmit a PHY packet including the Probe request frame F1 in accordance with the transmission timing determined by the scheduling circuit 126. In addition, the sequencer circuit 106 sets up the transmitting antenna array 116 to have a quasi-omni antenna pattern.

Furthermore, the sequencer circuit 106 performs processing on the received Probe request frame F1 and Probe response frame F2. For example, the sequencer circuit 106 of the STA 100 determines whether the address in the RA field of the received frame is the address of the STA 100 and determines whether an ACK is to be transmitted.

The selection circuit 108 selects frame data to be included in a MAC frame and transfers the frame data to the MAC frame generation circuit 112.

The MAC frame generation circuit 112 generates a MAC frame from the frame data on the basis of the MAC specification defined by the 11ad standard and the 11ay standard.

The transmission and modulation circuit 114 performs encoding and modulation on the basis of the PHY specification defined by the 11ad standard and the 11ay standard and generates a PHY packet signal.

The transmitting antenna array 116 transmits the PHY packet signal. The transmitting antenna array 116 may include an RF circuit. Under the control of the sequencer circuit 106, the transmitting antenna array 116 performs directivity control, for example, quasi-omnidirectionality setting or beam-forming transmission setting corresponding to a sector ID (related to the transmission beam direction) specified by the sequencer circuit 106.

The receiving antenna array 118 receives a wireless signal and generates a reception PHY packet signal. The receiving antenna array 118 may include an RF circuit. Under the control of the sequencer circuit 106, the receiving antenna array 118 performs directivity control, for example, quasi-omnidirectionality setting or beam-forming reception setting corresponding to a sector ID (related to the transmission beam direction) specified by the sequencer circuit 106.

The reception and demodulation circuit 122 demodulates and decodes the PHY packet signal on the basis of the PHY specification defined by the 11 ad standard and the 11ay standards and generates reception MAC frame data.

The MAC frame reception circuit 124 analyzes the reception MAC frame data on the basis of the MAC specifications defined by the 11ad standard and the 11ay standard, generates reception data, and inputs the reception data to the sequencer circuit 106.

The scheduling circuit 126 determines the timings of the transmission period and the reception period.

According to the first embodiment, the STA 100 skips the beam-forming training in the BTI and the A-BFT, regardless of the address set in the RA field. Thus, the STA 100 can receive the Probe response frame 1003 from the connection destination STA 200 that is present at a proximity distance. As a result, the time required for completion of the discovery can be reduced.

In addition, in the scenario in which the transmitting antenna array 116 is set up so as to have a quasi-omni antenna pattern, the RA field is set to the unicast address of the STA 200, and the Probe request frame is transmitted, the STA 100 determines whether it has received an ACK frame. In this manner, the STA 100 can determine whether the STA 200 is present at a proximity distance. As a result, the STA 100 can perform communication in proximity with the STA 200 and increase the data rate by selecting a high MCS (Modulation and Coding Scheme).

Note that if it is known that propagation loss in communication in proximity is small, a high MCS may be used from the beginning of communication. In this manner, the data rate of the communication in proximity can be increased more.

In addition, in communication in proximity, the transmission power may be reduced by performing transmission using a smaller number of antenna elements. Furthermore, the transmission power may be reduced by changing the setting of an amplifier (not illustrated). In this manner, interference with other STAs (not illustrated) can be reduced, and the risk of wiretapping can be reduced. Thus, safe communication can be carried out.

Modification 1-1

In one example, upon receiving the Probe request frame 1001 in step S102 illustrated in FIG. 5, the connection destination STA 200 may measure the reception quality, for example, RSSI (Received Signal Strength Indicator) and SINR (Signal to Interference and Noise Ratio).

Furthermore, in step S104, the STA 200 may determine whether the value indicating the measured reception quality exceeds a predetermined threshold value. If the value indicating the measured reception quality exceeds the threshold value, the STA 200 may transmit the Probe response frame 1003 in step S105. However, if the value indicating the measured reception quality is lower than the threshold value, the STA 200 may determine that the STA 100 is not suitable for communication based on the quasi-omni antenna pattern (communication in proximity) and stop transmitting the Probe response frame 1003.

Figure 8:
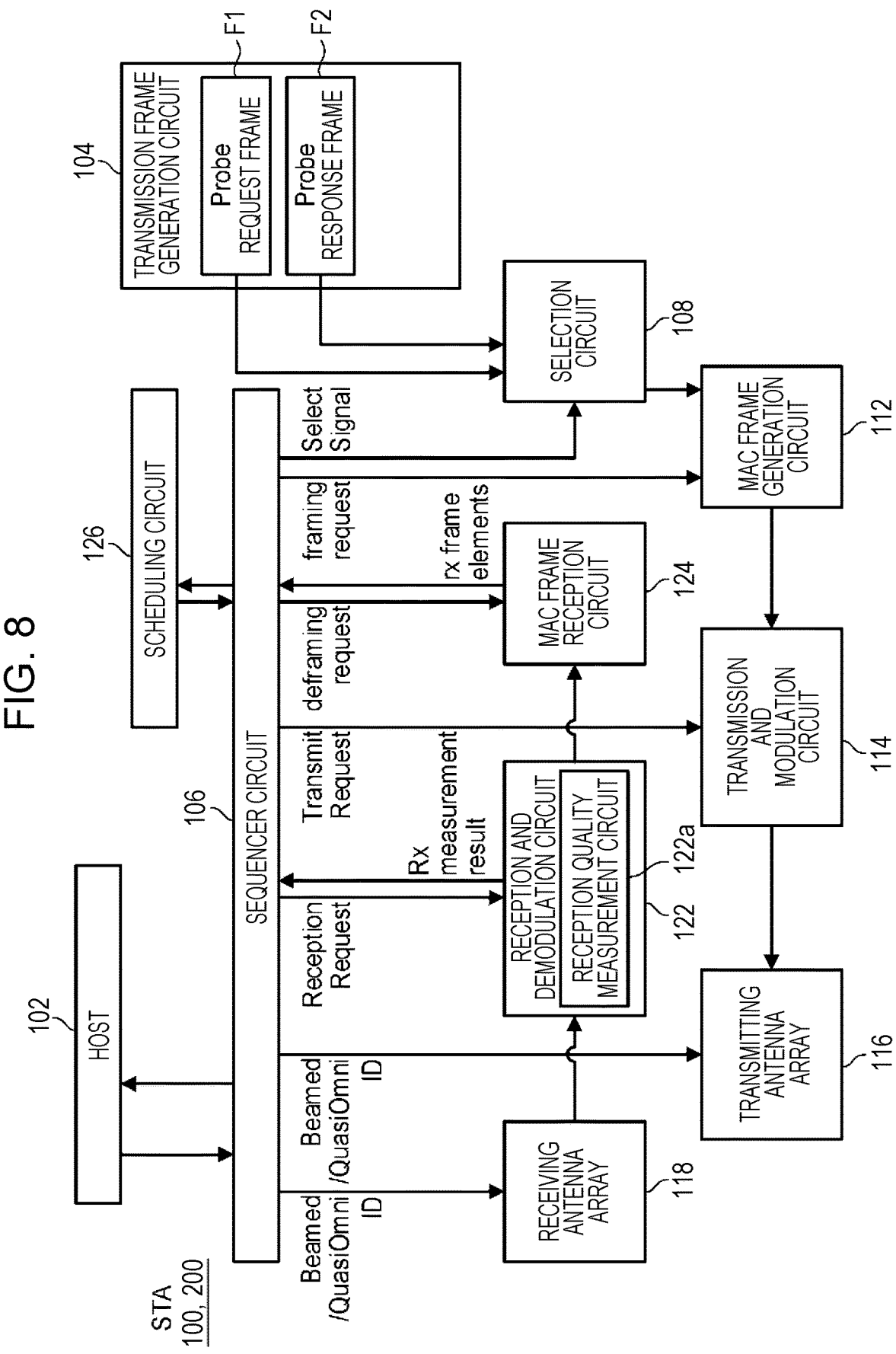
FIG. 8 is a diagram illustrating an example of the configuration of an STA according to Modification 1-1.

FIG. 8 is a diagram illustrating an example of the configuration of STAs 100 and 200 according to Modification 1-1.

As illustrated in FIG. 8, the reception and demodulation circuit 122 may include a reception quality measurement circuit 122a. The reception quality measurement circuit 122a may measure the reception quality of the Probe request frame 1001. The reception and demodulation circuit 122 outputs the reception quality measured by the reception quality measurement circuit 122a to the sequencer circuit 106 as reception quality information.

According to Modification 1-1, unnecessary transmission of the Probe response frame 1003 from the STA 200 can be prevented and, thus, power consumption and consumption of wireless resources can be reduced.

Modification 1-1-1

In one example, the STA 200 may set a value indicating the reception quality (RSSI or SINR) in the header of a PHY packet including the ACK frame 1002 and transmit the PHY packet in step S103 illustrated in FIG. 5. In addition, in step S105, the STA 200 may determine whether the Probe response frame 1003 is to be transmitted on the basis of the value indicating the reception quality.

Furthermore, in one example, the STA 200 may set the RA field of the Probe request frame 1001 to a broadcast address and transmit the Probe request frame 1001.

According to Modification 1-1-1, if a plurality of connection destination STAs are located at proximity distances, the connection destination STA having a reception quality that exceeds the threshold value responds, and the STA having a reception quality that does not exceed the threshold value does not respond. Consequently, unnecessary interference can be reduced.

Modification 1-2

Figure 9A:
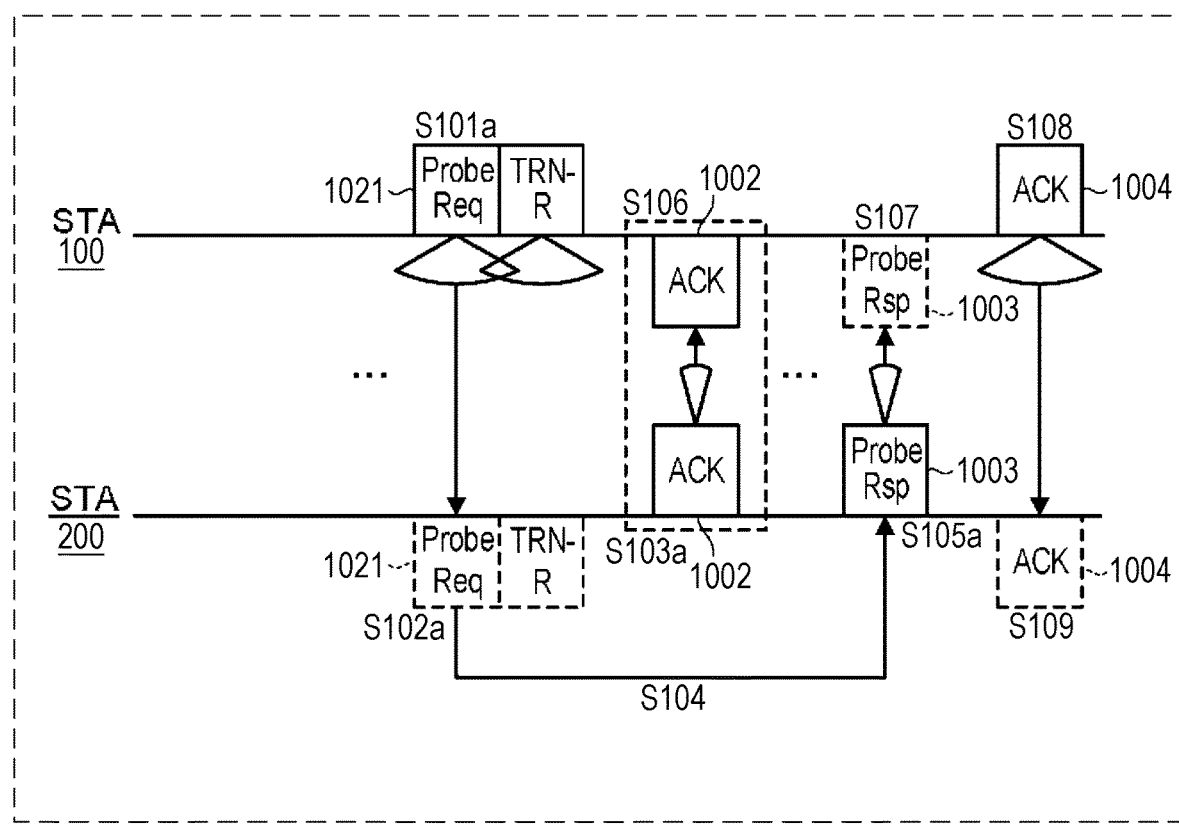
FIG. 9A is a diagram illustrating an example of the procedure by which an STA performs discovery of another STA according to Modification 1-2.

FIG. 9A is a diagram illustrating an example of the procedure by which the STA 100 performs discovery of another STA 200 according to Modification 1-2.

In step S101a, instead of transmitting the Probe request frame 1001, the STA 100 transmits a Probe request frame 1021 having a TRN-R field added thereto by using a quasi-omni antenna pattern.

Figure 9B:
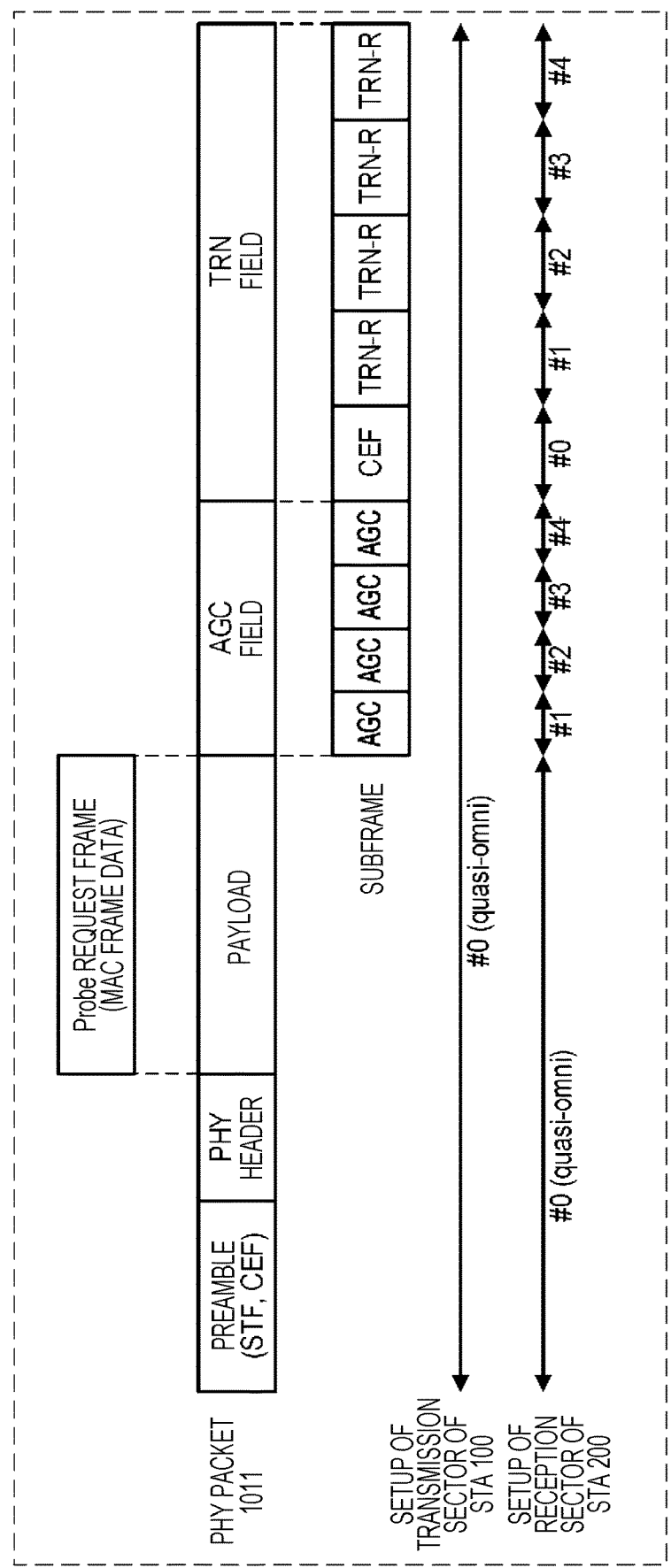
FIG. 9B is a diagram illustrating an example of the format of a PHY packet including a Probe request frame according to Modification 1-2.

FIG. 9B is a diagram illustrating an example of the format of a PHY packet 1011 including the Probe request frame 1021 according to Modification 1-2.

As illustrated in FIG. 9B, the preamble includes STF (Short Training Field) and CEF (Channel Estimation Field) defined by the 11ad standard. The PHY header is defined by the 11ad standard. The PHY header includes information about encoding and modulation of the payload and information about the types and lengths of the AGC field and the TRN field. The payload is a signal obtained by encoding and modulating MAC frame data (for example, the Probe request frame 1021).

The AGC (Automatic Gain Control) field is used to determine the reception gain to be set when receiving the TRN field (described below). The AGC (Automatic Gain Control) field includes one or more AGC subfields, which indicates a signal sequence of a known pattern.

The TRN (Training) field may include one or more TRN-R subfields. The TRN-R subfields indicates a signal sequence of a known pattern and is used for beam-forming training of the receiving antenna. The TRN field including the TRN-R subfield is referred to as a "TRN-R field". The TRN (Training) field includes a CEF field.

In step S102a illustrated in FIG. 9A, the STA 200 receives the Probe request frame 1021 having the TRN-R field added thereto. The STA 200 sets up the receiving antenna to have a quasi-omni antenna pattern and enters a stand-by mode. Thus, the STA 200 receives the preamble, the PHY header, and the payload of the Probe request frame 1021 composed of the PHY packet by using the quasi-omni antenna pattern. The STA 200 decodes the PHY header and acquires the information about the type of the TRN field (for example, the information indicating that the TRN field includes a TRN-R subfield) and information about the lengths of the AGC and TRN fields (for example, information indicating that the number of repetitions of each of the AGC subfield and TRN-R subfield is 4).

The STA 200 changes the receiving antenna sectors (a directional antenna pattern) for each of the AGC subfields and each of the TRN-R subfields and receives the AGC subfield and the TRN-R subfield. Thus, the STA 200 measures the reception quality for each of the receiving antenna sectors. In this manner, the STA 200 may perform beam-forming training and determine the best sector of the best receiving antenna array 118 of the receiving antenna array 118 of the STA 200 for communicating with the STA 100.

In addition, if the STA 200 includes the antenna pattern reciprocity, the STA 200 may determine the best sector of the transmitting antenna array 116 on the basis of the determined best sector of the receiving antenna array 118. As used herein, the term "communication device (STA) having the antenna pattern reciprocity" refers to an STA that controls the transmitting antenna array and the receiving antenna array such that, for example, the best sector ID of the transmitting antenna array 116 is the same as the best sector ID of the receiving antenna array 118. A communication device (an STA) having an antenna pattern reciprocity may include a transmitting and receiving antenna array that serves as both transmitting antenna array and receiving antenna array and may be configured so that the directional antenna pattern for transmission and the directional antenna pattern for reception are similar to each other.

An increase in the delay (the transmission time) caused by the STA 100 that adds the TRN-R field to the Probe request frame is smaller than in the case of performing the sector sweep in the BTI, the A-BFT, and/or the DTI. As a result, the STA 100 can reduce the time required for discovery.

In step S103a, the STA 200 may transmit the ACK frame 1002 by using the best sector of the transmitting antenna array 116 determined in reception of the Probe request frame 1021 having the TRN-R field added thereto. In this manner, more robust reception can be achieved.

In the procedure illustrated in FIG. 5, if the transmission power of the STA 200 using the quasi-omni antenna pattern is lower than the transmission power of the STA 100 using the quasi-omni antenna pattern, the STA 200 receives the Probe request frame 1001. However, the STA 100 does not receive the ACK frame 1002. In addition, if the reception sensitivity of the STA 100 using the quasi-omni antenna pattern is lower than the reception sensitivity of the STA 200 using the quasi-omni antenna pattern, the STA 200 receives the Probe request frame 1001. However, the STA 100 does not receive the ACK frame 1002. In these cases, it is difficult for the STA 100 to detect that the STA 200 is present at a proximity distance.

In contrast, in the procedure illustrated in FIG. 9A, the STA 200 transmits the ACK frame 1002 by using the best sector of the transmitting antenna array 116. Accordingly, the transmission power strength is higher than that in the case of using the quasi-omni antenna pattern. Therefore, even when the transmission power of the STA 200 using the quasi-omni antenna pattern is lower than the transmission power of the STA 100 using the quasi-omni antenna pattern and even when the reception sensitivity of the STA 100 using the quasi-omni antenna pattern is lower than the reception sensitivity of the STA 200 using the quasi-omni antenna pattern, the probability of the STA 100 receiving the ACK frame increases. As a result, the STA 100 can detect that the STA 200 is present at a proximity distance.

In step S105a, the STA 200 transmits the Probe response frame 1003 by using the best sector of the transmitting antenna array 116 determined in reception of the Probe request frame 1021 having the TRN-R field added thereto.

Steps S106 to S109 are similar to those described above with reference to FIG. 5 and, thus, descriptions of the steps are not repeated.

Figure 10:
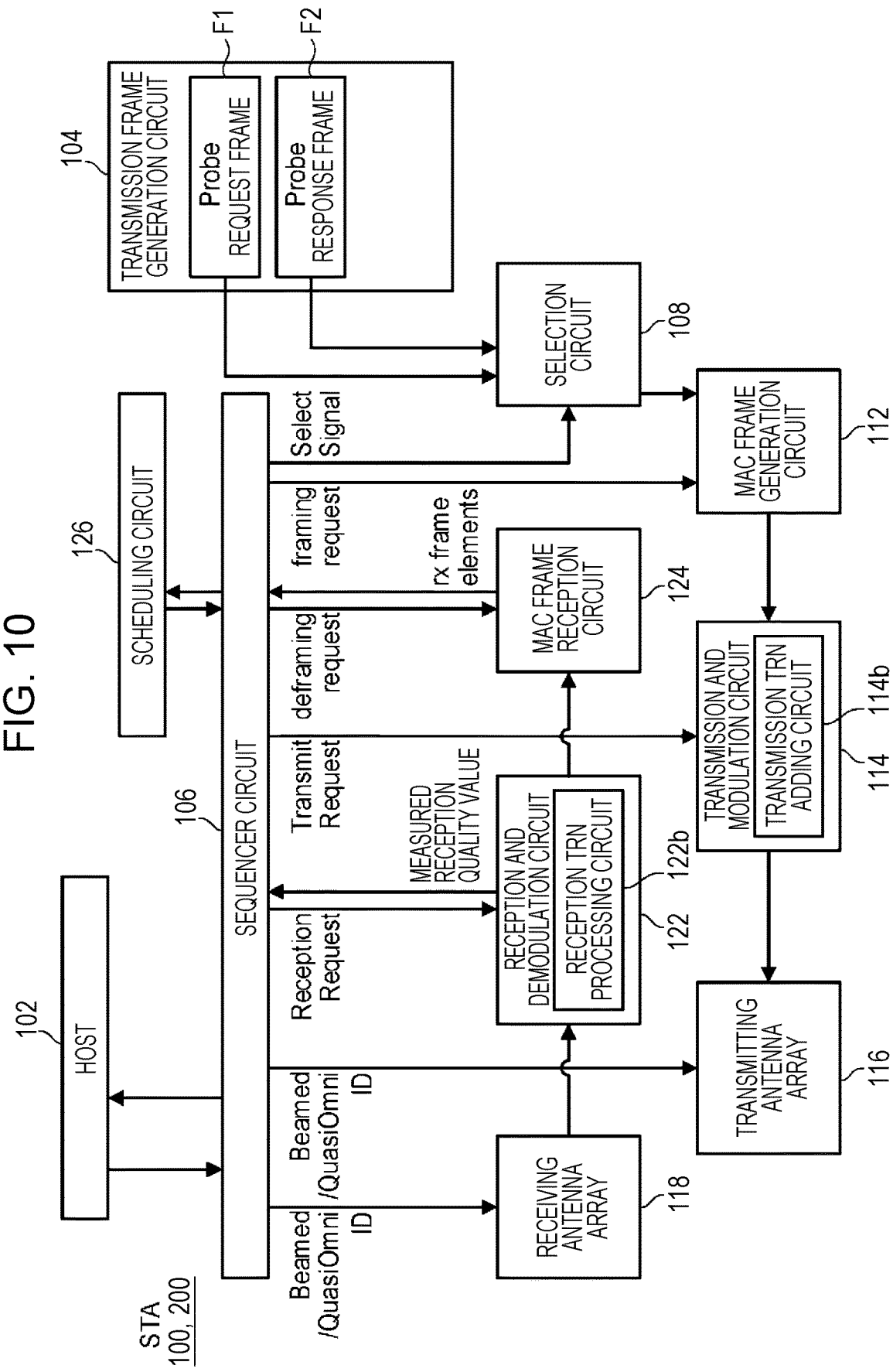
FIG. 10 is a diagram illustrating an example of the configuration of an STA according to Modification 1-2.

FIG. 10 is a diagram illustrating an example of the configuration of STAs 100 and 200 according to Modification 1-2.

In one example, the transmission and modulation circuit 114 includes a transmission TRN adding circuit 114b. The transmission TRN adding circuit 114b generates signals of the AGC field and the TRN field. The transmission and modulation circuit 114 encodes and modulates the MAC frame data (for example, Probe response frame) and adds the signals of the AGC field and the TRN field to the generated PHY frame. Thereafter, the transmission and modulation circuit 114 inputs the PHY frame to the transmitting antenna array 116. For example, the transmission and modulation circuit 114 of the STA 100 illustrated in FIG. 9A generates the Probe request frame 1021 having the signals of the AGC field and the TRN field added thereto.

In one example, the reception and demodulation circuit 122 includes a reception TRN processing circuit 122b. The reception TRN processing circuit 122b measures the reception quality (for example, RSSI and SNR) for each of the TRN-R subfields added to the reception PHY frame and notifies the sequencer circuit 106 of the reception quality. For example, the reception and demodulation circuit 122 of the STA 200 illustrated in FIG. 9A measures the reception quality for each of the TRN-R subfields added to the received Probe request frame 1021.

In one example, the sequencer circuit 106 determines the best sector of the receiving antenna array 118 on the basis of the reception quality measured by the reception TRN processing circuit 122b for each of the TRN-R fields. In addition, the sequencer circuit 106 may determine the best sector of the transmitting antenna array 116 on the basis of the reception quality for each of the receiving antenna sectors. For example, the sequencer circuit 106 of the STA 200 illustrated in FIG. 9A determines whether the Probe response frame 1003 is to be transmitted by using a quasi-omni antenna pattern or a best sector of the transmitting antenna array 116. Thereafter, the sequencer circuit 106 sets up the transmitting antenna array 116.

The transmitting antenna array 116 transmits the frame and the TRN-R subfield by using one of the quasi-omni antenna pattern and the best sector of the transmitting antenna array 116 in accordance with the configuration set up by the sequencer circuit 106.

According to Modification 1-2, the STA 100 transmits the Probe request frame 1021 having the TRN-R field added thereto in the active scan. Therefore, the STA 100 can receive the Probe response frame 1003 from the connection destination STA 200 present at a proximity distance without performing the beam-forming training in the BTI and the A-BFT. As a result, the time required for completion of the discovery can be reduced.

In addition, the STA 200 determines the best sector of the receiving antenna array 118 and the best sector of the transmitting antenna array 116 by using the TRN-R field added to the Probe request frame 1021. Thereafter, the STA 200 transmits the ACK frame and the Probe response frame to the STA 100 by using the best sector of the transmitting antenna array 116. Therefore, the probability of the STA 100 completing the discovery of the STA 200 without performing the beam-forming training in the BTI and the A-BFT is increased.

Modification 1-3

Figure 11:
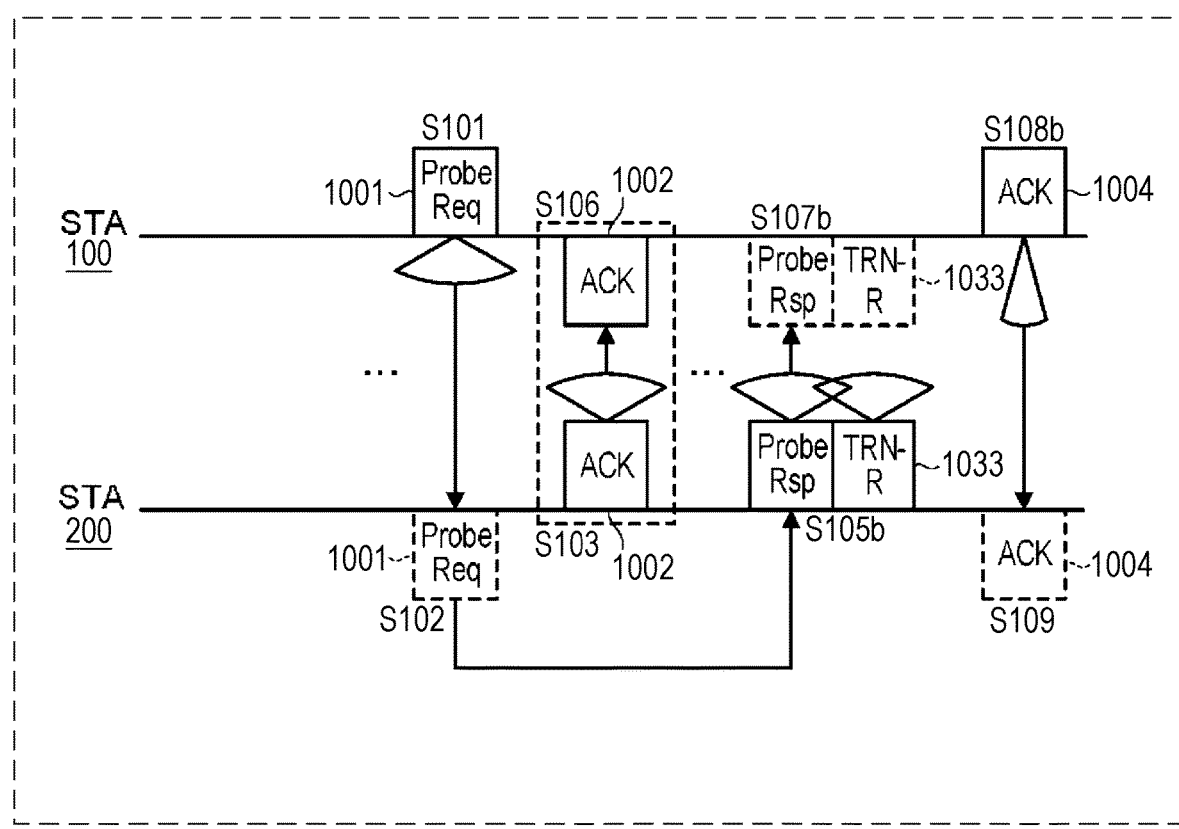
FIG. 11 is a diagram illustrating an example of the procedure by which an STA performs discovery of another STA according to Modification 1-3.

FIG. 11 is a diagram illustrating an example of the procedure by which the STA 100 performs discovery of another STA 200 according to Modification 1-3.

Steps S101 to S103 are similar to those described above with reference to FIG. 5, and descriptions of steps S101 to S103 are not repeated.

In step S106, the STA 100 determines whether the ACK frame 1002 has been received from the STA 200.

If the Probe request frame 1001 has been received from an STA that does not complete the beam-forming training (for example, the STA 100), the STA 200 transmits a Probe response frame 1033 having the TRN-R field added thereto in step S105b.

In step S107b, the STA 100 determines whether it has received the Probe response frame 1033 having the TRN-R field added thereto.

At this time, if the STA 100 determines that it has received the ACK frame 1002 and the Probe response frame 1033 having the TRN-R field added thereto, the STA 100 further performs the processing described below.

In one example, upon receiving the Probe response frame 1033, the STA 100 may switch the receiving antenna sector for each of the TRN-R subfields and measure the reception quality of the switched receiving antenna sector. In this manner, reception beam-forming training may be performed, and the best sector of the receiving antenna array 118 may be determined.

In addition, in one example, if the STA 100 includes the antenna pattern reciprocity, the STA 100 may determine the best sector of the transmitting antenna array 116 used for subsequent transmission on the basis of the reception quality for each of the TRN-R subfields.

In step S107b, the best sector of the transmitting antenna array 116 is determined as described above, and the STA 100 transmits the ACK frame 1004 by using the determined best sector of the transmitting antenna array 116.

In step S108b, the STA 100 transmits the ACK frame 1004 to the STA 200. Subsequently, in step S109, the STA 200 receives the ACK frame 1004. As a result, the STA 100 completes the discovery of the STA 200.

Furthermore, after transmitting the ACK frame 1004, the STA 100 may transmit an association request frame (not illustrated) to the STA 200 and perform an initial connection process.

In addition, when the STA 100 completes an active scan and selects the STA 200 as the connection destination (for example, when the STA 100 determines that the communication quality with the STA 200 is the best among the STAs from which the STA 100 has received the Probe response frames during an active scan), the STA 100 may transmit a Probe request frame and an association request frame for initial connection by using the best sector of the transmitting antenna array 116.

According to Modification 1-3, the transmission and modulation circuit 114 of the STA 200 includes the transmission TRN adding circuit 114b as illustrated in FIG. 10. The sequencer circuit 106 of the STA 200 determines whether to add the TRN-R field to a Probe response frame F2 and the length of the TRN-R field. For example, the STA 100 may set information regarding the number of receiving antenna sectors in the Probe request frame F1 and transmit the Probe request frame F1. The STA 200 may determine the length of the TRN-R field to be added to the Probe response frame F2 on the basis of the information regarding the number of receiving antenna sectors of the STA 100 included in the Probe request frame.

According to Modification 1-3, the reception and demodulation circuit 122 of the STA 100 includes the reception TRN processing circuit 122b, as illustrated in FIG. 10. The sequencer circuit 106 of the STA 100 determines the best sector of the receiving antenna array 118 on the basis of the reception quality of each of the TRN-R fields measured by the reception TRN processing circuit 122b. In addition, when the STA 100 has the antenna pattern reciprocity, the STA 100 determines the best sector of the transmitting antenna array 116 on the basis of the determined best sector of the receiving antenna array 118.

Figure 12:
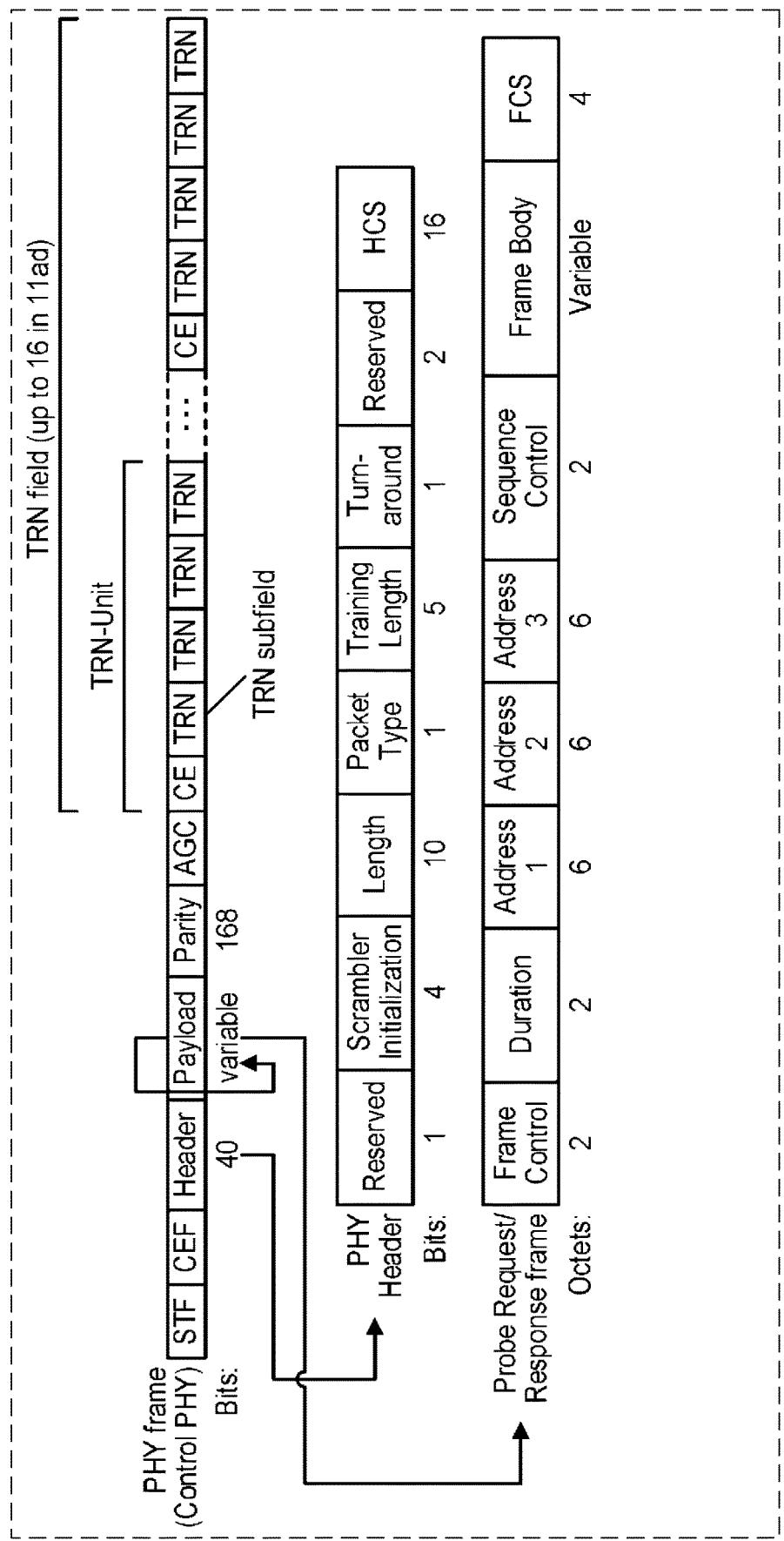
FIG. 12 is a diagram illustrating an example of the format of a PHY packet including a Probe response frame according to Modification 1-3.

FIG. 12 is a diagram illustrating an example of the format of a PHY packet including the Probe response frame 1033 according to Modification 1-3.

The format illustrated in FIG. 12 corresponds to the format of the PHY packet including the Probe request frame 1021 illustrated in FIG. 9B in which the "Probe request frame 1021" is replaced by the "Probe response frame 1033".

According to Modification 1-3, the STA 100 can receive the Probe response frame 1033 from the connection destination STA 200 located at a proximity distance without performing the beam-forming training in the BTI and the A-BFT. In addition, since the STA 100 can determine the best sector of the transmitting antenna array 116 and the best sector of receiving antenna array 118 used for communication with the STA 200 on the basis of the received Probe response frame 1033, the STA 100 can reduce the time required for completion of the discovery and, thus, reduce the time required for the initial connection.

First Embodiment—Scenario 2

Figure 13:
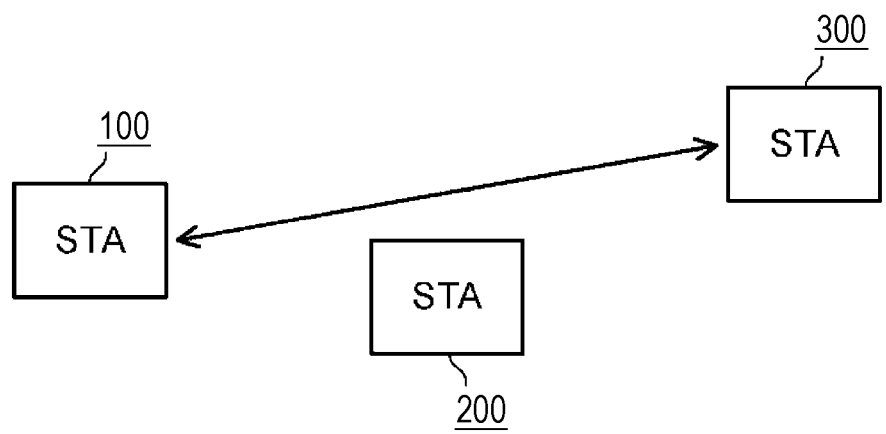
FIG. 13 is a diagram illustrating an example of the overall configuration relating to scenario 2 according to the first embodiment.

FIG. 13 is a diagram illustrating an example of the overall configuration relating to scenario 2 according to the first embodiment.

The STA 100 is an active scan STA. The STAs 200 and 300 are connection destination STAs. Each of the STAs 200 and 300 is, for example, a PCP/AP STA, but may be a non-PCP/AP STA, a non-PCP STA, or a non-AP. Furthermore, the STA 100 is, for example, a wireless terminal device. The STAs 200 and 300 are, for example, wireless base station devices.

Figure 14:
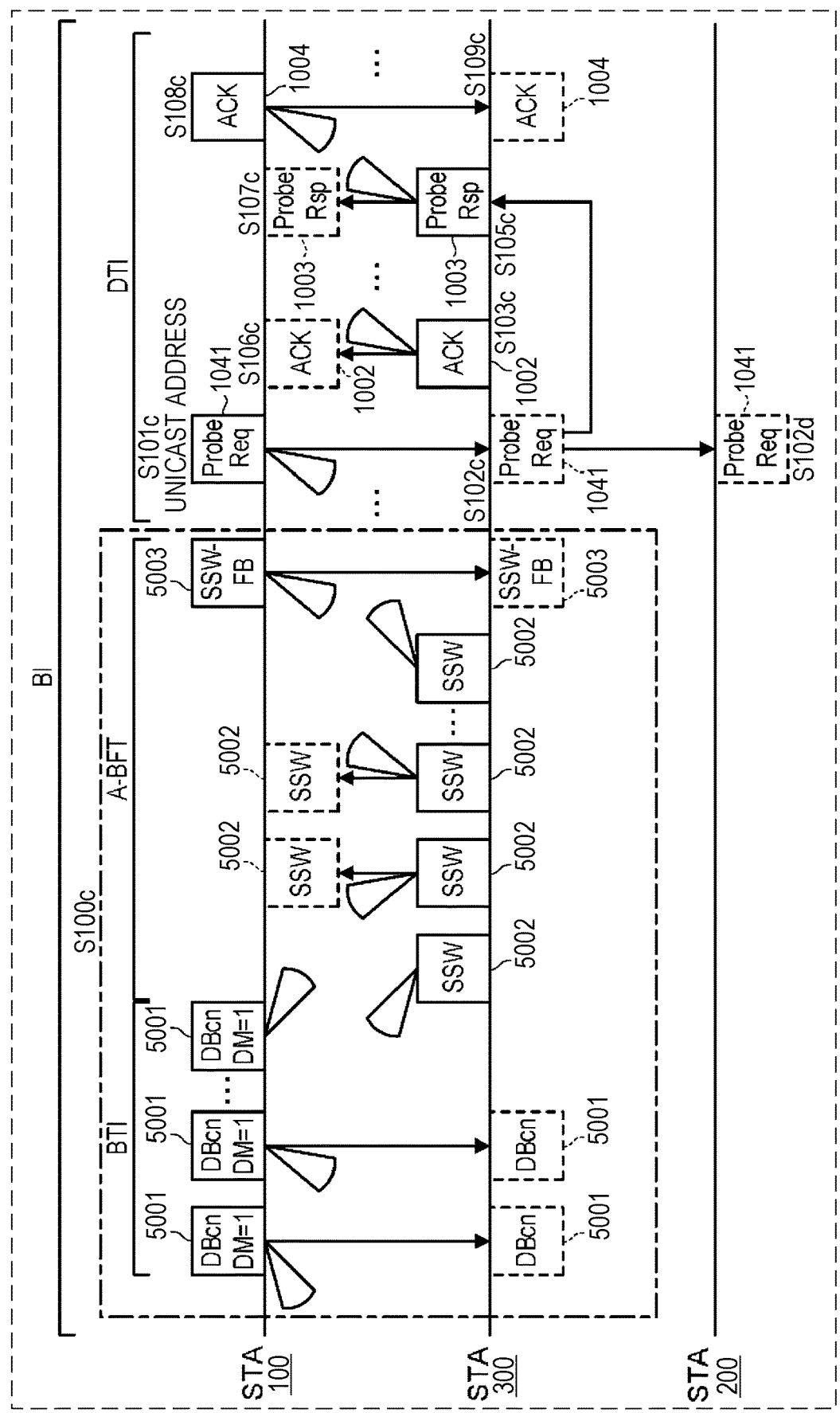
FIG. 14 is a diagram illustrating an example of the procedure by which an STA performs discovery of other STAs according to the first embodiment.

FIG. 14 is a diagram illustrating an example of the procedure by which the STA 100 performs discovery of other STAs 200 and 300 according to the first embodiment.

In scenario 1 of the first embodiment, the STA 100 receives the ACK frame 1002 and the Probe response frame 1003 in steps S106 and S107 illustrated in FIG. 5, respectively.

In contrast, the case (scenario 2) is described in which the STA 100 does not receive the ACK frame 1002 and the Probe response frame 1003 in the step S106 and the step S107 illustrated in FIG. 5, respectively, according to the first embodiment. In this case, the STA 100 may determine that a connection destination STA is not present at a nearby position in the currently used wireless channel and may perform beam-forming training in the BTI and the A-BFT.

The STA 100 may determine whether to perform communication in proximity depending on the type of application that requests communication. For example, when the STA 100 is executing an application that downloads data from a data kiosk, the STA 100 may perform the procedure illustrated in FIG. 5. However, when the STA 100 connects to a public wireless LAN access point, the STA 100 may perform the procedure illustrated in 14. As used herein, the term "data kiosk" refers to, for example, a device that allows a user to download data, such as a moving image or electronic book data, onto a smartphone therefrom by bringing the smartphone close to the device.

When executing an application that requests communication in proximity, the STA 100 need not receive the Probe response frame 1003 transmitted from an STA (for example, the STA 200 and the STA 300 illustrated in FIG. 13) that is not present at a proximity distance. Accordingly, to avoid transmission of an unnecessary frame that consumes power and avoid interference with other STAs (not illustrated) caused by the transmission, the STA 200 and STA 300 need not respond to a Probe request frame 1041 transmitted by using a beam forming directional antenna pattern. Since the STA 100 performs the procedure illustrated in FIG. 5 when executing an application that requests communication in proximity, the Probe response frames are not transmitted from the STA 200 and the STA 300. As a result, the occurrence of interference with other STAs can be reduced.

In contrast, if the STA 100 determines that a connection destination STA is not present at a proximity distance in the currently used wireless channel and, thus, determines to perform the beam-forming training in the BTI and the A-BFT, the STA 100 performs the procedure illustrated in FIG. 14. The procedure by which the STA 100 performs beam-forming training with the STA 300 and, thereafter, completes discovery of the STA 300 is described below.

Referring to FIG. 14, in step S100c, the STA 100 performs beam-forming training in the BTI and the A-BFT. For example, if the STA 300 receives the SSW-FB frame 5003 from the STA 100, the STA 100 completes the beam-forming training with the STA 300.

After completion of the beam-forming training with the STA 300, the STA 100 sets the RA field to the unicast address indicating the STA 300 and transmits the Probe request frame 1041 by using the beam forming directional antenna pattern in step S101c.

In step S102c, upon receiving the Probe request frame 1041, the STA 300 sets the transmitting antenna array 116 to the best sector on the basis of the best sector information for the transmitting antenna array 116 included in the SSW-FB frame 5003 received in the A-BFT.

In step S103c, the STA 300 transmits an ACK frame 1002. Subsequently, in step S105c, the STA 300 transmits the Probe response frame 1003 to the STA 100.

In step S106c, the STA 100 determines whether the ACK frame 1002 has been received. In step S107c, the STA 100 determines whether the Probe response frame 1003 has been received.

If, in step S106c, the STA 100 determines that it has received the ACK frame 1002 and if, in step S107c, the STA 100 determines that it has received the Probe response frame 1003, the STA 100 sets the transmitting antenna array 116 to the best sector on the basis of the best sector information for the transmitting antenna array 116 included in the SSW-FB frame 5003 received in the A-BFT. Subsequently, in step S108c, the STA 100 transmits the ACK frame 1004. In step S109c, the STA 300 receives the ACK frame 1004. Thus, the STA 100 completes the discovery of the STA 300.

In contrast, if the STA (for example, the STA 200) that does not complete the beam-forming in the BTI and the A-BFT receives the Probe request frame 1041 in step S102d, the STA does not transmit the ACK frame 1002 and the Probe response frame 1003 since the address set in the RA field differs from the unicast address of the STA 200.

The case in which the STA 200 executes an application that uses communication in proximity (for example, the case in which the STA 200 is a data kiosk) is described below. In this case, it is desirable that the STA 200 reduce interference with the STA 300 and other STAs (not illustrated).

For this reason, it is desirable that the STA 200 transmit the Probe response frame 1003 if the received Probe request frame 1041 has been transmitted by a quasi-omni antenna. In addition, it is desirable that the STA 200 should not transmit the Probe response frame 1003 if the Probe request frame 1041 has been transmitted by using the beam forming directional antenna pattern. Even when the Probe response frame 1003 corresponding to the Probe request frame 1041 transmitted by using the beam forming directional antenna pattern is transmitted by using the quasi-omni antenna, it is highly likely that the Probe response frame is not received, resulting in wasting of a device and a channel resource.

However, it is difficult for the STA 200 to determine whether the received Probe request frame has been transmitted by a quasi-omni antenna or a beam forming directional antenna pattern.

Therefore, in one example, if the STA 100 transmits the Probe request frame 1041 by using the beam forming directional antenna pattern, the STA 100 sets the unicast address of the connection destination STA in the Probe request frame 1041. However, if the STA 100 transmits the Probe request frame 1041 by using a quasi-omni antenna, the STA 100 does not set the unicast address of the destination STA in the Probe request frame 1041, unlike in FIG. 14. Instead, the STA 100 sets, for example, a broadcast address in the Probe request frame 1041.

In addition, in one example, if the RA field of the received Probe request frame 1041 is set to the unicast address of the STA 200, the STA 200 transmits the ACK frame 1002 and the Probe response frame 1003 by using the beam forming directional antenna pattern. However, if the RA field of the received Probe request frame 1041 is set to the broadcast address, the STA 200 transmits the ACK frame 1002 and the Probe response frame 1003 by using the quasi-omni antenna pattern, unlike in FIG. 14.

In this manner, unlike in FIG. 14, the STA 200 can adopt scenario 1 according to the first embodiment in which the STA 200 responds to the Probe request frame 1041 transmitted by the quasi-omni antenna by using a quasi-omni antenna and transmitting the Probe response frame 1003. In addition, like in FIG. 14, the STA 200 can adopt scenario 2 according to the first embodiment in which the STA 200 responds to the Probe request frame 1041 transmitted by the beam forming directional antenna pattern by using the beam forming directional antenna pattern and transmitting the Probe response frame 1003. That is, the connection destination STAs (STA 200 and STA 300) can respond by using a transmission method corresponding to the transmission method adopted by the STA 100. Thus, interference with other STAs can be reduced.

Upon executing an application that does not use communication in proximity, the STA 100 may perform the procedure illustrated in FIG. 14. In this case, since the RA field of the Probe request frame is set to the unicast address, transmission of the Probe response frame from an unintended STA (STA 200) present at a proximity distance can be prevented. Thus, interference with other STAs can be reduced.

In one example, the STA 100 may determine whether to perform communication in proximity depending on the type of application that requests communication and determine whether to perform the procedure illustrated in FIG. 5 or the procedure illustrated in FIG. 14. In this manner, the STA 100 can obtain a response from a connection destination STA (the STA 200) in accordance with the type of application.

Second Embodiment—Scenario 1

Figure 15:
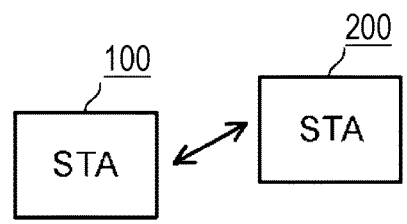
FIG. 15 is a diagram illustrating an example of the overall configuration relating to scenario 1 according to a second embodiment.

FIG. 15 is a diagram illustrating an example of the overall configuration relating to scenario 1 according to the second embodiment.

The STA 100 is an active scan STA. The STA 200 is a connection destination STA. The STA 200 is, for example, a PCP/AP STA. However, the STA 200 may be a non-PCP/AP STA, a non-PCP STA, or a non-AP. In addition, the STA 100 is, for example, a wireless terminal device. The STA 200 is, for example, a wireless base station device.

Figure 16:
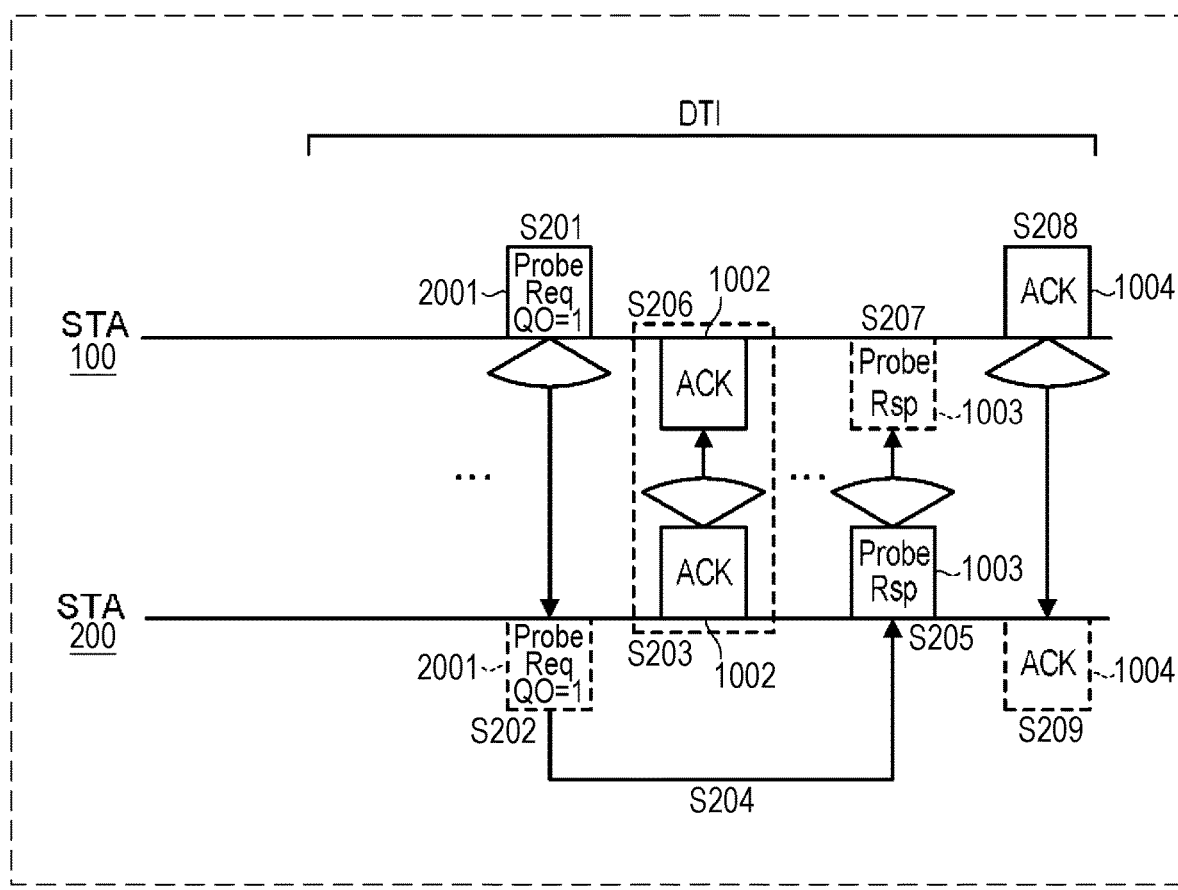
FIG. 16 is a diagram illustrating an example of the procedure by which an STA performs discovery of another STA according to the second embodiment.

FIG. 16 is a diagram illustrating an example of the procedure by which the STA 100 performs discovery of another STA 200 according to the second embodiment.

During the period between active scans and before the beam-forming training with the STA 200, in step S201, the STA 100 sets a field (QO TX: Quasi Omni TX) that is included in a Probe request frame 2001 and that indicates a quasi-omni transmit pattern to 1 (QO=1 in FIG. 16). Thereafter, the STA 100 transmits the Probe request frame 2001 by using the quasi-omni antenna pattern. In contrast, for example, if the beam-forming training with the STA 200 is completed, the STA 100 sets the QO TX field included in the Probe request frame 2001 to 0 in step S201, unlike in FIG. 16. Thereafter, the STA 100 transmits the Probe request frame 2001 by using the best sector of the transmitting antenna array determined through the beam-forming training. The STA 100 may set the RA field of the Probe request frame 2001 to a unicast address indicating the STA 200 or a broadcast address.

Figure 17:
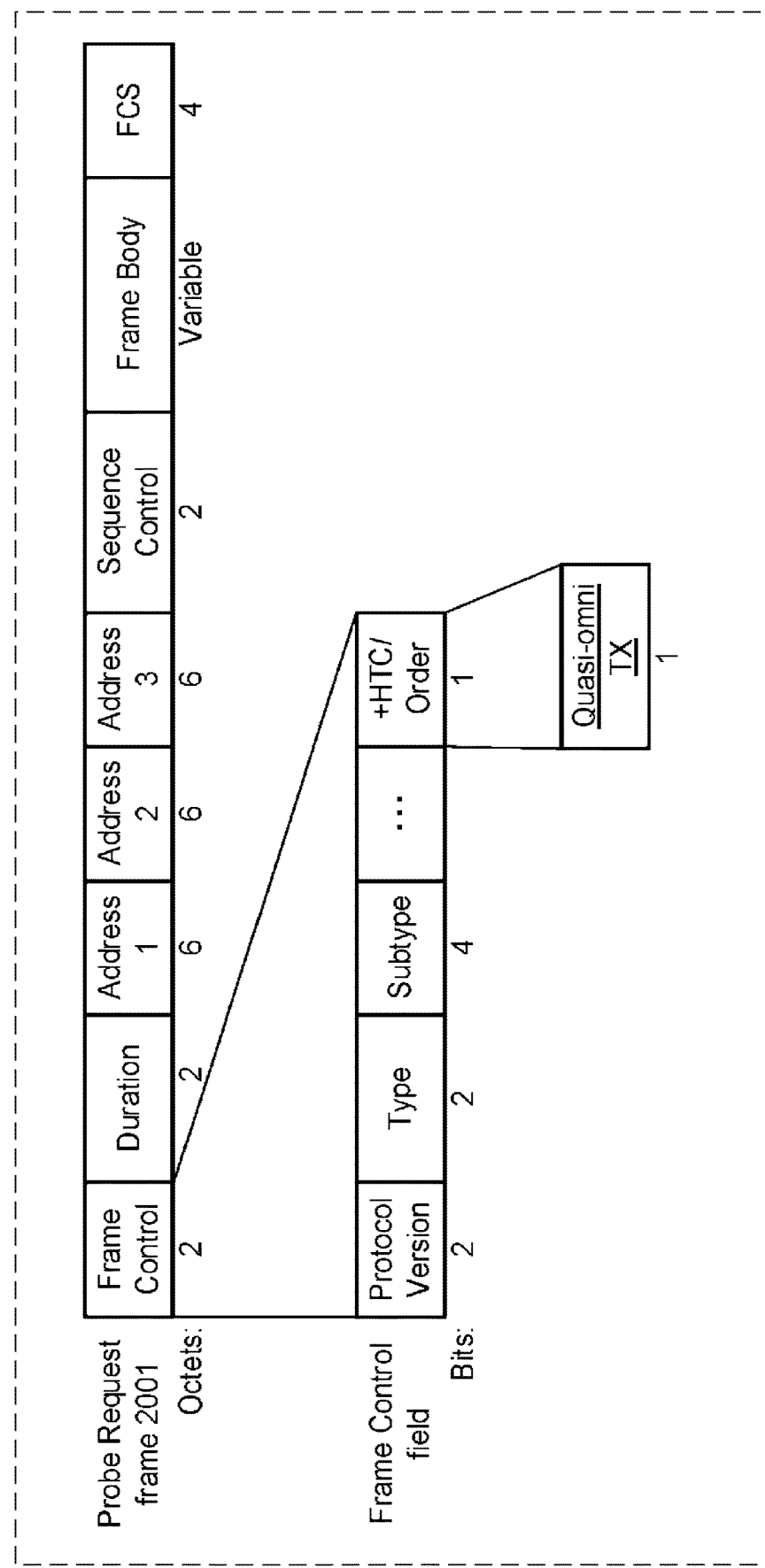
FIG. 17 is a diagram illustrating an example of the format of a Probe request frame including a field indicating a quasi-omni transmit pattern according to the second embodiment.

FIG. 17 is a diagram illustrating an example of the format of a Probe request frame 2001 including a QO TX field indicating a quasi-omni transmit pattern according to the second embodiment.

The Quasi-omni TX field may be included in the Probe request frame 2001 by replacing, among the fields or subfields included in the Probe Request frame body defined by the 11ad standard, one having no function of the 11 ad standard (e.g., "Reserved") with the Quasi-omni TX field or Quasi-omni TX subfield (hereinafter referred to as a "QO TX field" or a "QO TX subfield"). For example, the +HTC/Order subfield of the Frame Control field illustrated in FIG. 17 is not referenced in the 11ad and 11ay standards. Accordingly, the STA 100 and the STA 200 may replace the +HTC/Order subfield with the Quasi-omni TX field and use the field as the Quasi-omni TX field.

For example, if the type field and the subtype field of the Frame Control field indicate a Probe request frame, the +HTC/Order subfield may be replaced with the Quasi-omni TX field. In addition, if the Quasi-omni TX field is "1", the frame is transmitted by using the quasi-omni transmit pattern. However, if the Quasi-omni TX field is "0", the frame is not transmitted by using the quasi-omni transmit pattern.

Figure 18:
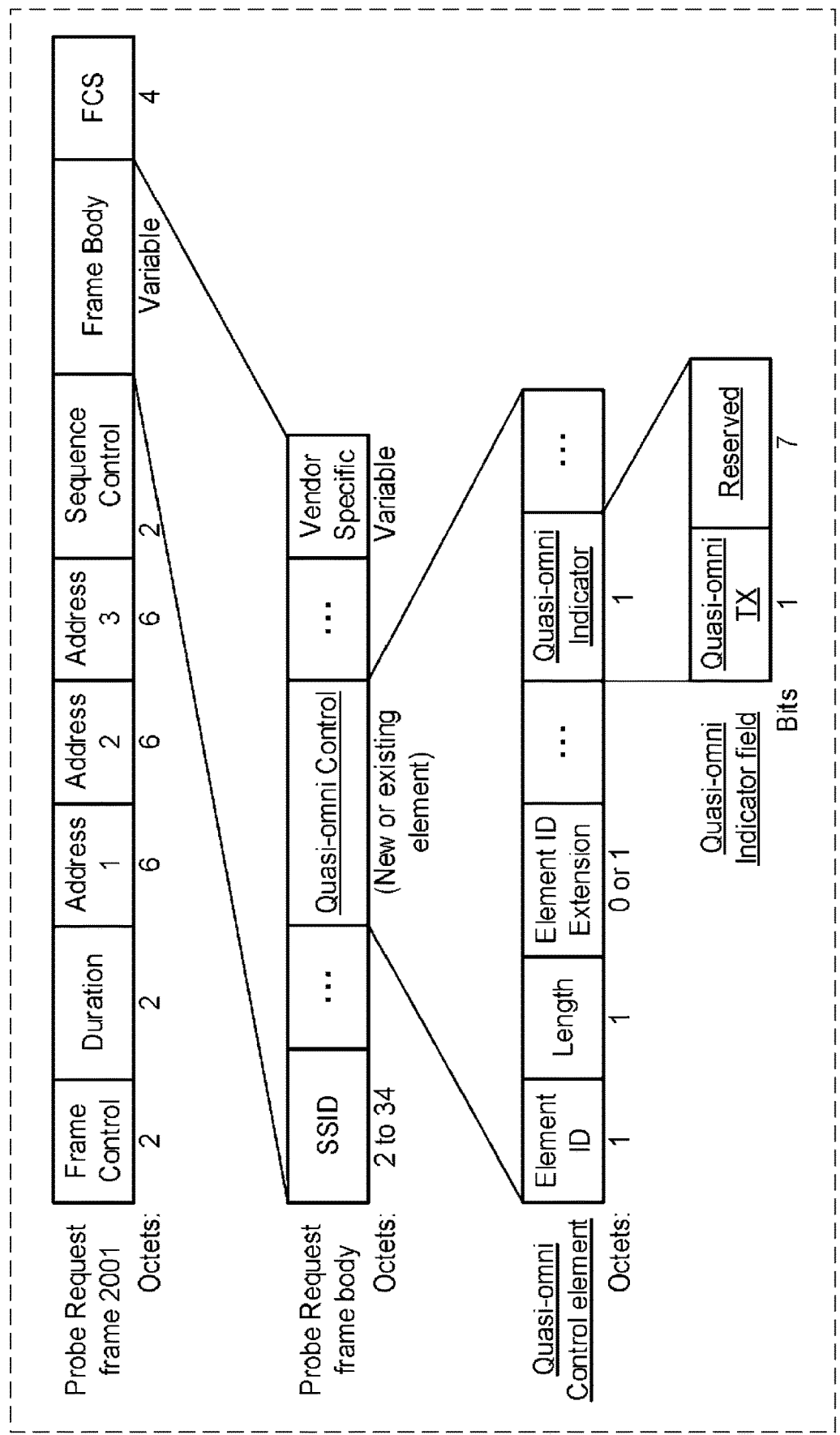
FIG. 18 is a diagram illustrating another example of the format of the Probe request frame including a field indicating a quasi-omni transmit pattern according to the second embodiment.

FIG. 18 is a diagram illustrating another example of the format of the Probe request frame 2001 including the QO TX (Quasi-omni TX) field indicating the quasi-omni transmit pattern according to the second embodiment.

Alternatively, as illustrated in FIG. 18, by adding an element (for example, a Quasi-omni Control element) that differs from an element defined by the 11 ad standard to the Probe Request frame body (the main body of the Probe request frame 2001), the Quasi-omni TX field may be included. Still alternatively, instead of adding a new element, a Quasi-omni TX field may be added to any one of the elements included in the main body of the Probe request frame 2001 defined by the 11ad standard.

Figure 19:
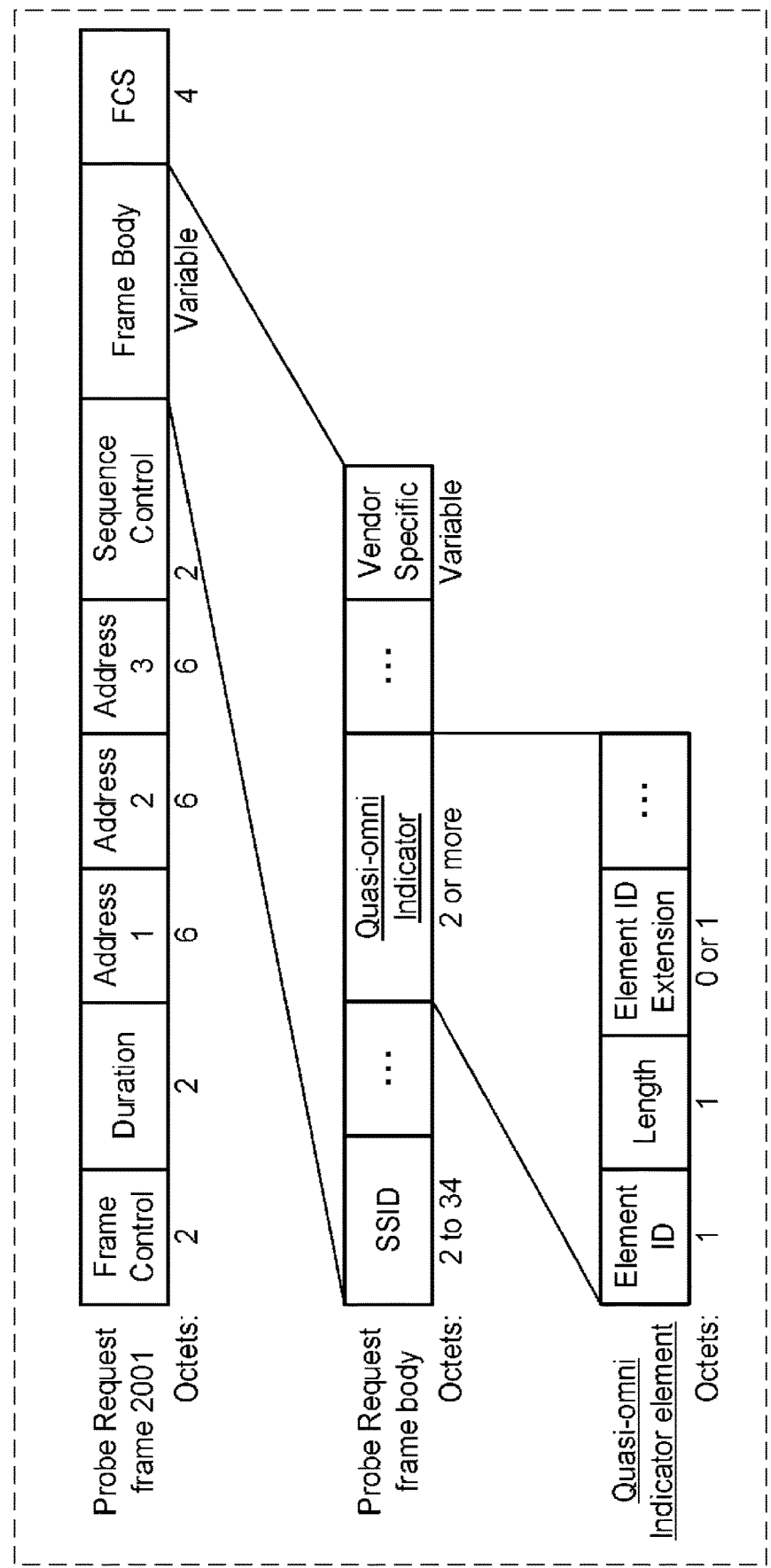
FIG. 19 is a diagram illustrating another example of the format of the Probe request frame indicating quasi-omni transmit pattern according to the second embodiment.

FIG. 19 is a diagram illustrating another example of the format of the Probe request frame 2001 indicating a quasi-omni transmit pattern according to the second embodiment.

As illustrated in FIG. 19, an element (for example, a Quasi-omni Indicator element) that differs from any one of the elements of the Probe request frame main body and the elements defined by the 11ad standard may be added. Thereafter, the value of the Quasi-omni TX (field) may be informed in accordance with whether the Quasi-omni Indicator element is included. In this case, addition of the Quasi-omni Indicator element is equivalent to setting the value of the Quasi-omni TX field to 1, and non-addition of the Quasi-omni Indicator element is equivalent to setting the value of the Quasi-omni TX field to 0.

Referring again to FIG. 16, the processes performed in steps S202 to S203 are similar to those in S102 to S103 described above with reference to FIG. 5. Accordingly, description of the processes is not repeated.

In step S204, the STA 200 checks the value of the Quasi-omni TX field of the received Probe request frame 2001.

If the value of the Quasi-omni TX field checked in step S204 is 1, the STA 200 uses the quasi-omni antenna pattern and transmits the Probe response frame 1003 in step S205, in the same manner as in step S105 illustrated in FIG. 5.

In step S206, the STA 100 determines whether the ACK frame 1002 has been received from the STA 200. In step S207, the STA 100 determines whether the Probe response frame 1003 including the discovery information has been received from the STA 200.

If, in step S206, the STA 100 determines that the ACK frame 1002 has been received and if, in step S207, the STA 100 determines that the Probe response frame 1003 has been received, the STA 100 responds in step S208 by transmitting the ACK frame 1004 by using the quasi-omni antenna pattern. Subsequently, in step S209, the STA 200 receives the ACK frame 1004. In this manner, the STA 100 completes the discovery of the STA 200.

However, if the value of the Quasi-omni TX field checked in step S204 is 0, the STA 200 sets the transmitting antenna array 116 to the best sector for transmission to the STA indicated by the source address of the Probe request frame 2001 (for example, STA 100) and transmits a Probe response frame 1003 in step S205. It should be noted that the STA 200 does not transmit the Probe response frame 1003 if the STA 200 receives a Probe request frame 2001 having a Quasi-omni TX field value of 0 from an STA (for example, an STA 400 (not illustrated)) that has not completed beam-forming training.

Subsequently, in step S207, upon receiving the Probe response frame 1003 including the discovery information, the STA 100 responds by transmitting the ACK frame 1004 by using the beam forming directional antenna pattern in step S208. Subsequently, in step S209, the STA 200 receives the ACK frame 1004. In this manner, the STA 100 completes the discovery of the STA 200.

In either case, the STA 100 may repeat steps S201 to S209 on a plurality of channels to discover the intended connection destination.

Figure 20:
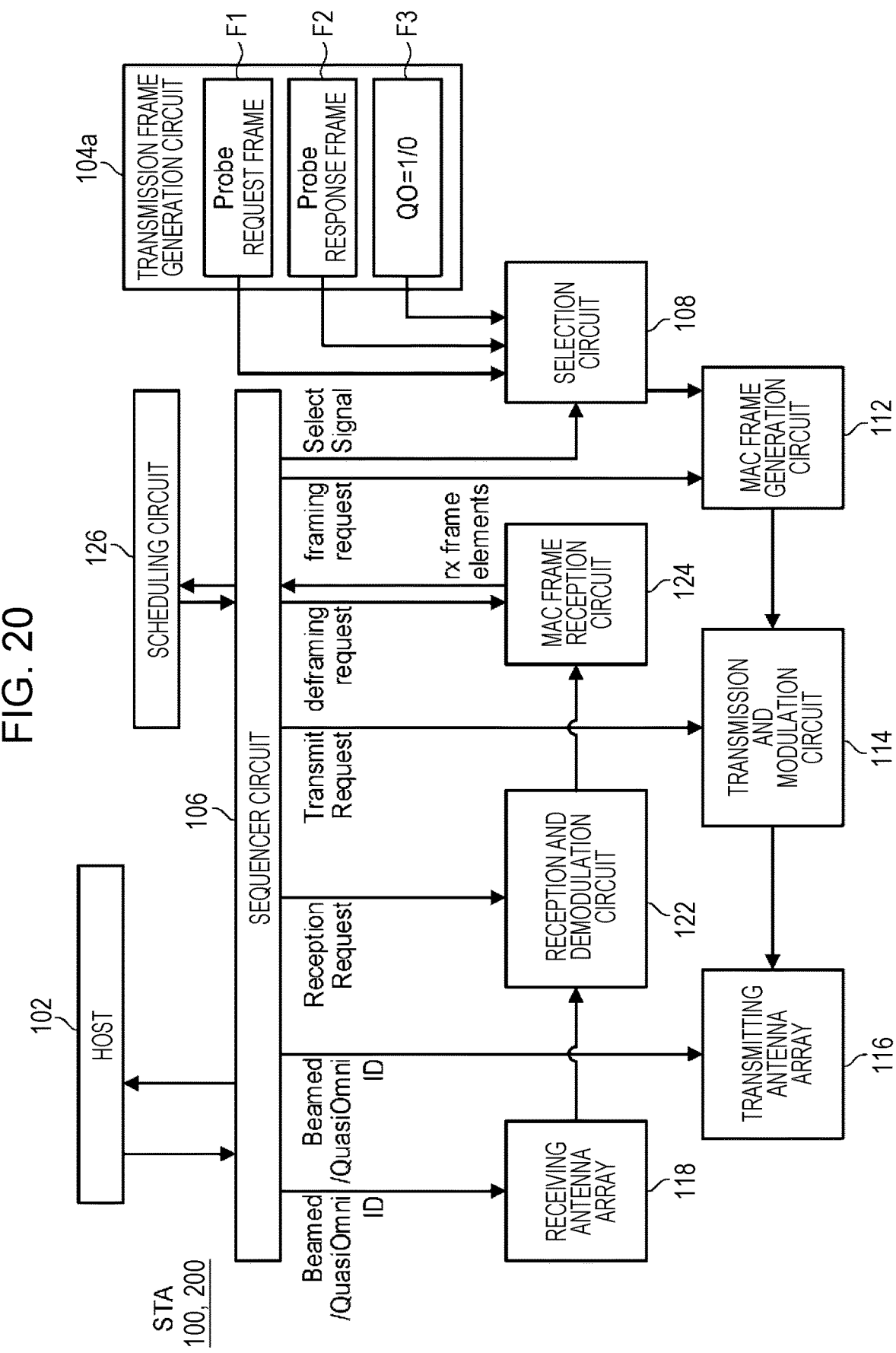
FIG. 20 is a diagram illustrating an example of the configuration of STAs according to the second embodiment.

FIG. 20 is a diagram illustrating an example of the configuration of STAs 100 and 200 according to the second embodiment.

In addition to generating the Probe request frame F1 and the Probe response frame F2 illustrated in FIG. 7, a transmission frame generation circuit 104a generates the value F3 of the Quasi-omni TX field and outputs the generated values to the selection circuit 108.

The MAC frame generation circuit 112 combines the data of the Probe request frame F1 and the value F3 in the Quasi-omni TX field to generate MAC frame data including the Probe request frame F1.

The sequencer circuit 106 has the functions described above with reference to FIG. 7. In addition, upon transmitting the Probe request frame F1 or the Probe response frame F2, the sequencer circuit 106 controls the selection circuit 108 so that the Quasi-omni TX field is included in the MAC frame.

The other constituent elements illustrated in FIG. 20 are the same as the constituent elements described above with reference to FIG. 7, and description of the constituent elements is not repeated.

According to the second embodiment, the same effect as in the first embodiment can be obtained. Furthermore, according to the second embodiment, since the STA 100 transmits a Probe request frame including the Quasi-omni TX field, the STA 200 can determine whether the received Probe request frame has been transmitted by using a quasi-omni antenna pattern. Consequently, if the beam-forming training with the STA 100 is not completed, the STA 200 can determine whether to transmit the Probe response frame by using a quasi-omni antenna pattern in accordance with the value in the Quasi-omni TX field of the received Probe request frame.

In this manner, the STA 100 can receive the Probe response frame from the intended STA (whether it is present at a proximity distance) and can prevent transmission of the Probe response frame from an unintended STA. As a result, interference can be reduced.

Modification 2-1

Like Modification 1-1 of the first embodiment, Modification 2-1 can be made to the second embodiment.

In step S202 illustrated in FIG. 16, in addition to receiving the Probe request frame 2001, the STA 200 may measure the reception quality (e.g., RSSI, SINR) of the Probe request frame 2001.

In step S204, in addition to checking the value of the Quasi-omni TX field of the received Probe request frame 2001, the STA 200 checks whether the value indicating the reception quality of the Probe request frame 2001 exceeds a predetermined threshold value.

If the value of the Quasi-omni TX field checked in step S204 is 1 and the value indicating the reception quality exceeds the threshold value, the STA 200 uses the quasi-omni antenna pattern and transmits the Probe response frame 1003 in step S205. However, if the value indicating the reception quality is lower than the threshold value although the value of the Quasi-omni TX field checked in step S205 is 1, the STA 200 may determine that the STA 100 is not suitable for communication (communication in proximity) using the quasi-omni antenna pattern and may stop transmission of the Probe response frame 1003 in step S205.

However, if the value in the Quasi-omni TX field checked in step S204 is 0, the STA 200 determines that the STA 100 does not perform communication in proximity in step S205. Thus, the STA 200 sets the transmitting antenna array 116 to the best sector for transmission to the STA indicated by the transmission source address of the Probe request frame 2001 (for example, the STA 100), regardless of the reception quality. Thereafter, the STA 200 transmits the Probe response frame 1003.

The other steps S201, S203, and S206 to S209 are similar to those of the second embodiment, and the description of the steps is not repeated.

According to Modification 2-1, the effects of the second embodiment and the effects of Modification 1-1 can be obtained at the same time.

Modification 2-1-1

Like Modification 1-1-1 of the first embodiment, Modification 2-1-1 can be made to the second embodiment.

In one example, in step S203 illustrated in FIG. 16, the STA 200 may set a value indicating the reception quality (RSSI or SINR) in the header of the PHY packet including the ACK frame 1002 and transmit the PHY packet. Furthermore, the STA 200 may determine whether to transmit the Probe response frame 1003 in step S205 on the basis of the value indicating the reception quality.

The STA 200 may set the destination of the Probe request frame 2001 to a broadcast address and transmit the Probe request frame 2001. If a plurality of connection destination STAs are located close to the STA 200, the connection destination STAs each having a reception quality that exceeds the threshold value respond, and the connection destination STAs each having a reception quality that does not exceed the threshold value do not respond. Consequently, unnecessary interference can be reduced.

Modification 2-2

Like Modification 1-2 of the first embodiment, Modification 2-2 can be made to the second embodiment. Modification 2-2 is described below with reference to FIG. 16.

Unlike in FIG. 16, in step S201, the STA 100 may transmit the Probe request frame 2001 having the TRN-R field added thereto by using the quasi-omni antenna pattern.

Unlike in FIG. 16, in step S202, the STA 200 receives the Probe request frame 2001 having the TRN-R field added thereto. Like Modification 1-2, the STA 200 may perform beam-forming training by measuring the reception quality of each of the receiving antenna sectors and determine the best sector of the receiving antenna array 118 of the STA 200 to communicate with the STA 100. If the STA 200 has the antenna pattern reciprocity, the STA 200 may determine the best sector of the transmitting antenna array 116 on the basis of the determined best sector of the receiving antenna array 118.

Unlike in FIG. 16, in step S203, the STA 200 may transmit the ACK frame 1002 by using the best sector of the transmitting antenna array 116 determined in reception of the Probe request frame 2001 having the TRN-R field added thereto.

Unlike in FIG. 16, in step S205, the STA 200 may transmit the Probe response frame 1003 by using the best sector of the transmitting antenna array 116 determined in reception of the Probe request frame 1021 having the TRN-R field added thereto.

The other step S204 and steps S206 to S209 are the same as those in the second embodiment, and description of the steps is not repeated.

According to Modification 2-2, the effects of the second embodiment and the effects of Modification 1-2 can be obtained.

Modification 2-3

Like Modification 1-3 of the first embodiment, modification 2-3 can be made to the second embodiment. Modification 2-3 is described below with reference to FIG. 16.

Unlike in FIG. 16, upon receiving the Probe request frame 2001 from an STA (for example, the STA 100) that has not completed the beam-forming training in step S202, the STA 200 may transmit the Probe response frame 1003 having the TRN-R field added thereto in step S205.

Unlike in FIG. 16, in step S207, upon receiving the Probe response frame 1003 having the TRN-R field added thereto, the STA 100 may measure the reception quality while switching the receiving antenna sectors for each of the TRN-R subfields and perform reception beam-forming training. Thus, the STA 100 may determine the best sector of the receiving antenna array 118.

In addition, if the STA 100 has the antenna pattern reciprocity, the STA 100 may determine the best sector of the transmitting antenna array 116 used for subsequent transmission on the basis of the reception quality for each of the TRN-R subfields.

Unlike in FIG. 16, in step S208, the STA 100 may transmit the ACK frame 1004 by using the determined best sector of the transmitting antenna array 116. After transmitting the ACK frame 1004, the STA 100 may transmit an association request frame (not illustrated) to the STA 200 and perform an initial connection process. In step S209, the STA 200 receives the ACK frame 1004.

The other steps S201 to S204 and S206 are similar to those of the second embodiment, and description of the steps is not repeated.

According to Modification 2-3, since the best sector of the transmitting antenna array 116 is known, the STA 100 can skip the beam-forming training using the TRN-R field. As a result, even when the value of the Quasi-omni TX field of the received Probe request frame 2001 is 0, the time required for discovery can be reduced.

Note that unlike in FIG. 16, when the value of the Quasi-omni TX field of the Probe request frame 2001 received in step S202 is 0 (QO=0), the STA 200 may transmit the Probe response frame 1003 without adding the TRN-R field to the Probe response frame 1003 in step S206.

Modification 2-4

Unlike in FIG. 16, in step S201, the STA 100 may add, to the Probe request frame 2001, information regarding the transmission power (EIRP: equivalent isotropically radiated power) and information regarding the receive antenna gain of the quasi-omni antenna. Thereafter, the STA 100 may transmit the Probe request frame 2001.

Figure 21:
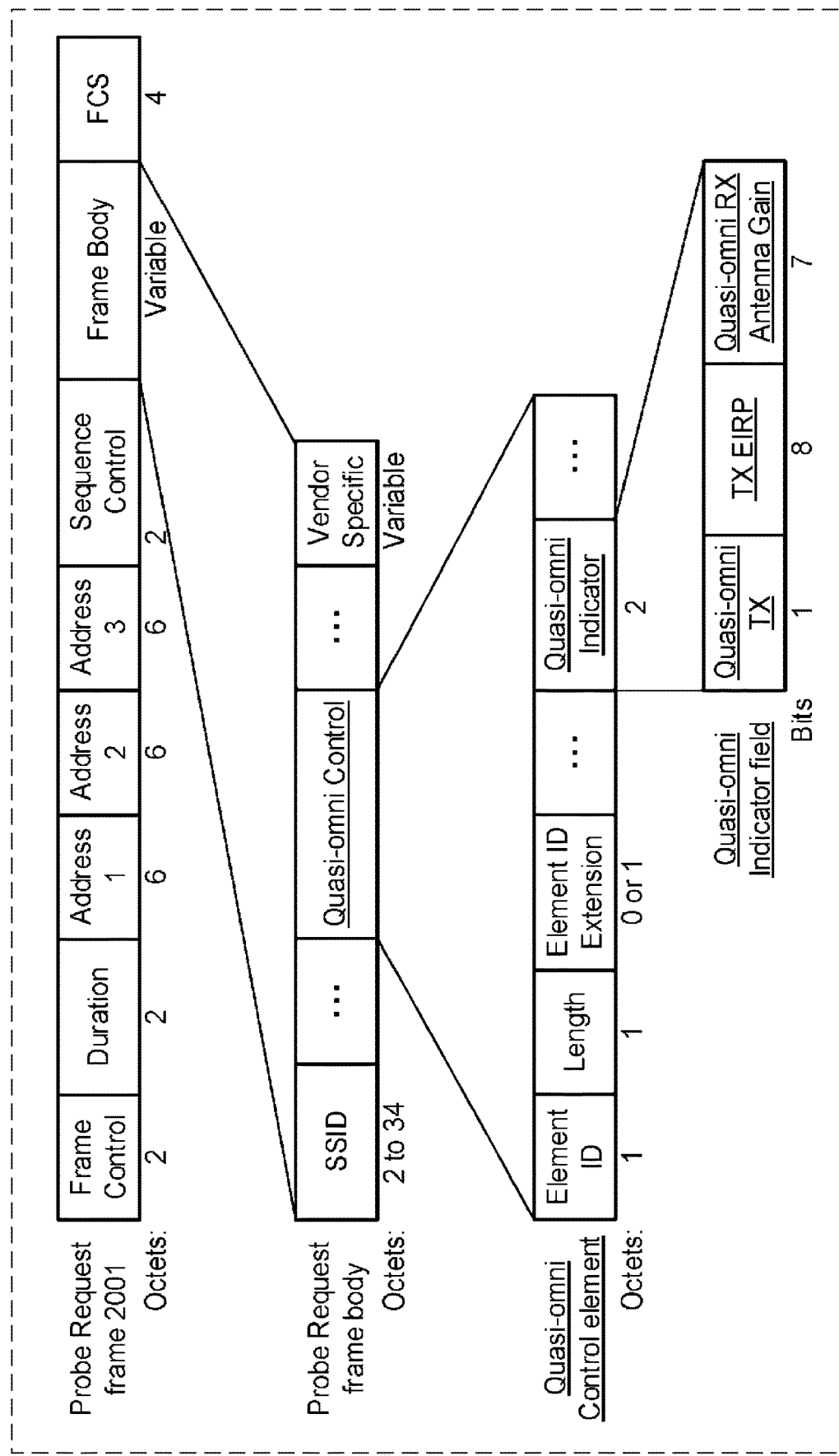
FIG. 21 is a diagram illustrating an example of the format of a Probe request frame according to Modification 2-4.

FIG. 21 is a diagram illustrating an example of the format of the Probe request frame 2001 according to Modification 2-4.

The Quasi-omni indicator field illustrated in FIG. 18 includes the Quasi-Omni TX field, whereas the Quasi-omni indicator field illustrated in FIG. 21 further includes a TX EIRP field and a Quasi-omni RX antenna gain field. The TX EIRP field contains the value of the transmission power (EIRP) of the STA 100. The Quasi-omni RX antenna gain field contains the value of the receive antenna gain of the quasi-omni antenna of the STA 100.

Upon receiving the Probe request frame 2001 illustrated in FIG. 21 in step S202 illustrated in FIG. 16, the STA 200 may calculate the propagation loss between the STA 100 and the STA 200 in step S204 by using, for example, the following Equation (1):

$$\text{(Propagation loss)} = \text{(EIRP of } STA\ 100\text{)} - \text{(measured RSSI(received signal power))} - \text{(receive antenna gain of } STA\ 200\text{)} \quad (1).$$

In Equation (1), (EIRP of STA 100) is a value (unit: dBm) corresponding to the value included in the EIRP field of the received Probe request frame 2001. (Received signal power) is the received power (unit: dBm) measured when the Probe request frame 2001 is received. (receive antenna gain of the STA 200) is the value (unit: dBi) of the receive antenna gain of the quasi-omni antenna of the STA 200. For example, the STA 200 may use the value of the receive antenna gain held in the sequencer circuit 106.

By using the calculated propagation loss value, the STA 200 can more accurately determine whether a frame to be transmitted by using the quasi-omni antenna (for example, a Probe response frame 1003) reaches the STA 100 (whether the STA 100 can receive the frame). For example, if the following mathematical expression (2) is satisfied, the STA 200 may determine that the frame reaches the STA 100:

(Reception sensitivity)<(EIRP of *STA* 200)−(propagation loss)+(receive antenna gain of *STA* 100)  (2).

In Expression (2), (reception sensitivity) is a value (unit: dBm) defined by the 11ad standard and corresponding to the MCS of the Probe response frame 1003. For example, when the STA 200 transmits the Probe response frame 1003 by using the modulation and coding scheme of MCS 0, the reception sensitivity of MCS 0 is −78 dBm.

In Expression (2), a value (unit: dBm) that the STA 200 already knows may be used as (EIRP of STA 200).

In Expression (2), (receive antenna gain of STA 100) is a value (unit: dBm) corresponding to the value included in the Quasi-omni RX antenna gain field of the received Probe request frame 2001.

If Expression (2) is satisfied, the STA 200 determines that the Probe response frame 1003 reaches the STA 100. In step S205 illustrated in FIG. 16, the STA 200 transmits the Probe response frame 1003 by using the quasi-omni antenna pattern. In this case, since the STA 200 determines whether to transmit the Probe response frame 1003 without referencing the Quasi-omni TX field, the Quasi-omni TX field of the Probe request frame 2001 can be removed.

In one example, the STA 100 may determine whether the Probe request frame 2001 has been transmitted by using a quasi-omni antenna pattern in accordance with whether the value of the EIRP of the STA 100 exceeds the threshold value.

FIG. 22 is a diagram illustrating an example of the Quasi-omni Indicator element according to Modification 2-4.

The Quasi-omni Indicator element illustrated in FIG. 22 includes an EIRP field and a Quasi-omni RX antenna gain field.

The format of the Probe request frame 2001 illustrated in FIG. 21 has the Quasi-omni indicator field illustrated in FIG. 19 that includes the EIRP field and the Quasi-omni RX antenna gain field. Similarly, the Quasi-omni RX antenna gain field illustrated in FIG. 22 may be included in the Quasi-omni Control element and/or the Quasi-omni Indicator field illustrated in FIG. 18. Thus, like the Quasi-omni TX field described above, the element and the field that includes the EIRP field and the Quasi-omni RX antenna gain field are not limited to particular ones.

Figure 23:
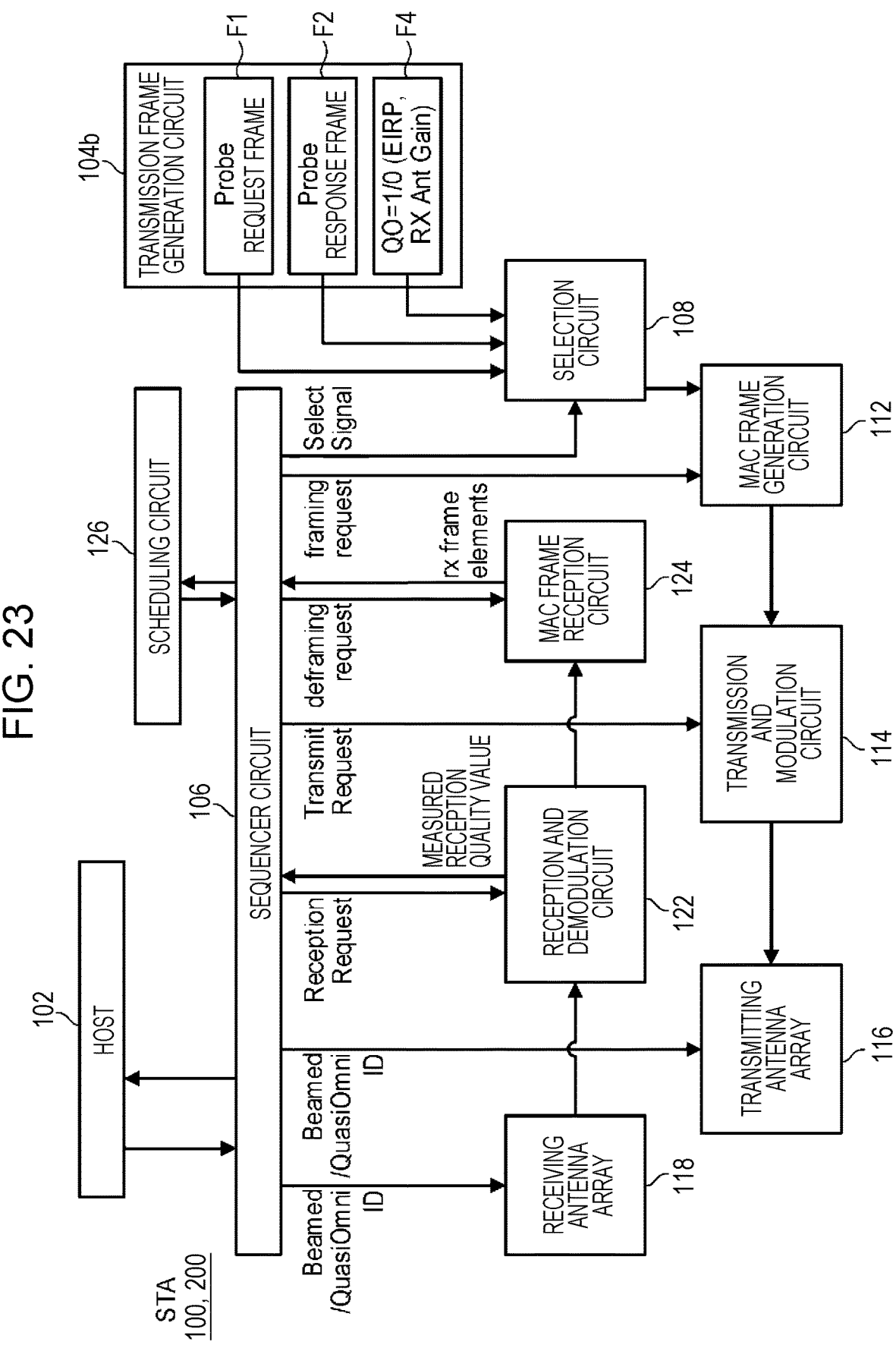
FIG. 23 is a diagram illustrating an example of the configuration of STAs according to Modification 2-4.

FIG. 23 is a diagram illustrating an example of the configuration of STAs 100 and 200 according to Modification 2-4.

A transmission frame generation circuit 104*b* is formed by adding, to the transmission frame generation circuit 104 illustrated in FIG. 7, a circuit that generates a value F4 of the Quasi-omni indicator field output to the selection circuit 108 together with the Probe request frame F1 or the Probe response frame F2. In this case, the Quasi-omni indicator field includes an EIRP field and a Quasi-omni RX antenna gain field.

The MAC frame generation circuit 112 combines the data of the Probe request frame F1 and the value F4 of the Quasi-omni indicator field to generate MAC frame data including the Probe request frame F1.

In addition to achieving the function of the sequencer circuit 106 illustrated in FIG. 7, the sequencer circuit 106 controls the selection circuit 108 such that the Quasi-omni indicator field including the EIRP field and Quasi-omni RX antenna gain field is included in the MAC frame when the Probe request frame 2001 is transmitted.

The other constituent elements illustrated in FIG. 23 are the same as those described above with reference to FIG. 7, and description of the constituent elements is not repeated.

According to Modification 2-4, the STA 200 can more accurately determine whether the Probe response frame 1003 to be transmitted by using a quasi-omni antenna reaches the STA 100. If the STA 200 determined that the Probe response frame 1003 does not reach the STA 100, the STA 200 does not transmit the Probe response frame 1003. Consequently, unlike the case where it is determined whether the Probe response frame 1003 is to be transmitted on the basis of the value in the Quasi-omni TX field, unnecessary transmission can be reduced more and, thus, wasting of devices and channel resources can be reduced.

Modification 2-5

Figure 24:
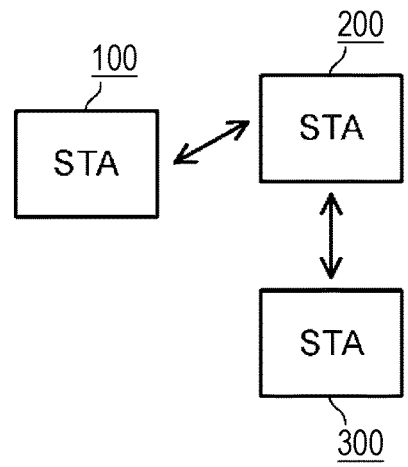
FIG. 24 is a diagram illustrating an example of the overall configuration according to Modification 2-5.

FIG. 24 is a diagram illustrating an example of the overall configuration according to Modification 2-5.

Each of the STAs 100 and 300 is an active scan STA. The STA 200 is a connection destination STA. The STA 200 is, for example, a PCP/AP STA. However, the STA 200 may be a non-PCP/AP STA, a non-PCP STA, or a non-AP. In addition, each of the STAs 100 and 300 is, for example, a wireless terminal device. The STA 200 is, for example, a wireless base station device.

Figure 25:
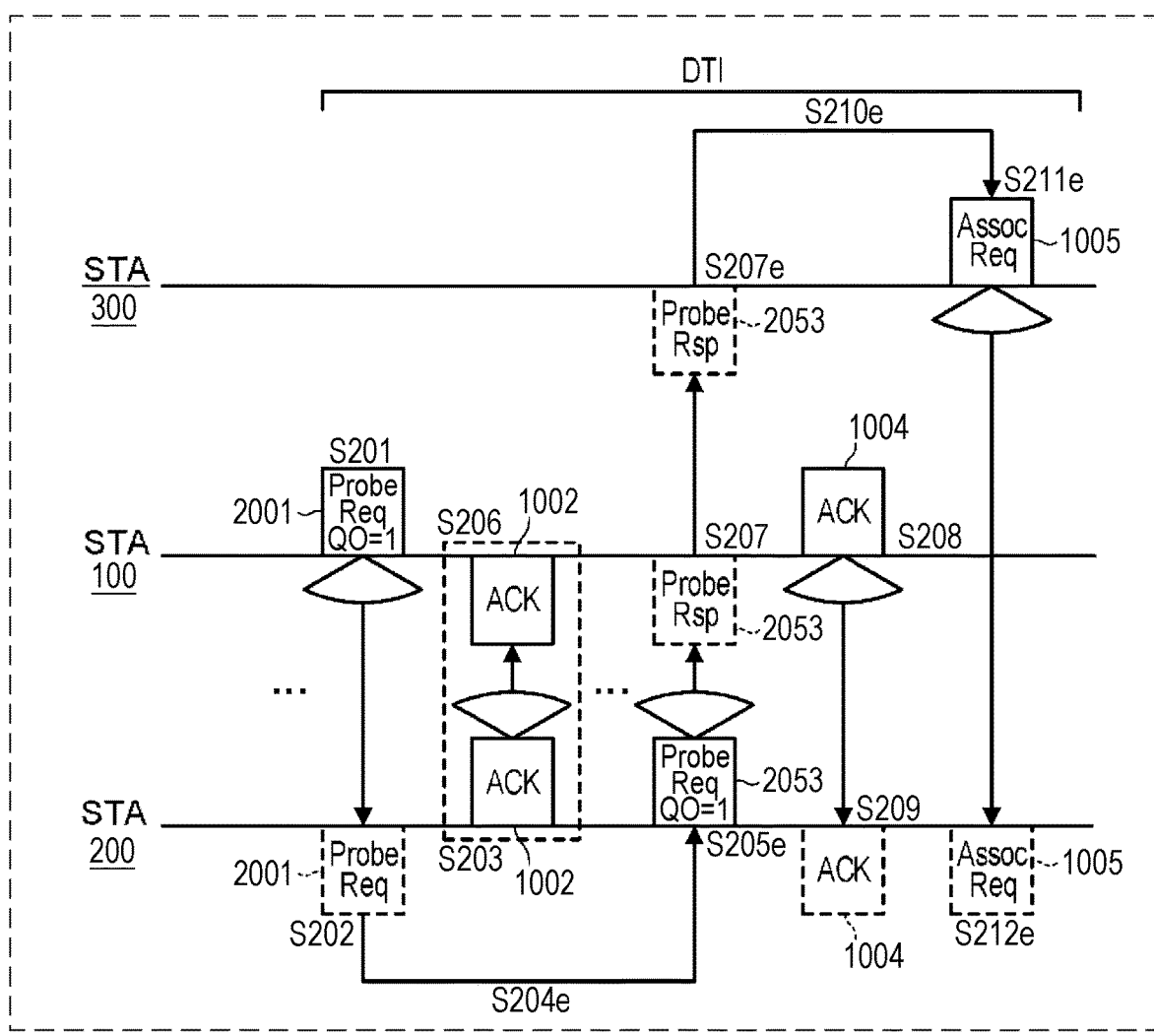
FIG. 25 is a diagram illustrating an example of the procedure by which an STA performs discovery of another STA according to Modification 2-5.

FIG. 25 is a diagram illustrating an example of the procedure by which the STA 100 performs discovery of another STA 200 according to Modification 2-5.

In FIGS. 24 and 25, each of the STA 100 and the STA 200 is located at a proximity distance, and another STA (an STA 300) is located at a distance close to the STA 200.

Steps S201 to S203 illustrated in FIG. 25 are the same as steps S201 to S203 illustrated in FIG. 16, respectively, and description of the steps is not repeated.

In step S204*e* illustrated in FIG. 25, the STA 200 determines whether to transmit a Probe response frame 2053 by using a quasi-omni antenna. In one example, in the same manner as described above with reference to FIG. 14, the STA 200 determines whether to transmit a Probe response frame 2053 by using a quasi-omni antenna on the basis of whether the Probe request frame 2001 received in step S202 includes the unicast address of another STA.

In another example, in the same manner as described above with reference to FIG. 16, the STA 200 determines whether to transmit a Probe response frame 2053 by using a quasi-omni antenna on the basis of the value of the QO TX field of the Probe request frame 2001 received in step S202.

In another example, in the same manner as described above with reference to FIG. 21, the STA 200 determines whether to transmit a Probe response frame 2053 by using a quasi-omni antenna on the basis of the Quasi-omni indicator of the Probe request frame 2001 received in step S202.

If, in step S204*e*, it is determined that the Probe response frame 2053 is transmitted by using the quasi-omni antenna, the STA 200 transmits the Probe response frame 2053 in step S205*e*. At this time, the Probe response frame 2053 includes a Quasi-omni TX field. If beam-forming training with the STA 100 is not completed, the STA 200 sets the value of the Quasi-omni TX field to 1 and transmits the Probe response frame 2053. However, unlike in FIG. 25, if beam-forming training with the STA 100 is completed, the STA 200 sets the value of the Quasi-omni TX field to 0 and transmits the Probe response frame 2053.

Figure 26:
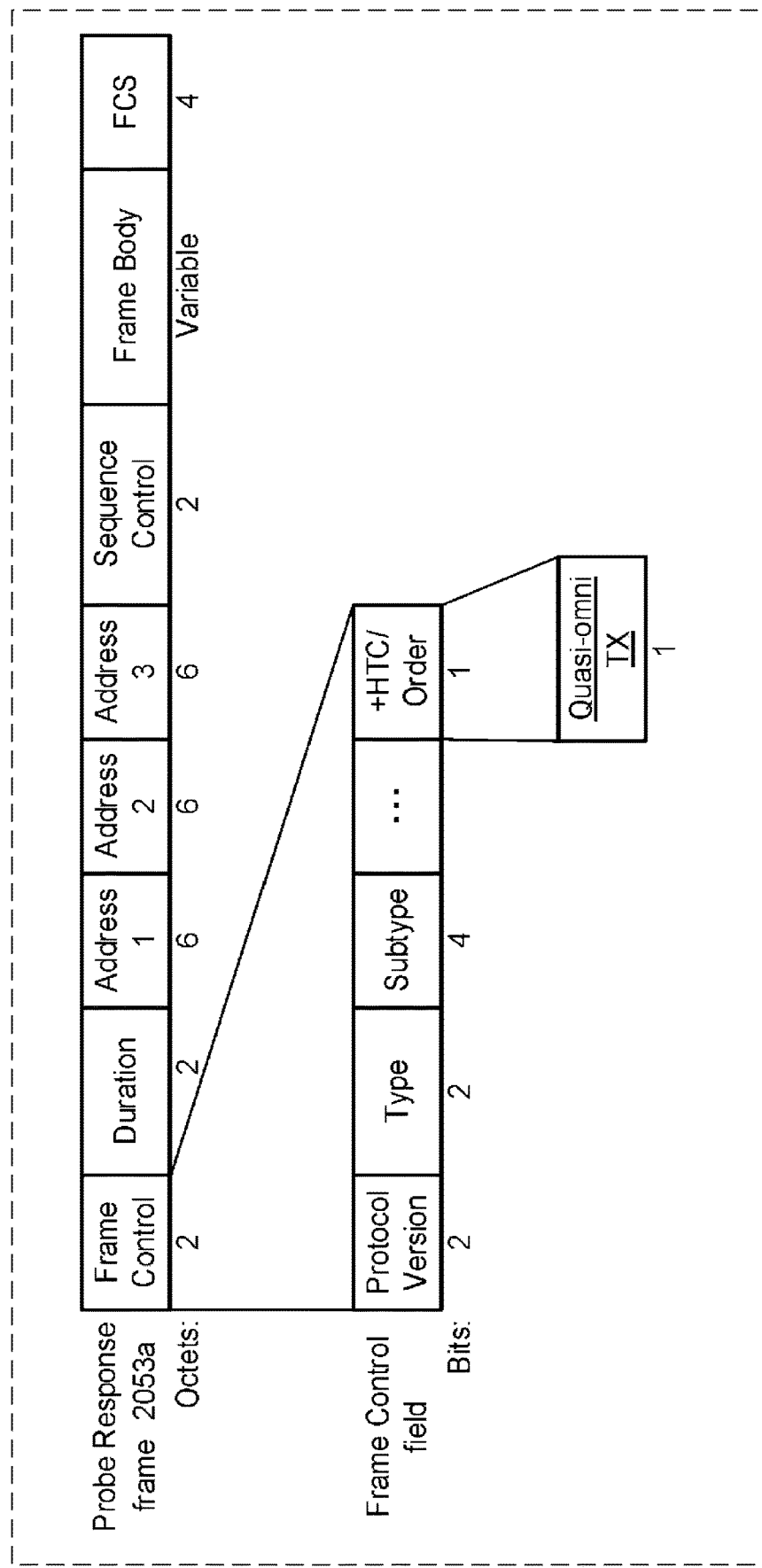
FIG. 26 is a diagram illustrating an example of the frame format of a Probe response frame according to Modification 2-5.

FIG. 26 is a diagram illustrating an example of a frame format 2053*a* of the Probe response frame 2053 according to Modification 2-5.

The fields of the frame format 2053*a* illustrated in FIG. 26 are similar to those of the frame format described above with reference to FIG. 17 except that the information in Frame Body is changed from the information in the Probe request frame to the information in the Probe response frame.

Figure 27:
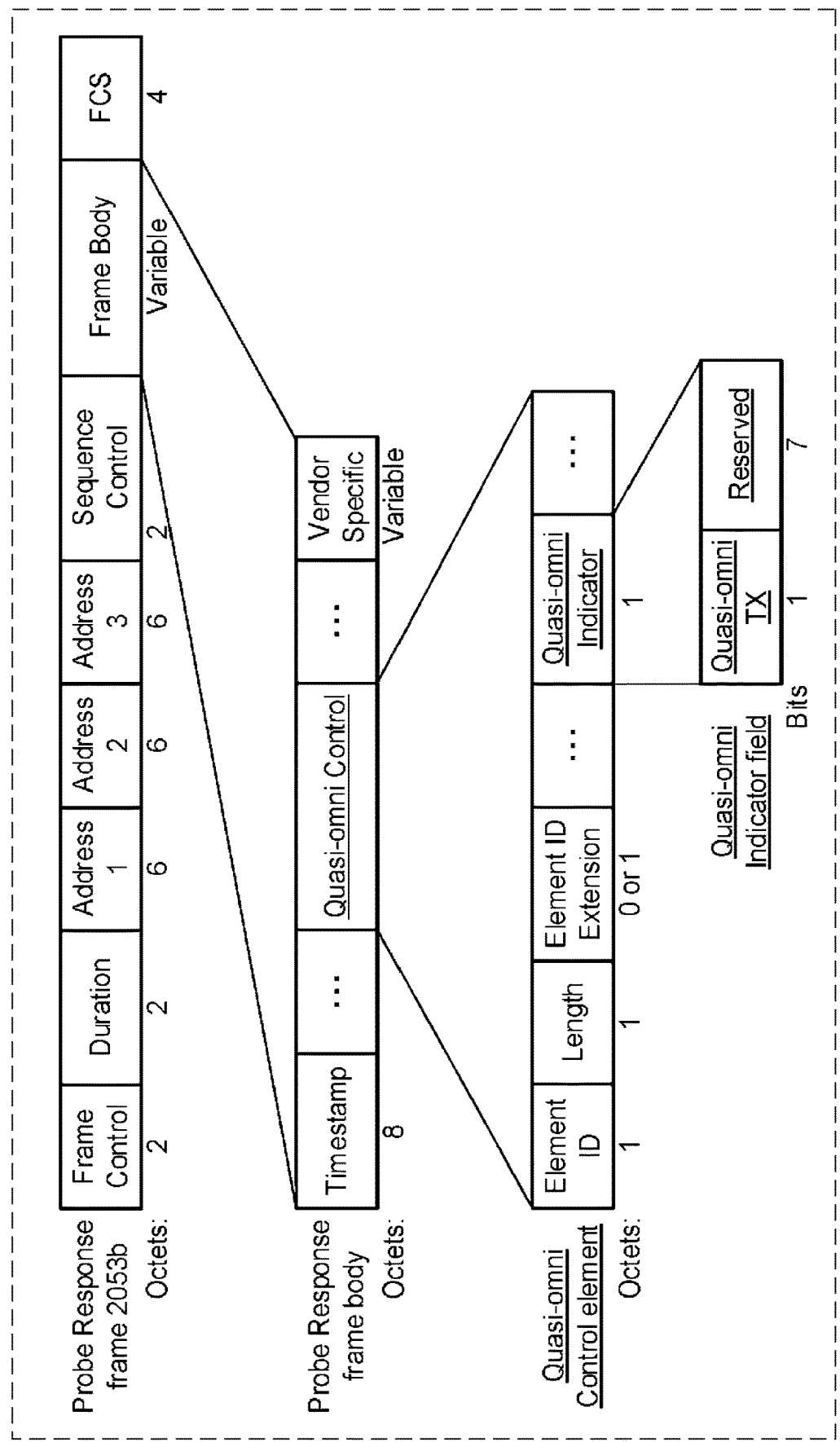
FIG. 27 is a diagram illustrating an example of another frame format of the Probe response frame according to Modification 2-5.

FIG. 27 is a diagram illustrating an example of another frame format 2053*b* of the Probe response frame 2053 according to Modification 2-5.

The fields of the frame format 2053*b* illustrated in FIG. 27 are similar to those of the frame format described above with reference to FIG. 18 except that the information in Frame Body is changed from the information in the Probe request frame to the information in the Probe response frame.

Figure 28:
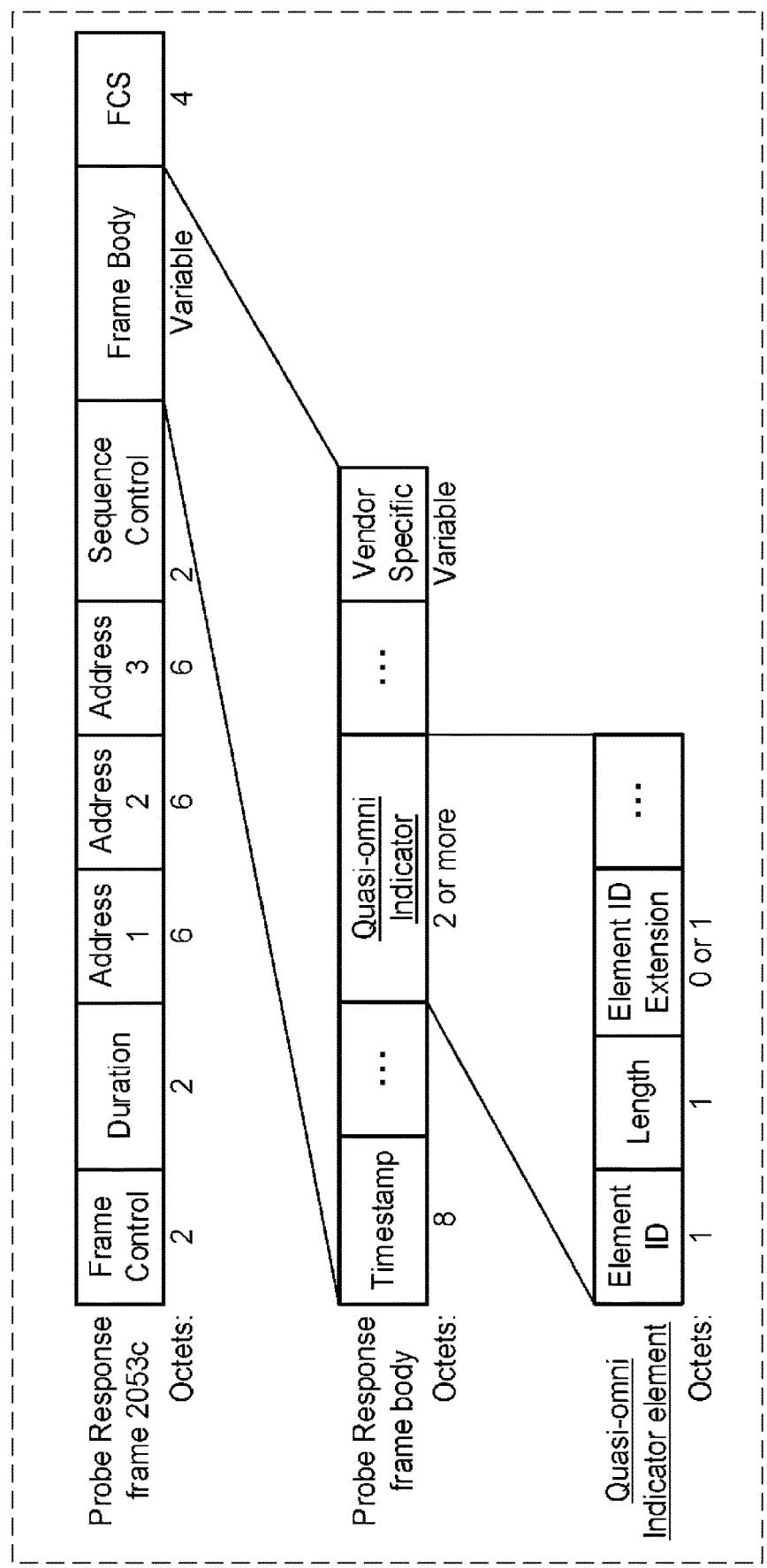
FIG. 28 is a diagram illustrating an example of another frame format of the Probe response frame according to Modification 2-5.

FIG. 28 is a diagram illustrating an example of another frame format 2053*c* of the Probe response frame 2053 according to Modification 2-5.

The fields of the frame format 2053*c* illustrated in FIG. 28 are similar to those of the frame format described above with reference to FIG. 19 except that the information in Frame Body is changed from the information in the Probe request frame to the information in the Probe response frame.

Referring again to FIG. 25, in step S207, the STA 100 receives the Probe response frame 2053. Subsequently, the STA 100 completes the discovery of the STA 200 in accordance with a procedure the same as that indicated by steps S208 to S209 illustrated in FIG. 16. Note that the value of the Quasi-omni TX field does not have influence on the procedure indicated by steps S206 to S209 illustrated in FIG. 16 and, thus, does not have influence on the procedure indicated by steps S206 to S209 illustrated in FIG. 25.

In contrast, if, in step S205*e*, the STA 200 transmits the Probe response frame 2053 by using a quasi-omni antenna, another STA (the STA 300) located at a proximity distance to the STA 200 also receives the Probe response frame 2053 in step S207*e*. The Probe response frame 2053 includes the Quasi-omni TX field.

In step S210*e*, the STA 300 checks the value in the Quasi-omni TX field of the received Probe response frame 2053. If the checked value in the Quasi-omni TX field is 1, the STA 300 determines that the STA 200 is located at a proximity distance and that communication is possible without performing beam-forming training. In this case, in step S211*e*, the STA 300 may transmit, for example, an association request frame 1005 to the STA 200 by using the quasi-omni antenna pattern to make initial connection. In step S212*e*, the STA 200 receives the association request frame 1005. Note that before transmitting the association request frame 1005, the STA 300 executes carrier sense and random backoff to obtain a transmission opportunity (TXOP, the right to initiate transmission).

Referring again to FIG. 20, the configuration of an STA 200 according to Modification 2-5 is described below.

The MAC frame generation circuit 112 combines the data of the Probe response frame F2 and the value F3 of the Quasi-omni TX field to generate a Probe response frame 2053 including the Quasi-omni TX field.

The sequencer circuit 106 has the functions described with reference to FIG. 7. In addition, the sequencer circuit 106 controls the selection circuit 108 such that the Quasi-omni TX field is included in the MAC frame when transmitting the Probe response frame 2053.

According to Modification 2-5, in step S205*e* illustrated in FIG. 25, the STA 200 transmits a Probe response frame 2053 including a Quasi-omni indicator. Thus, the STA 200 can determine whether communication is possible with an STA other than the STA 100 that receives the Probe response frame 2053 (for example, the STA 300) by using a quasi-omni antenna pattern (whether each of the STA 200 and the STA 300 is located at a proximity distance). Furthermore, the other STA (for example, STA 300) that is located at a proximity distance and that has received the Probe response frame 2053 can skip beam forming in the BTI and the A-BFT and complete the active scan before completing the beam forming.

In addition, upon receiving the Probe response frame 2053, the STA 300 can determine that the STA 200 is located at a proximity distance and, thus, the STA 300 can determine that the subsequent transmission of a frame using a quasi-omni antenna pattern is successful. Therefore, the STA 300 can start the initial connection and data communication with the STA 200 by using the quasi-omni antenna pattern. As a result, the time required for the initial connection can be reduced.

Note that instead of providing the Quasi-omni TX field, the STA 200 may provide the TX EIRP field and the Quasi-omni RX antenna gain field illustrated in FIG. 21 in the Probe response frame 2053. Thereafter, the STA 200 may transmit the Probe response frame 2053. Like Modification 2-4 described above with reference to FIG. 21, the TX EIRP field and the Quasi-omni RX antenna gain field can be used instead of the Quasi-omni TX field to determine whether the STA 200 is located in a proximity distance. Thus, the accuracy of the determination can be increased.

Second Embodiment—Scenario 2

Figure 29:
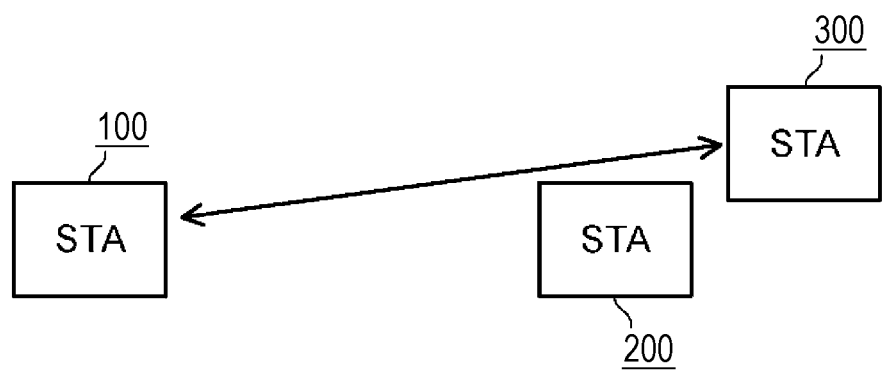
FIG. 29 is a diagram illustrating an example of the overall configuration according to scenario 2 of the second embodiment.

FIG. 29 is a diagram illustrating an example of the overall configuration according to scenario 2 of the second embodiment.

The STA 100 is an active scan STA. The STAs 200 and 300 are connection destination STAs. Each of the STAs 200 and 300 is, for example, a PCP/AP STA, but may be a non-PCP/AP STA, a non-PCP STA, or a non-AP. Furthermore, the STA 100 is, for example, a wireless terminal device. The STAs 200 and 300 are, for example, wireless base station devices.

Figure 30:
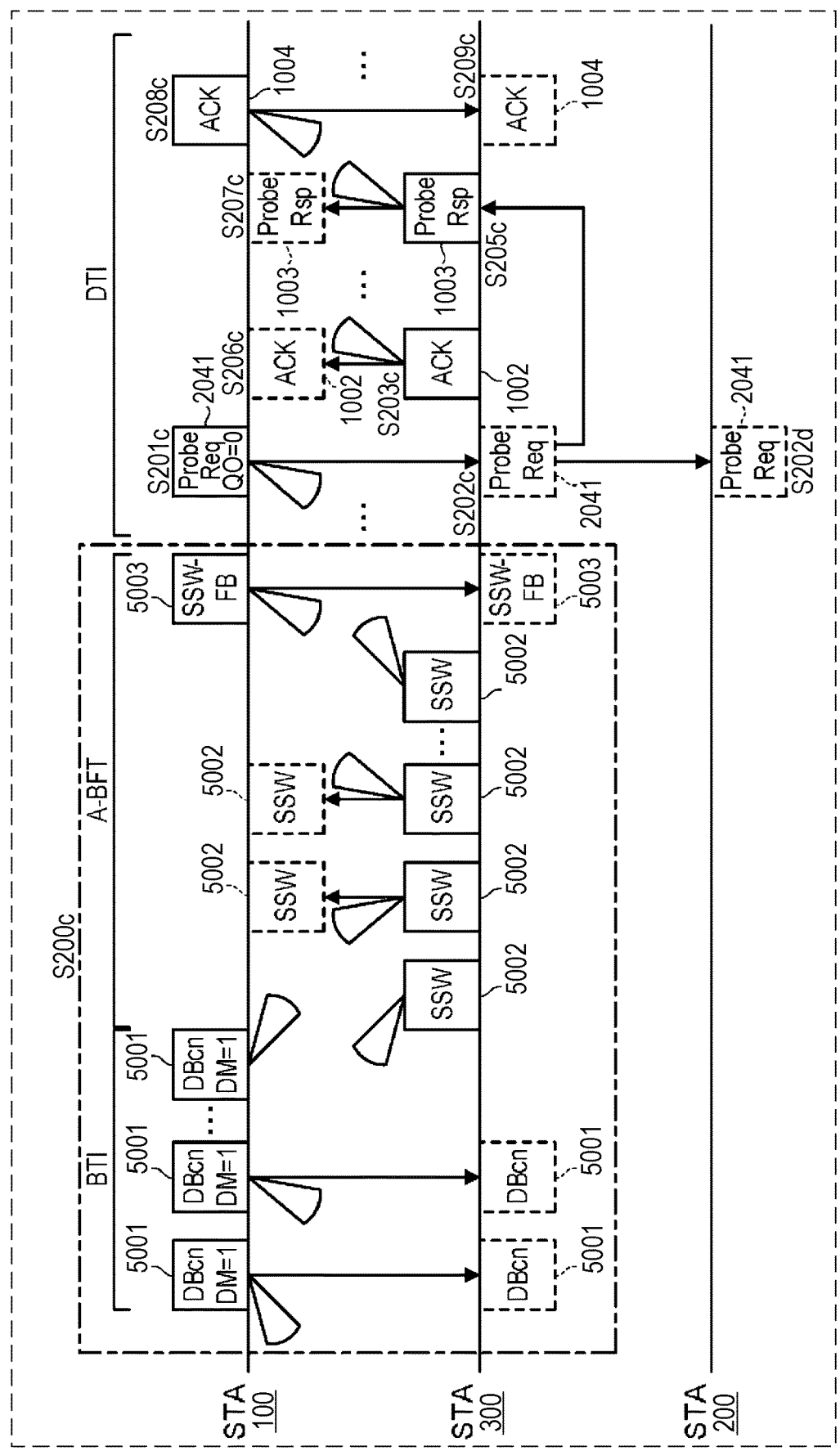
FIG. 30 is a diagram illustrating an example of the procedure by which an STA performs discovery of other STAs.

FIG. 30 is a diagram illustrating an example of the procedure by which the STA 100 performs discovery of other STAs 200 and 300.

In scenario 1 of the second embodiment, the STA 100 receives the ACK frame 1002 and the Probe response frame 1003 in steps S203 and S206 illustrated in FIG. 16, respectively.

In contrast, the case (scenario 2) is described below in which the STA 100 does not receive the ACK frame 1002 and the Probe response frame 1003 in step S203 and step S206 illustrated in FIG. 16, respectively, according to the second embodiment. In this case, the STA 100 may determine that a connection destination STA is not present at a nearby position in the currently used wireless channel and may perform beam-forming training in the BTI and the A-BFT.

The procedure by which the STA 100 performs beam-forming training with the STA 300 and, thereafter, completes discovery of the STA 300 is described below.

Referring to FIG. 30, in step S200*c*, the STA 100 performs beam-forming training in the BTI and the A-BFT. For example, upon receiving an SSW-FB frame 5003 from the STA 300, the STA 100 completes the beam-forming training with the STA 300.

After completion of the beam-forming training with the STA 300, the STA 100 sets the RA field to the unicast address indicating the STA 300, sets the value in the Quasi-omni TX field to 0, and transmits the Probe request frame 2041 by using the beam forming directional antenna pattern in step S201c.

In step S202c, upon receiving the Probe request frame 2041, the STA 300 sets the transmitting antenna array 116 to the best sector on the basis of the best sector information for the transmitting antenna array 116 included in the SSW-FB frame 5003 received in the A-BFT.

In step S203c, the STA 300 transmits an ACK frame 1002. Subsequently, in step S205c, the STA 300 transmits the Probe response frame 1003 to the STA 100.

In step S206c, the STA 100 determines whether the ACK frame 1002 has been received from the STA 300. In step S207c, the STA 100 determines whether the Probe response frame 1003 including the discovery information has been received from the STA 300.

If, in step S206c, the STA 100 determines that it has received the ACK frame 1002 and if, in step S207c, the STA 100 determines that it has received the Probe response frame 1003, the STA 100 sets the transmitting antenna array 116 to the best sector on the basis of the best sector information for the transmitting antenna array 116 included in the SSW-FB frame 5003 received in the A-BFT. Subsequently, in step S208c, the STA 100 transmits the ACK frame 1004. In step S209c, the STA 300 receives the ACK frame 1004. Thus, the STA 100 completes the discovery of the STA 300.

In contrast, when the STA (for example, the STA 200) that does not complete the beam-forming in the BTI and the A-BFT receives the Probe request frame 1041 in step S202d, the STA does not transmit the ACK frame 1002 and the Probe response frame 1003 since the address in the RA field differs from the unicast address of the STA 200.

In one example, upon executing an application using communication in proximity, the STA 200 does not transmit the Probe response frame 1003 even when it receives the Probe request frame 2041 in which the value of the Quasi-omni TX field is set to 0.

Second Embodiment—Scenario 3

Figure 31:
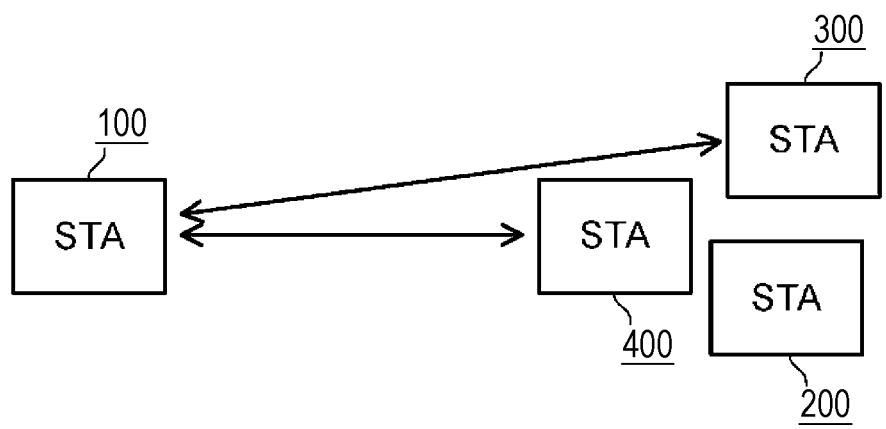
FIG. 31 is a diagram illustrating an example of the overall configuration according to scenario 3 of the second embodiment.

FIG. 31 is a diagram illustrating an example of the overall configuration according to scenario 3 of the second embodiment.

The STA 100 is an active scan STA. The STAs 200, 300, and 400 are connection destination STAs. Each of the STAs 200, 300, and 400 is, for example, a PCP/AP STA, but may be a non-PCP/AP STA, a non-PCP STA, or a non-AP. Furthermore, the STA 100 is, for example, a wireless terminal device. The STAs 200, 300, and 400 are, for example, wireless base station devices.

A situation is described below in which another STA (for example, the STA 400) has completed beam-forming training with the STA 100 and is located in a direction the same as the direction of the STA 300 from the STA 100. In this situation, the STA 400 may be able to receive the Probe request frame 2041 transmitted from the STA 100 by using the best sector for transmission to the STA 300. In this case, the STA 100 may set the destination of the Probe request frame 2041 to the broadcast address.

Figure 32:
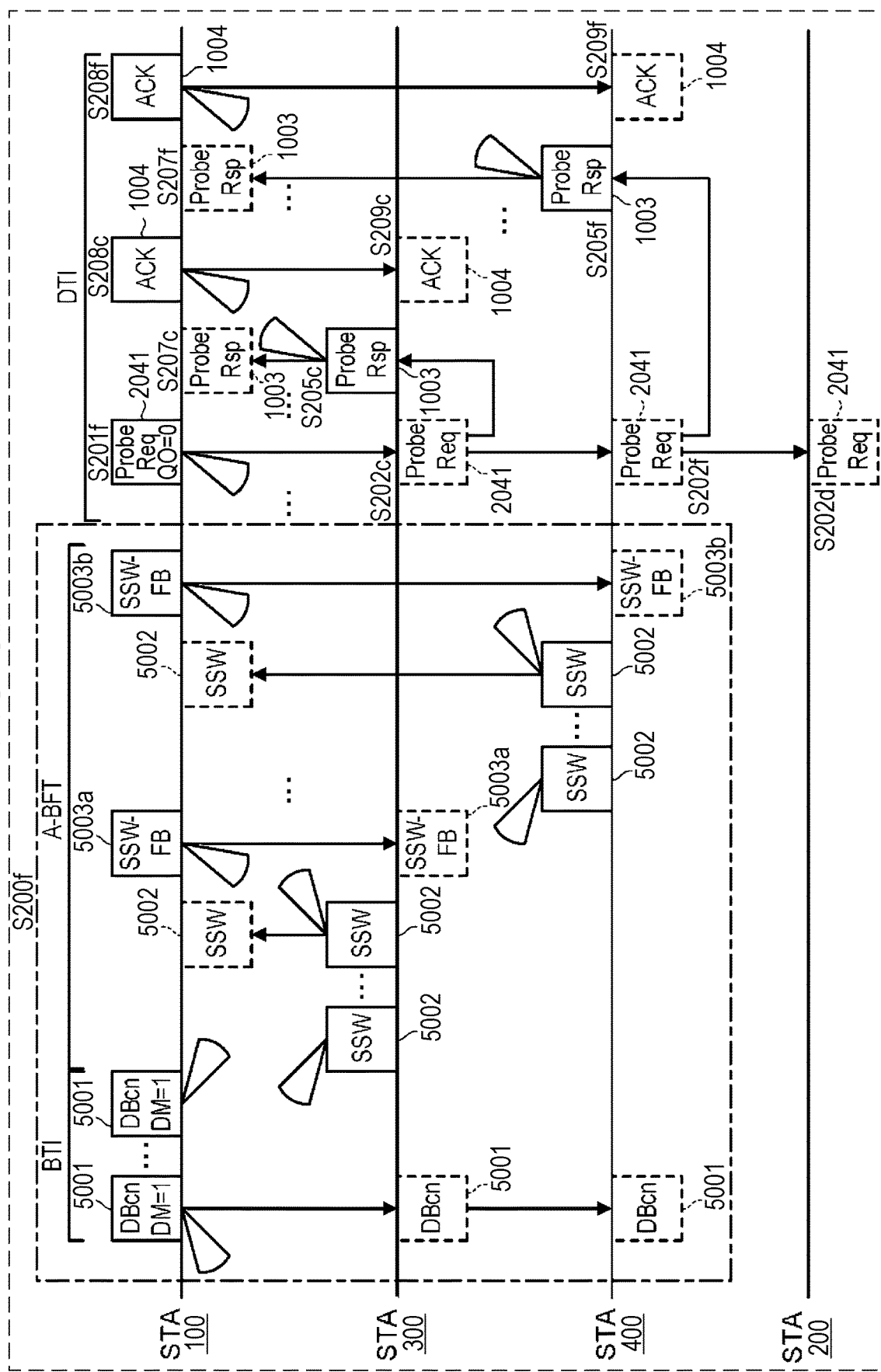
FIG. 32 is a diagram illustrating an example of the procedure by which an STA performs discovery of another STA.

FIG. 32 is a diagram illustrating an example of the procedure by which the STA 100 performs discovery of other STAs 200, 300, and 400.

In step S200f, the STA 100 performs beam-forming training in the BTI and the A-BFT. For example, if the STA 300 receives an SSW-FB frame 5003a from the STA 100, the STA 100 completes the beam-forming training with the STA 300. In addition, for example, if the STA 400 receives an SSW-FB frame 5003b from the STA 100, the STA 100 completes the beam-forming training with the STA 400.

After completing the beam-forming training with each of the STA 300 and the STA 400, the STA 100 completes the discovery of the STA 300 in steps S201c to S209c in the same manner as described above with reference to FIG. 30.

In addition, since beam-forming training has been completed with the STA 100, the STA 400 can receive the Probe request frame 2041 in which the value of the Quasi-omni TX field is set to 0 in step S202f. The STA 100 completes the discovery of the STA 400 by executing the procedure indicated by steps S202f to S209f in the same manner as indicated by the steps S202c to S209c.

In contrast, upon receiving the probe request frame 2041 in step S202d, an STA (for example, the STA 200) that does not complete the beam forming in the BTI and the A-BFT does not transmit the ACK frame 1002 and the Probe response frame 1003, since the address in the RA field differs from the unicast address of the STA 200.

According to scenario 3 of the second embodiment, the STA 100 transmits a Probe request frame 2041 having a broadcast address set therein. In this manner, the STA 100 can receive probe responses from a plurality of connection destination STAs (for example, STAs 300 and STAs 400) without using individual channels and device resources. Thus, the time required for discovery can be reduced. In addition, upon executing an application using communication in proximity, the STA 200 does not transmit the Probe response frame 1003 even when the STA 200 receives the Probe request frame 2041 in which the value of the Quasi-omni TX field is set to 0. As a result, the occurrence of an unnecessary interference signal can be reduced.

Third Embodiment

Figure 33:
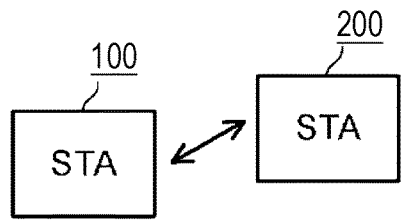
FIG. 33 is a diagram illustrating an example of the overall configuration according to a third embodiment.

FIG. 33 is a diagram illustrating an example of the overall configuration according to the third embodiment.

The STA 100 is an active scan STA. The STA 200 is a connection destination STA. The STA 200 is, for example, a PCP/AP STA. However, the STA 200 may be a non-PCP/AP STA, a non-PCP STA, or a non-AP. In addition, the STA 100 is, for example, a wireless terminal device. The STA 200 is, for example, a wireless base station device.

According to the first embodiment, the STA 100 is an STA that performs discovery. In contrast, the STA 100 is an STA that makes initial connection. The STA 200 is a connection destination STA. The STA 200 is, for example, a PCP/AP STA. However, the STA 200 may be a non-PCP/AP STA, a non-PCP STA, or a non-AP.

Figure 34:
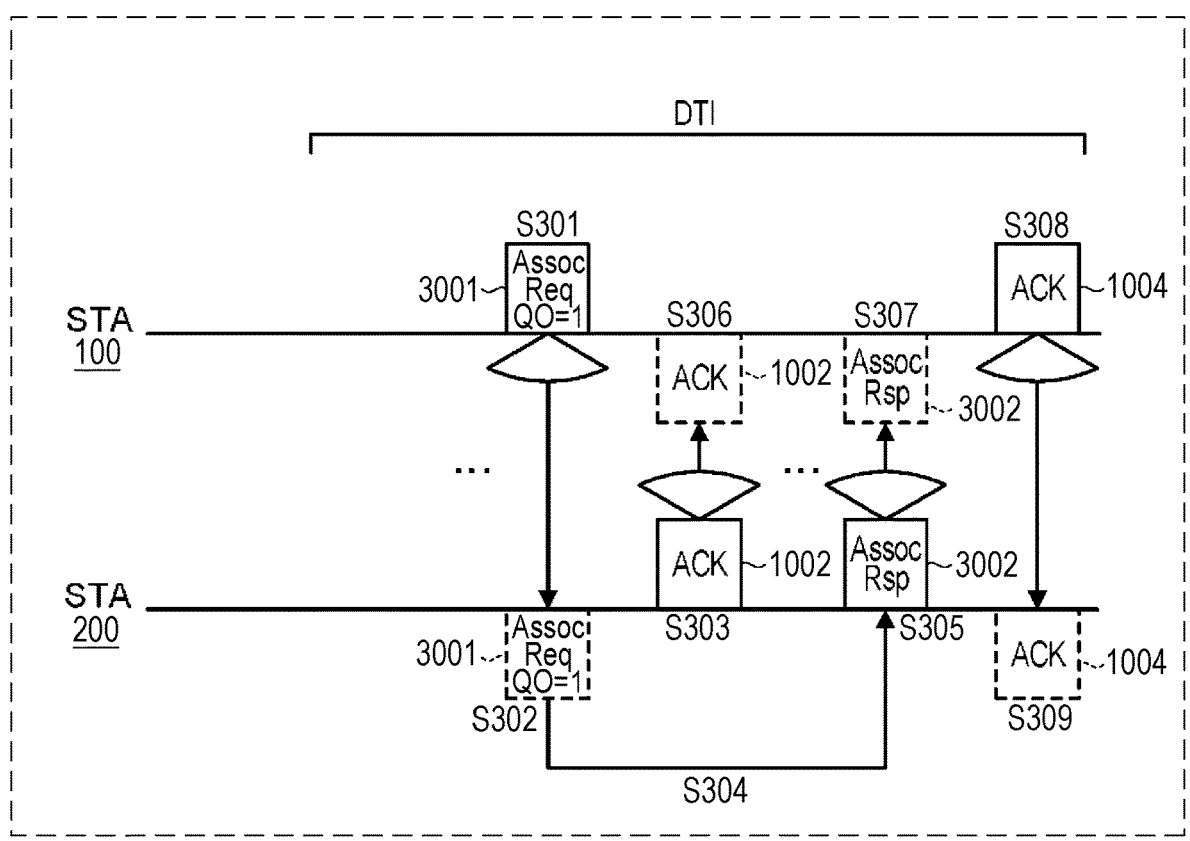
FIG. 34 is a diagram illustrating an example of the procedure by which an STA makes initial connection with another STA according to the third embodiment.

FIG. 34 is a diagram illustrating an example of the procedure by which the STA 100 makes initial connection with another STA 200 according to the third embodiment.

The STA 100 is, for example, a wireless terminal device. The STA 200 is, for example, a wireless base station device.

Steps S301 to S304 illustrated in FIG. 34 are similar to steps S201 to S204 illustrated in FIG. 16, respectively, except that an association request frame 3001 is used instead of the Probe request frame 2001 illustrated in FIG. 16. Accordingly, description of the steps is not repeated.

In step S305, if the STA 200 has not completed beamforming training with the STA 100, the STA 200 transmits an association response frame 3002 by using a quasi-omni antenna pattern in order to send the result of examination of an association request.

In step S306, the STA 100 determines whether the ACK frame 1002 has been received from the STA 200. In step S307, the STA 100 determines whether the association response frame 3002 has been received from the STA 200.

If, in step S306, the STA 100 determines that the ACK frame 1002 has been received and if, in step S307, the STA 100 determines that the association response frame 3002 has been received, the STA 100 responds by transmitting the ACK frame 1004 by using the quasi-omni antenna pattern in step S308. Subsequently, in step S309, the STA 200 receives the ACK frame 1004. In this manner, the STA 100 and the STA 200 complete the association.

Figure 35:
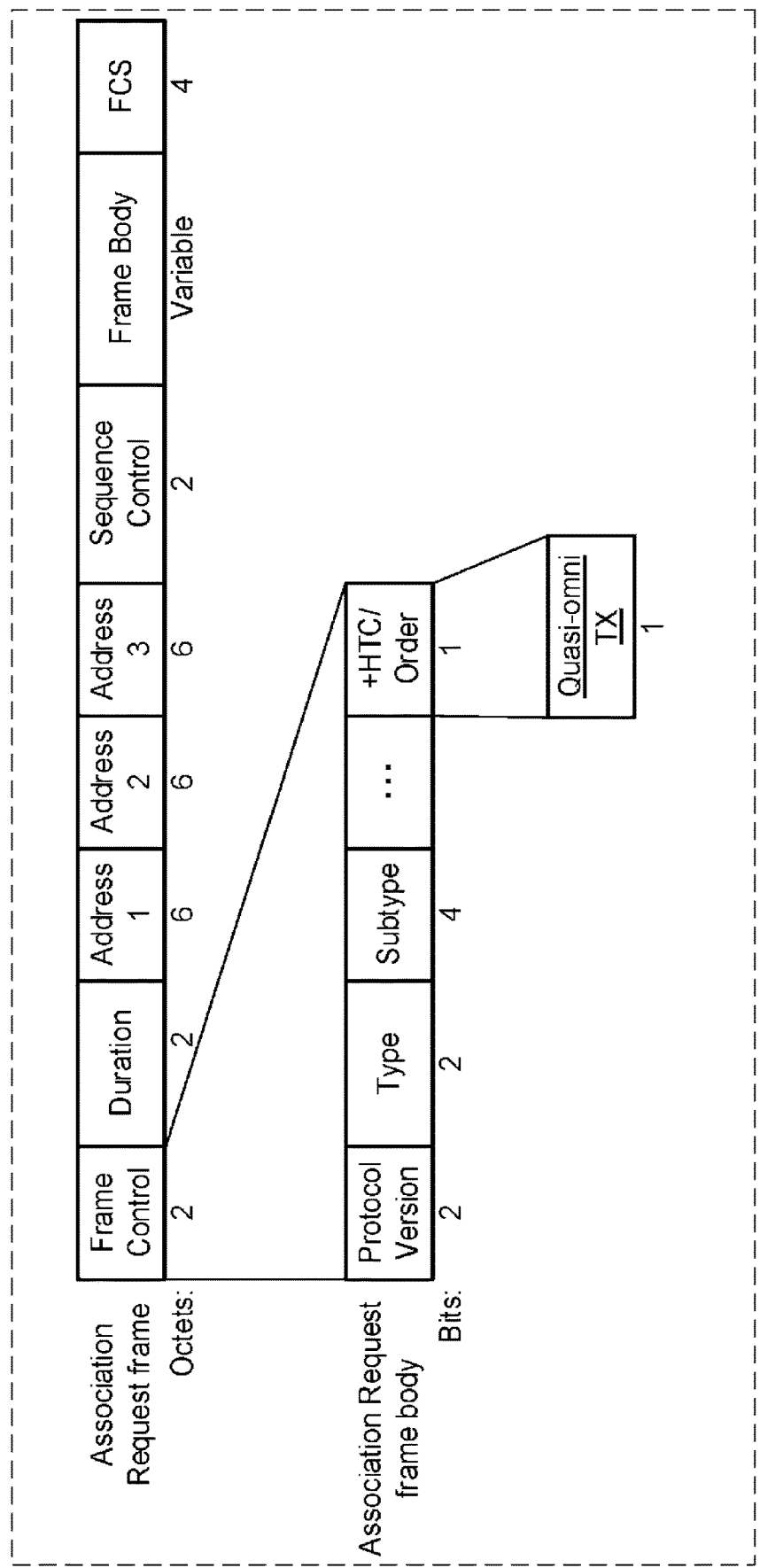
FIG. 35 is a diagram illustrating an example of the format of an association request frame including a field indicating a quasi-omni transmit pattern according to the third embodiment.

FIG. 35 is a diagram illustrating an example of the format of an association request frame 3001 including a QO TX field indicating a quasi-omni transmit pattern according to the third embodiment.

The fields of the format illustrated in FIG. 35 are the same as those of the format of the Probe request frame 2001 illustrated in FIG. 17. Accordingly, description of the fields is not repeated.

Figure 36:
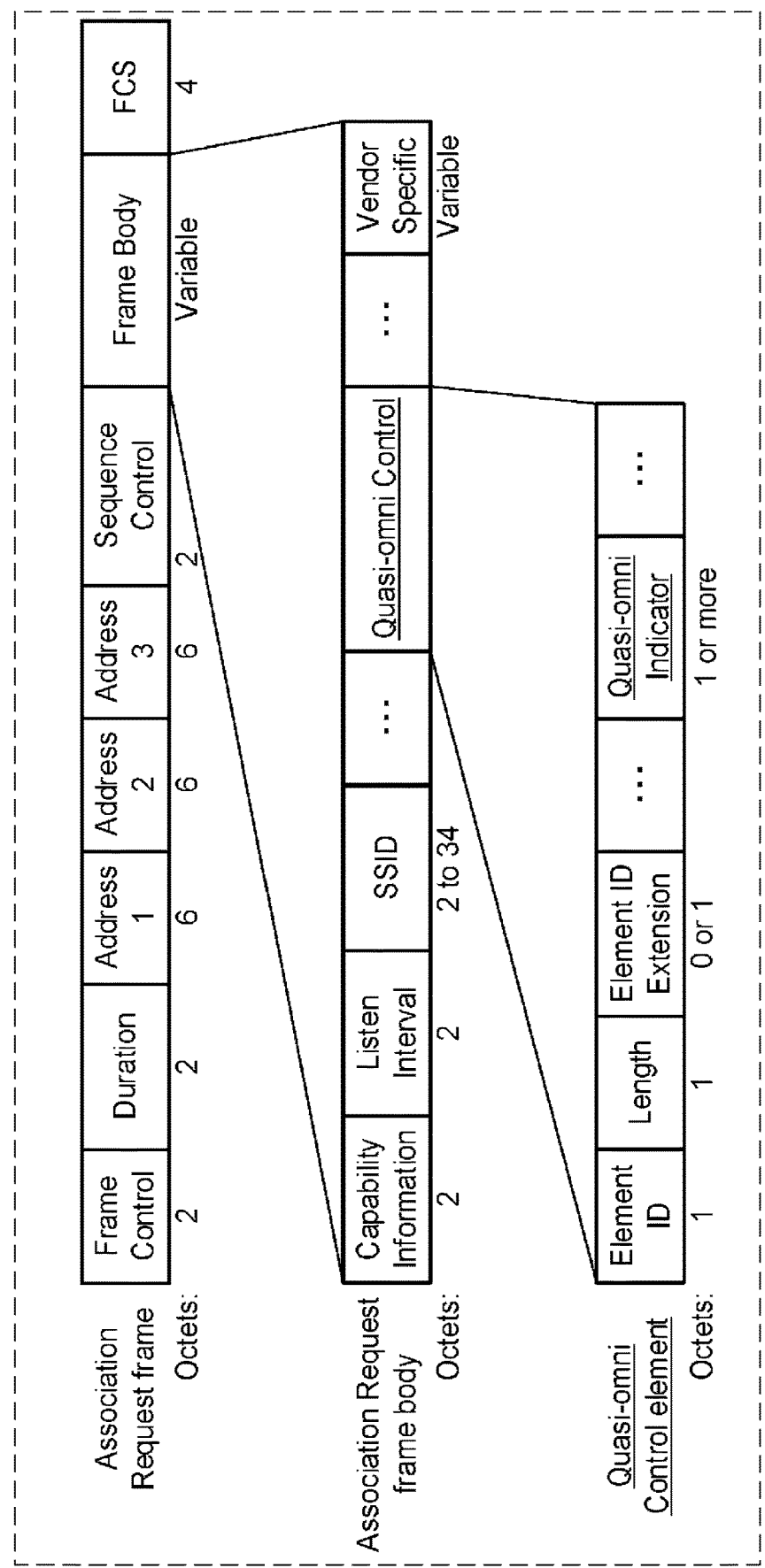
FIG. 36 is a diagram illustrating an example of the format of an association request frame including a field indicating a quasi-omni transmit pattern according to the third embodiment.

FIG. 36 is a diagram illustrating an example of the format of an association request frame 3001 including a QO indicator field indicating a quasi-omni transmit pattern according to the third embodiment.

The fields of the format illustrated in FIG. 36 are the same as those of the format of the Probe request frame 2001 illustrated in FIG. 18. Accordingly, description of the fields is not repeated.

Figure 37:
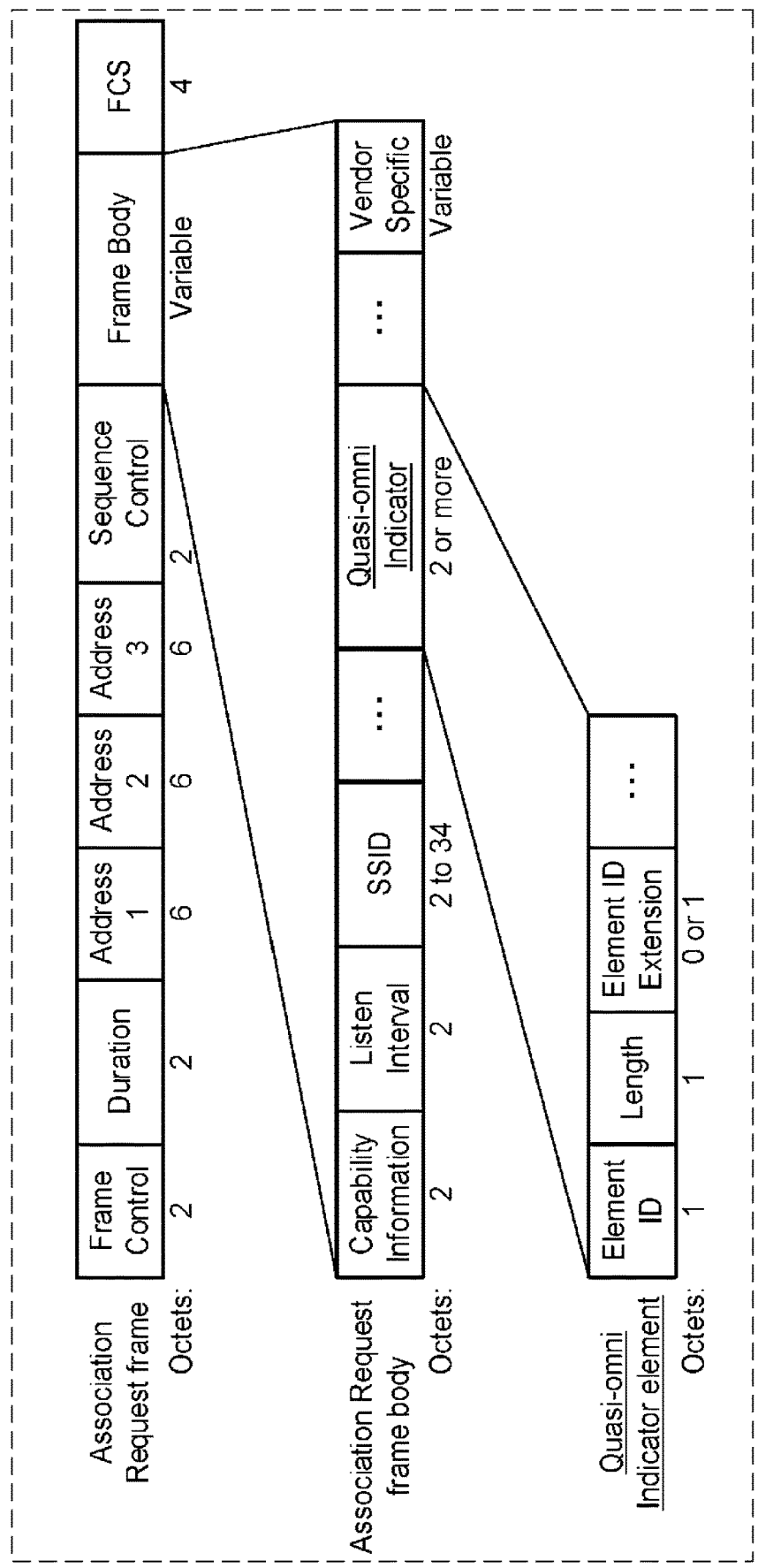
FIG. 37 is a diagram illustrating an example of the format of an association request frame indicating a quasi-omni transmit pattern according to the third embodiment.

FIG. 37 is a diagram illustrating an example of the format of an association request frame 3001 indicating a quasi-omni transmit pattern according to the third embodiment.

The fields of the format illustrated in FIG. 37 are the same as those of the format of the Probe request frame 2001 illustrated in FIG. 19. Accordingly, description of the fields is not repeated.

Figure 38:
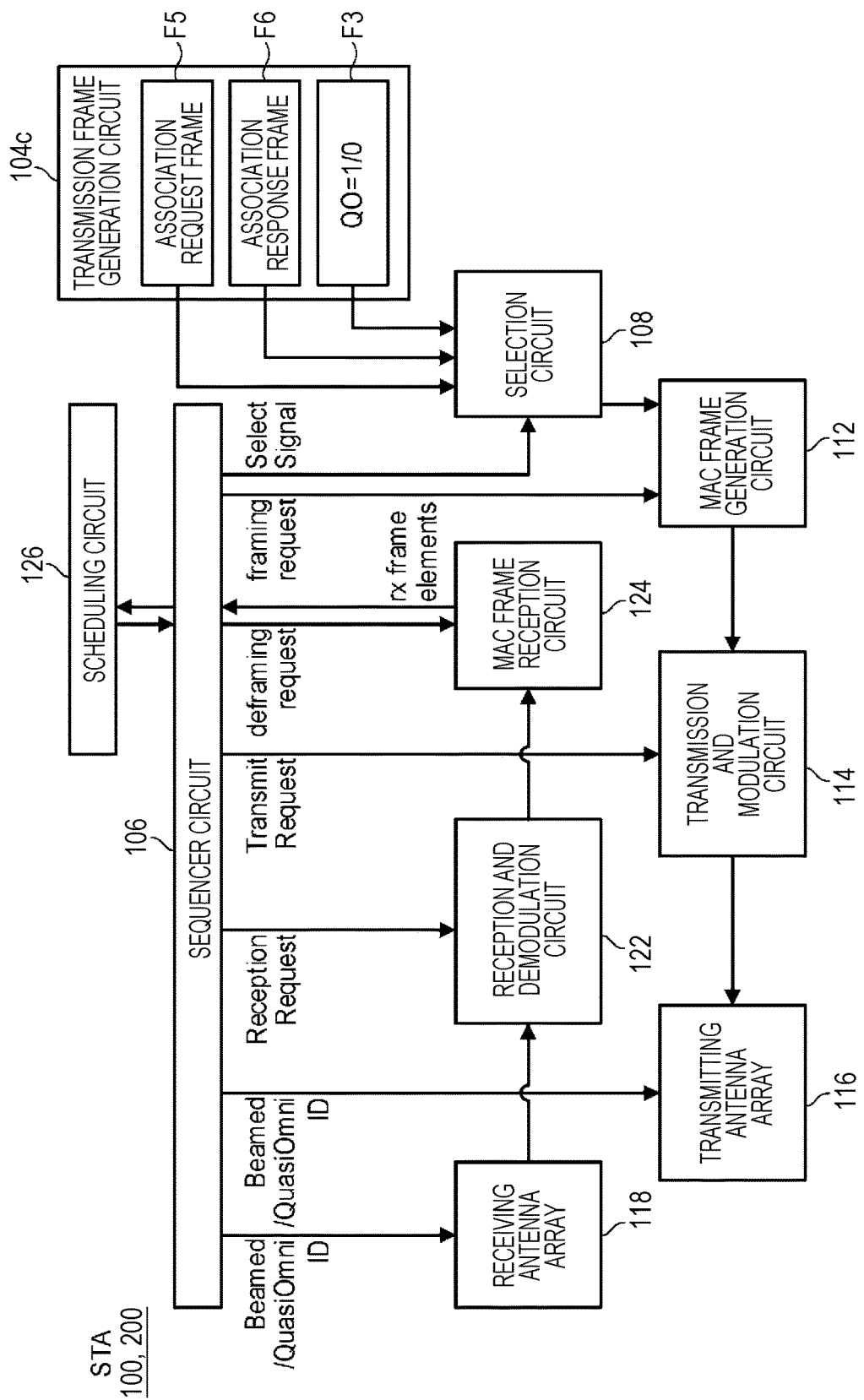
FIG. 38 is a diagram illustrating an example of the configuration of STAs according to the third embodiment.

FIG. 38 is a diagram illustrating an example of the configuration of STAs 100 and 200 according to the third embodiment.

The transmission frame generation circuit 104c generates the value F3 of the Quasi-omni TX field in addition to an association request frame F5 and an association response frame F6 illustrated in FIG. 38 and outputs the data to the selection circuit 108.

The MAC frame generation circuit 112 combines the data of the association request frame F5 with the value F3 of the Quasi-omni TX field to generate MAC frame data including the association request frame F5.

The sequencer circuit 106 determines whether to transmit the association request frame 3001 by using the quasi-omni antenna pattern. When performing transmission by using the quasi-omni antenna pattern, the sequencer circuit 106 sets up the scheduling circuit 126 so that the scheduling circuit 126 determines the transmission timing and sets up the selection circuit 108 so that the selection circuit 108 selects the data of the association request frame 3001.

Subsequently, the sequencer circuit 106 sets up the MAC frame generation circuit 112 so that the MAC frame generation circuit 112 generates a MAC frame of the association request frame and sets up a parameter (for example, MCS) used by the transmission and modulation circuit 114 to transmit the PHY packet including the association request frame 3001 in accordance with the transmission timing determined by the scheduling circuit 126. In addition, the sequencer circuit 106 sets up the transmitting antenna array 116 so that the transmitting antenna array 116 has a quasi-omni antenna pattern.

Furthermore, the sequencer circuit 106 performs processing on the received association request frame 3001 and the association response frame 3002. For example, the sequencer circuit 106 of the STA 100 determines whether the RA field of the received frame indicates the unicast address of the STA 100 and determines whether an ACK is to be transmitted.

The other constituent elements illustrated in FIG. 38 are the same as those described above with reference to FIG. 7, and description of the constituent elements is not repeated.

According to the third embodiment, the STA 100 that has not completed the association can connect to the nearby STA 200 at high speed without the overhead of the BTI and the A-BFT. The association may be identified as a candidate link for a short range communication application, such as a kiosk download. When transmitting the association response frame 3002 by using a quasi-omni antenna pattern, the STA 200 can determine whether the association response frame 3002 reaches the STA 100 by using the Quasi-omni indicator. The Quasi-omni indicator can also indicate whether a high-speed link setup for short range communication is required.

Modification 3-1

Like Modification 2-1 of the second embodiment, Modification 3-1 can be made to the third embodiment.

In step S302 illustrated in FIG. 34, in addition to receiving the association request frame 3001, the STA 200 may measure the reception quality (for example, RSSI, SINR) of the association request frame 3001.

In step S304, in addition to checking the value of the Quasi-omni TX field of the received association request frame 3001, the STA 200 may determine whether the value indicating the reception quality of the association request frame 3001 exceeds a predetermined threshold value.

If the value of the Quasi-omni TX field checked in step S304 is 1 and the value indicating the reception quality exceeds the threshold value, the STA 200 uses the quasi-omni antenna pattern and transmits the association response frame 3002 in step S305. However, if the value indicating the reception quality is lower than the threshold value although the value of the Quasi-omni TX field checked in step S304 is 1, the STA 200 may determine that the STA 100 is not suitable for communication using the quasi-omni antenna pattern (communication in proximity) and may stop transmission of the association response frame 3002 in step S305.

However, unlike in FIG. 34, if the value in the Quasi-omni TX field checked in step S304 is 0, the STA 200 may determine that the STA 100 does not perform communication in proximity. Thus, in step S305, the STA 200 may set the transmitting antenna array 116 to the best sector for transmission to the STA indicated by the transmission source address of the association request frame 3001 (for example, the STA 100), regardless of the reception quality. Thereafter, the STA 200 transmits the association response frame 3002.

The other steps S301, S303, and S306 to S309 are the same as those of the third embodiment, and description of the steps is not repeated.

According to Modification 3-1, the effects of the third embodiment and the effects of Modification 2-1 can be obtained at the same time.

Modification 3-1-1

Like Modification 2-1-1 of the second embodiment, Modification 3-1-1 can be made to the third embodiment.

In step S303 illustrated in FIG. 34, the STA 200 may set a value indicating the reception quality (RSSI or SINR) in the header of the PHY packet including the ACK frame 1002 and transmit the PHY packet. Furthermore, the STA 200 may determine whether to transmit the association response frame 3002 in step S305 on the basis of the value indicating the reception quality.

According to Modification 3-1-1, the effects of the third embodiment and the effects of Modification 2-1-1 can be obtained.

Modification 3-2

Like Modification 2-2 of the second embodiment, Modification 3-2 can be made to the third embodiment.

Unlike in FIG. 34, in step S301, the STA 100 may transmit the association request frame 3001 having the TRN-R field added thereto by using the quasi-omni antenna pattern.

Unlike in FIG. 34, in step S302, the STA 200 receives the association request frame 3001 having the TRN-R field added thereto. Like Modification 2-2, the STA 200 may perform beam-forming training by measuring the reception quality of each of the receiving antenna sectors and determine the best sector of the receiving antenna array 118 of the STA 200 to communicate with the STA 100. If the STA 200 has the antenna pattern reciprocity, the STA 200 may determine the best sector of the transmitting antenna array 116 on the basis of the determined best sector of the receiving antenna array 118.

Unlike in FIG. 34, in step S303, the STA 200 may transmit the ACK frame 1002 by using the best sector of the transmitting antenna array 116 determined in reception of the association request frame 3001 having the TRN-R field added thereto.

Unlike in FIG. 34, in step S305, the STA 200 may transmit the association response frame 3002 by using the best sector of the transmitting antenna array 116 determined in reception of the association request frame 3001 having the TRN-R field added thereto.

The other step S304 and steps S306 to S309 are the same as those in the third embodiment, and description of the steps is not repeated.

According to Modification 3-2, the effect of the third embodiment and the effects of Modification 2-2 can be obtained at the same time.

Modification 3-3

Like Modification 2-3 of the second embodiment, Modification 3-3 can be made to the third embodiment.

Unlike in FIG. 34, upon receiving the association request frame 3001 from an STA (for example, the STA 100) that has not completed the beam-forming training in step S302, the STA 200 may transmit the association response frame 3002 having the TRN-R field added thereto in step S305.

Unlike in FIG. 34, in step S307, upon receiving the association response frame 3002 having the TRN-R field added thereto, the STA 100 may measure the reception quality while switching the receiving antenna sector for each of the TRN-R subfields and perform reception beam-forming training. Thus, the STA 100 may determine the best sector of the receiving antenna array 118.

When the STA 100 includes the antenna pattern reciprocity City, the STA 100 may determine the best sector of the transmitting antenna array 116 used for subsequent transmission on the basis of the reception quality for each of the TRN-R subfields.

Unlike in FIG. 34, in step S308, the STA 100 may transmit the ACK frame 1004 by using the determined best sector of the transmitting antenna array 116. In step S309, the STA 200 receives the ACK frame 1004.

The other step S301, steps S303 to S304, and step S306 are the same as those in the third embodiment, and description of the steps is not repeated.

According to Modification 3-3, the effects of the third embodiment and the effects of Modification 2-3 can be obtained at the same time.

Note that unlike in FIG. 34, when the value of the Quasi-omni TX field of the association request frame 3001 received in step S302 is 0, the STA 200 may transmit the association response frame 3002 without adding the TRN-R field to the association response frame 3002 in step S305.

Modification 3-4

Like Modification 2-4 of the second embodiment, Modification 3-4 can be made to the third embodiment.

Unlike in FIG. 34, in step S301, the STA 100 may add, to the association request frame 3001, information about the transmission power (EIRP: equivalent isotropically radiated power) and the receive antenna gain of the quasi-omni antenna. Thereafter, the STA 100 may transmit the association request frame 3001.

Figure 39:
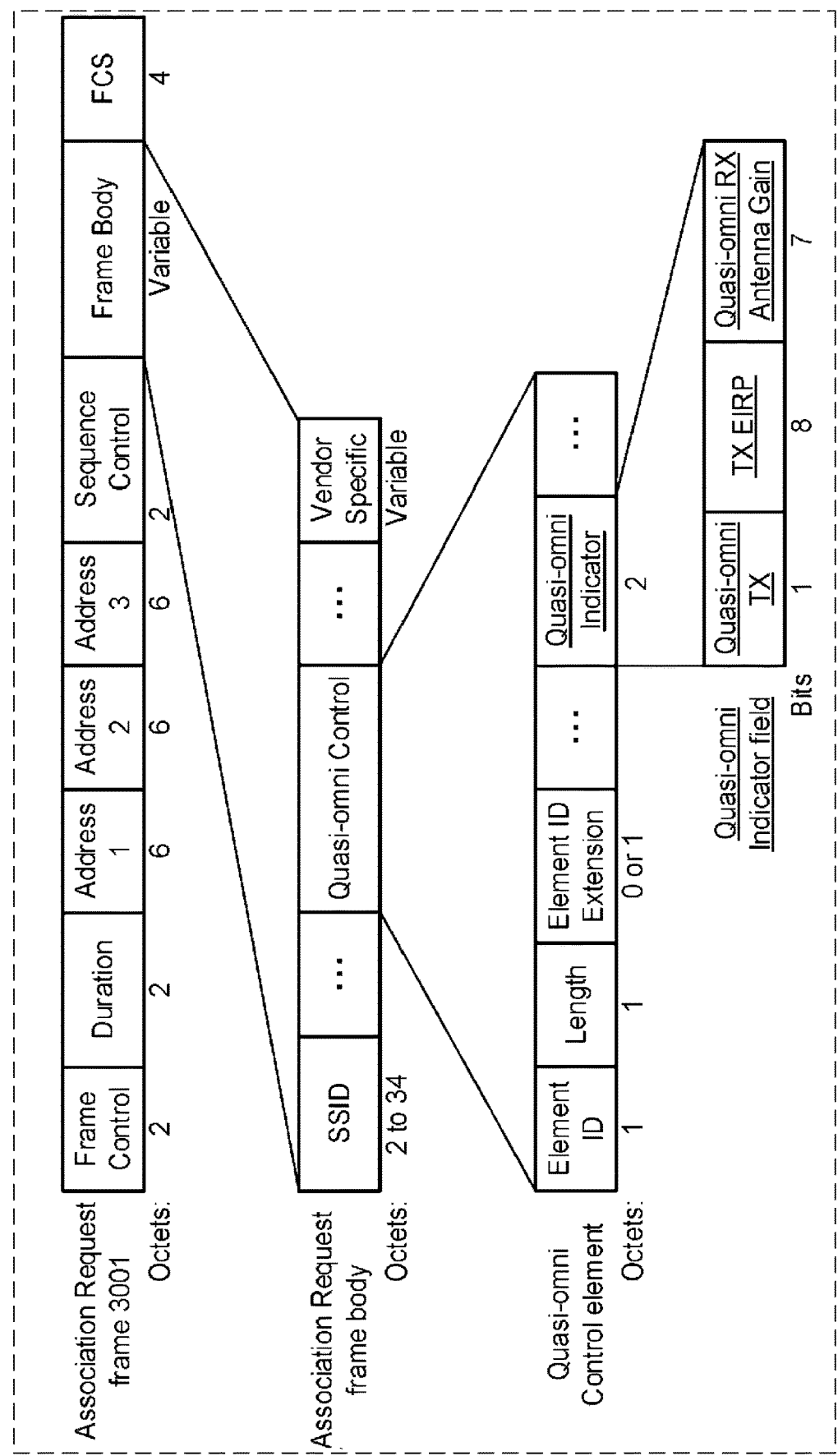
FIG. 39 is a diagram illustrating an example of the format of an association request frame according to Modification 3-4.

FIG. 39 is a diagram illustrating an example of the format of an association request frame 3001 according to Modification 3-4.

FIG. 39 is similar to FIG. 21 except that the format illustrated in FIG. 21 is the format of the Probe request frame 2041, whereas the format illustrated in FIG. 39 is the format of the association request frame 3001. Accordingly, description of FIG. 39 is not repeated.

Figure 40:
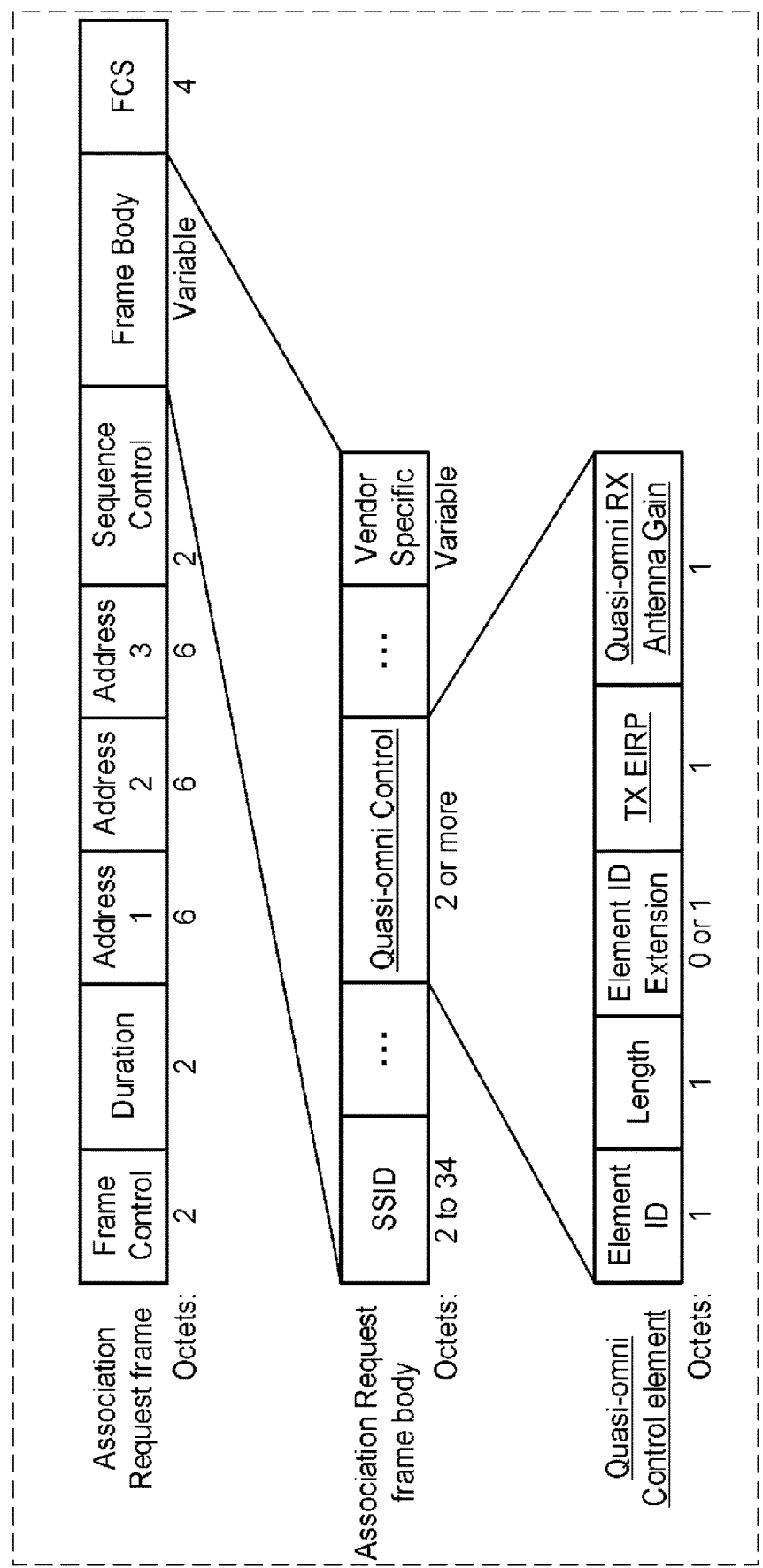
FIG. 40 is a diagram illustrating an example of a Quasi-omni Control element according to Modification 3-4.

FIG. 40 is a diagram illustrating an example of an association request frame including a Quasi-omni Control element according to Modification 3-4.

The Quasi-omni control element illustrated in FIG. 40 is the same as the Quasi-omni Control element illustrated in FIG. 22, and description of the Quasi-omni Control element is not repeated.

Upon receiving the association request frame 3001 illustrated in FIG. 39 in step S302 illustrated in FIG. 34, the STA 200 may calculate the propagation loss between the STA 100 and the STA 200 by using, for example, the above-described equation (1) in the same manner as in Modification 2-4.

If Expression (2) described above is satisfied by using the calculated value of the propagation loss, the STA 200 may determine that the frame reaches the STA 100 in the same manner as in Modification 2-4.

If Expression (2) is satisfied, the STA 200 determines that the association response frame 3002 reaches the STA 100. In step S305, the STA 200 transmits the association response frame 3002 by using the quasi-omni antenna pattern. In this case, the STA 200 determines whether to transmit the association response frame 3002 by using the quasi-omni antenna pattern without referencing the quasi-omni TX field. The Quasi-omni TX field can be removed from the association request frame 3001.

The other step S304 and steps S306 to S309 are the same as those in the third embodiment, and description of the steps is not repeated.

According to Modification 3-4, the effects of the third embodiment and the effects of Modification 2-4 can be obtained.

Modification 3-5

Like Modification 2-5 of the second embodiment, Modification 3-5 can be made to the third embodiment.

Figure 41:
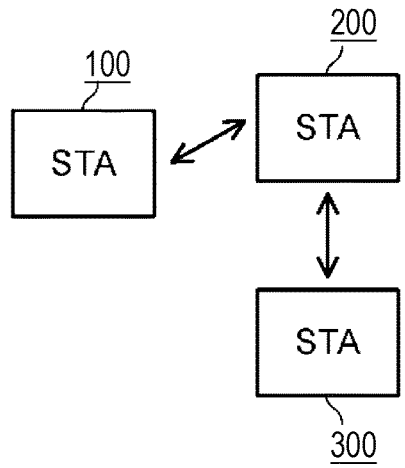
FIG. 41 is a diagram illustrating an example of the overall configuration according to Modification 3-5.

FIG. 41 is a diagram illustrating an example of an overall configuration according to Modification 3-5.

As illustrated in FIG. 41, the STA 100 and the STA 200 are located at a proximity distance from each other. In addition, another STA (the STA 300) is located at a proximity distance from the STA 200.

Figure 42:
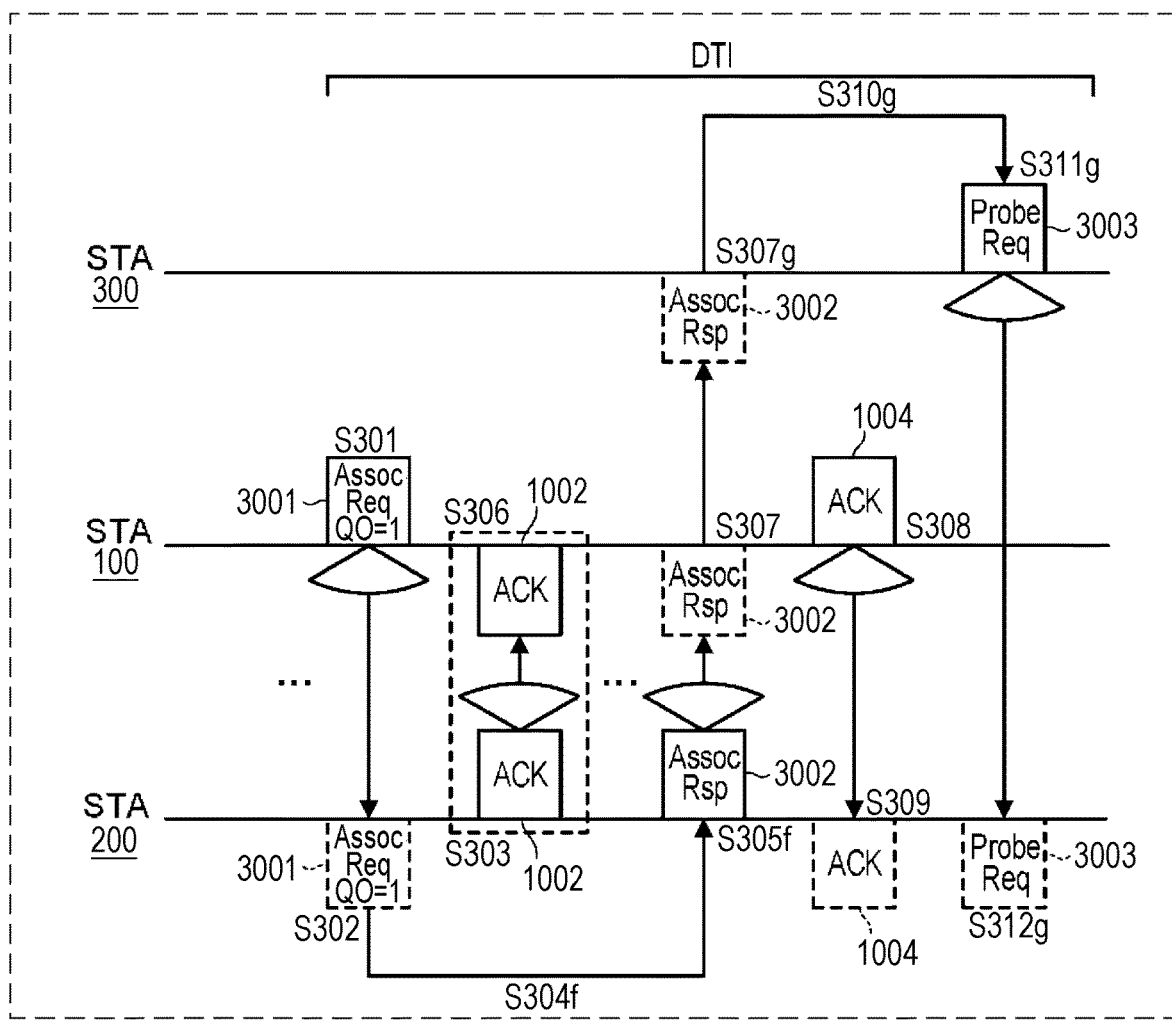
FIG. 42 is a diagram illustrating an example of the procedure by which an STA performs discovery of another STA according to Modification 3-5.

FIG. 42 is a diagram illustrating an example of the procedure by which the STA 100 makes initial connection with another STA 200 according to Modification 3-5.

Steps S301 to S303 illustrated in FIG. 42 are similar to steps S301 to S303 illustrated in FIG. 34, respectively, and description of the steps is not repeated.

In step S304f illustrated in FIG. 42, the STA 200 determines whether to transmit the association response frame 3002 by using a quasi-omni antenna. In one example, the STA 200 determines whether to transmit the association response frame 3002 by using a quasi-omni antenna on the basis of whether the association request frame 3001 received in step S302 includes a unicast address of another STA.

In another example, the STA 200 determines whether to transmit the association response frame 3002 by using a quasi-omni antenna on the basis of the value of the QO TX field of the association request frame 3001 received in step S302. In still another example, the STA 200 determines whether to transmit the association response frame 3002 by using a quasi-omni antenna on the basis of the Quasi-omni indicator of the association request frame 3001 received in step S302.

If, in step S304f, the STA 200 determines to transmit the association response frame 3002 by using the quasi-omni antenna, the STA 200 transmits the association response frame 3002 by using the quasi-omni antenna pattern in order to send the result of examination of the association request in step S305f.

At this time, the association response frame 3002 includes a Quasi-omni TX field. If beam-forming training with the STA 100 is not completed, the STA 200 sets the value of the Quasi-omni TX field to 1 and transmits the association response frame 3002. However, if the beam-forming training with the STA 100 is completed, the STA 200 sets the value of the Quasi-omni TX field to 0 and transmits the association response frame 3002, unlike in FIG. 42.

The STA 100 follows a procedure the same as that indicated by steps S306 to S309 illustrated in FIG. 34, and the STA 100 completes the association with the STA 200.

In addition, if the STA 200 transmits the association response frame 3002 by using the quasi-omni antenna in step S305f, another STA (the STA 300) located close to the STA 200 also receives the association response frame 3002 in step S307g. The association response frame 3002 includes the Quasi-omni TX field.

In step S310g, the STA 300 checks the value of the Quasi-omni TX field of the received Probe response frame 2053. If the value of the checked Quasi-omni TX field is 1, the STA 300 determines that the STA 200 is at a position close to the STA 300. Thus, the STA 300 determines that communication is possible without performing beam-forming training. In this case, the STA 300 may transmit, for example, the Probe request frame 3003 to the STA 200 by using the quasi-omni antenna pattern in step S311g. In step S312g, the STA 200 located at a distance close to the STA 300 receives the Probe request frame 3003.

Figure 43:
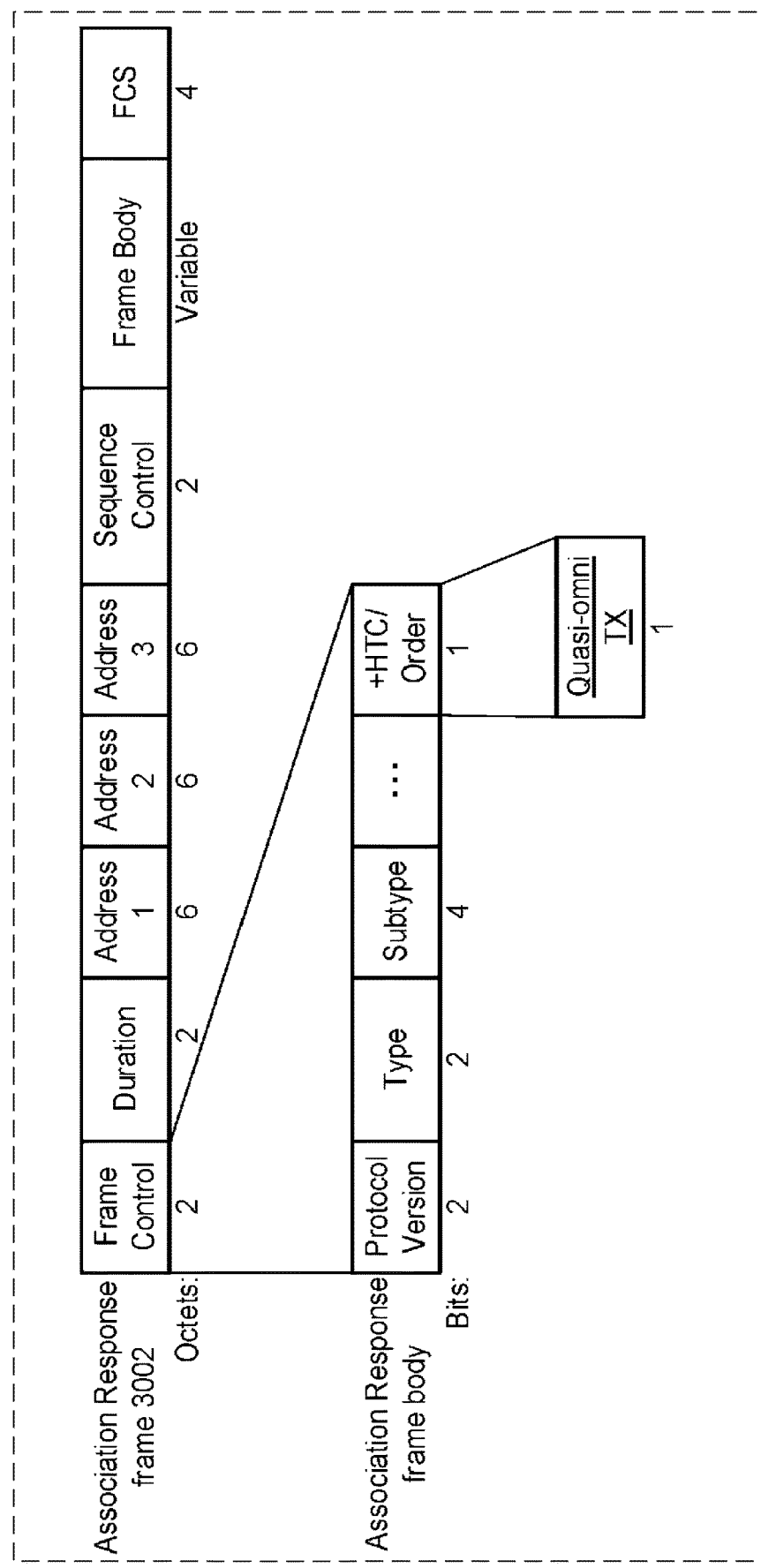
FIG. 43 is a diagram illustrating an example of the format of an association response frame including a field indicating a quasi-omni transmit pattern according to Modification 3-5.

FIG. 43 is a diagram illustrating an example of the format of an association response frame 3002 including a QO TX field indicating a quasi-omni transmit pattern according to Modification 3-5.

The fields of the format illustrated in FIG. 43 are the same as those of the format of the Probe response frame 2053a illustrated in FIG. 26. Accordingly, description of the fields is not repeated.

Figure 44:
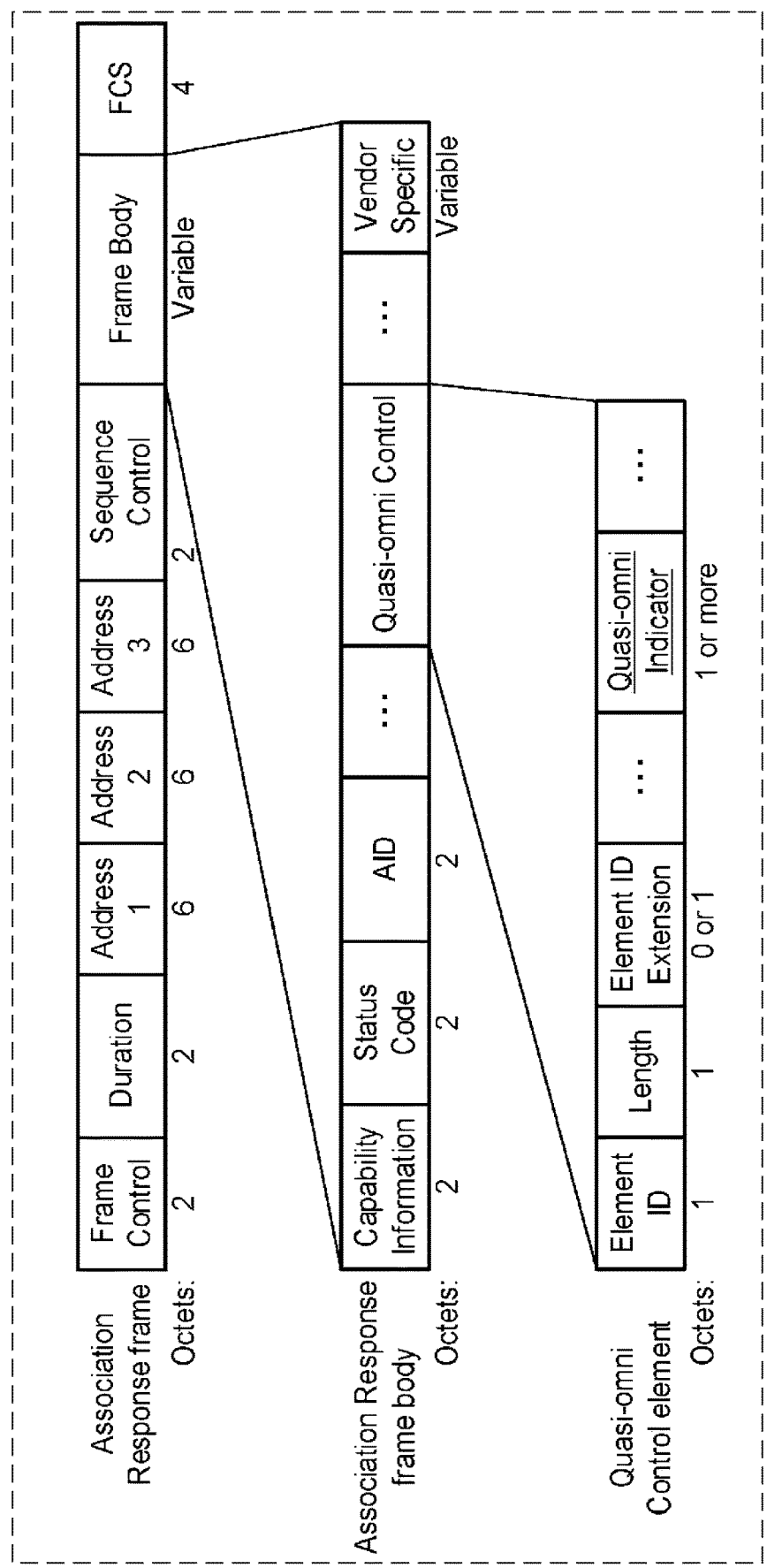
FIG. 44 is a diagram illustrating another example of the format of an association response frame including a field indicating a quasi-omni transmit pattern according to Modification 3-5.

FIG. 44 is a diagram illustrating another example of the format of an association response frame 3002 including the QO TX field indicating the quasi-omni transmit pattern according to Modification 3-5.

The fields of the format illustrated in FIG. 44 are the same as those of the format of the Probe response frame 2053b illustrated in FIG. 27. Accordingly, description of the fields is not repeated.

Figure 45:
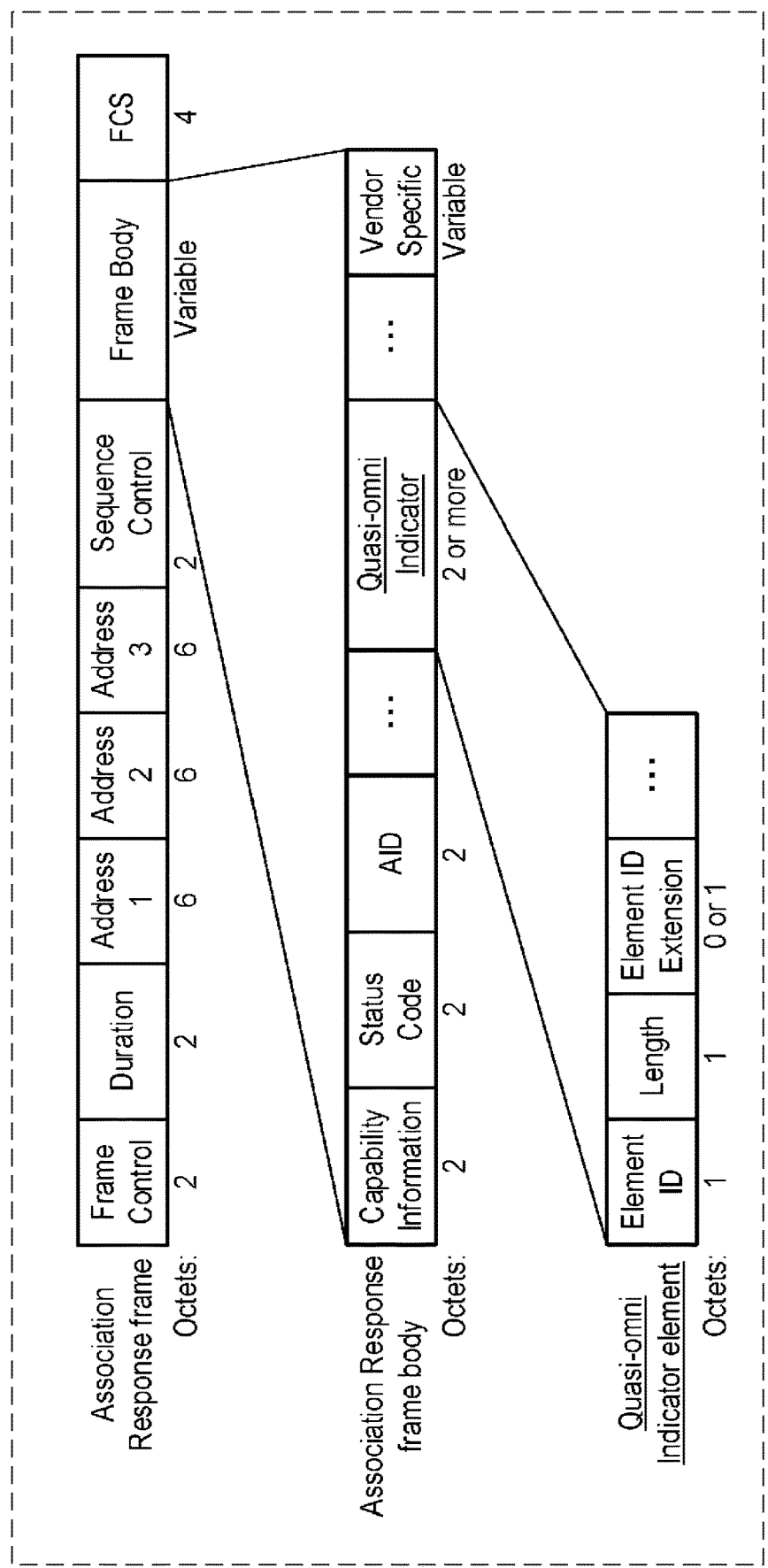
FIG. 45 is a diagram illustrating an example of the format of an association response frame indicating a quasi-omni transmit pattern according to Modification 3-5.

FIG. 45 is a diagram illustrating an example of the format of an association response frame 3002 indicating a quasi-omni transmit pattern according to Modification 3-5.

The fields of the format illustrated in FIG. 45 are the same as those of the format of the Probe response frame 2053c illustrated in FIG. 28. Accordingly, description of the fields is not repeated.

According to Modification 3-5, the effects of the third embodiment and the effects of Modification 2-5 can be obtained.

Fourth Embodiment

Figure 46:
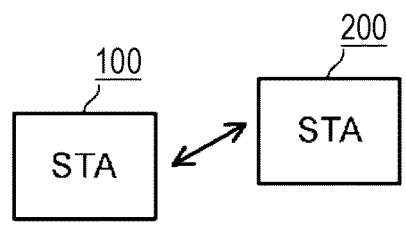
FIG. 46 is a diagram illustrating an example of the overall configuration according to a fourth embodiment.

FIG. 46 is a diagram illustrating an example of the overall configuration according to the fourth embodiment.

The STA 100 is, for example, a communication in proximity device (for example, a data kiosk). The STA 200 is, for example, a terminal to be connected to the STA 100.

Figure 47:
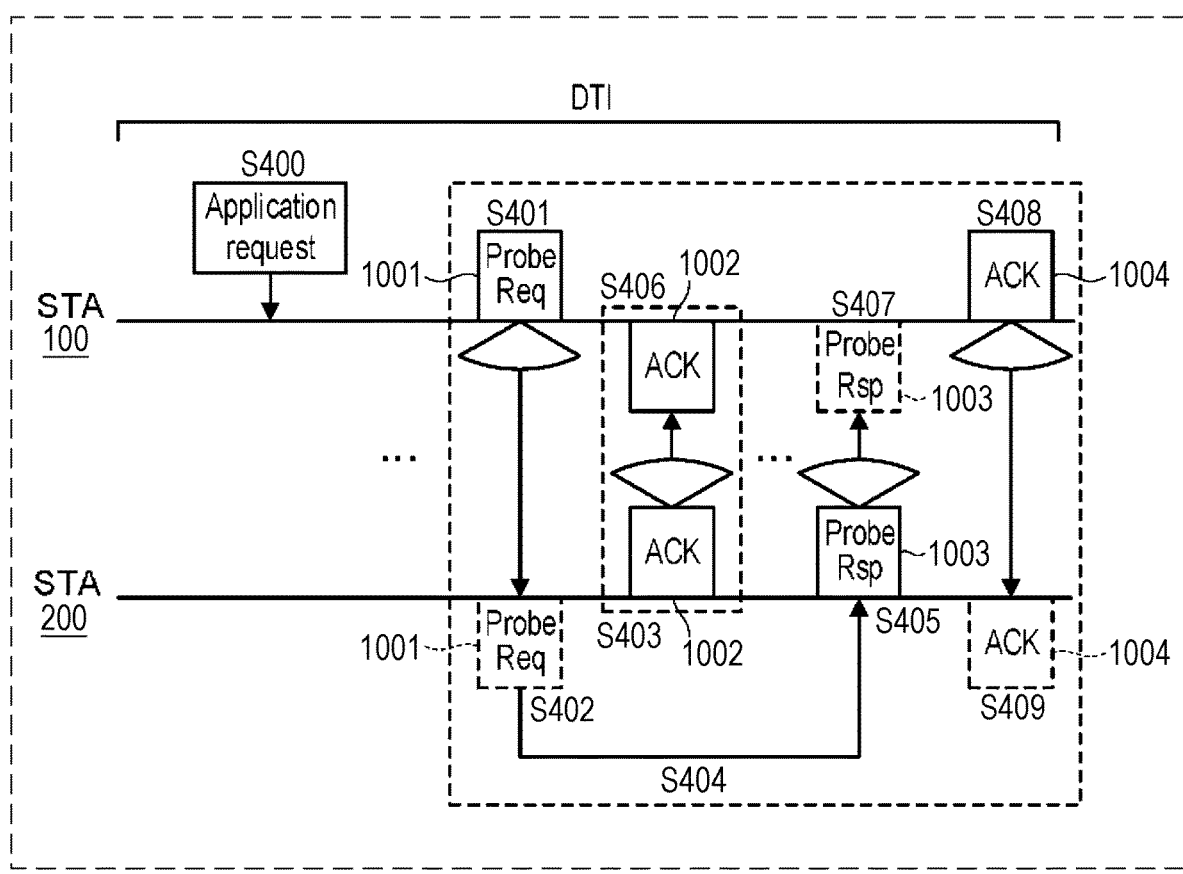
FIG. 47 is a diagram illustrating an example of the procedure by which an STA performs discovery of another STA according to the fourth embodiment.

FIG. 47 is a diagram illustrating an example of the procedure by which the STA 100 performs discovery of another STA 200 according to the fourth embodiment.

In step S400, the STA 100 receives, from an active application attempting to set up a short range or high-speed initial connection for discovery using a quasi-omni antenna pattern, an application request, for example, periodically or in response to a user's triggering action.

In response to reception of the application request, an application CPU of the STA 100 submits an application request to the sequencer circuit 106 to perform short-range and high-speed initial connection. For example, when executing a touch-and-go application (for example, data communication at an automatic ticket gate), the application CPU of the STA 100 periodically submits an application request to the sequencer circuit 106 so as to perform short-range and high-speed initial connection.

In step S401, the STA 100 transmits a Probe request frame 1001 or an association request frame (not illustrated).

In step S402, the STA 200 receives the Probe request frame 1001 or the association request frame (not illustrated).

In step S403, the STA 200 transmits an ACK frame 1002.

In step S404, the STA 200 transmits a Probe response frame 1003 or an association response frame (not illustrated) on the basis of the frame received in step S402 by using one of the following three transmission options: (1) transmission using a quasi-omni antenna pattern; (2) transmission using the best sector; and (3) no transmission. Note that if selection of one of the transmission options is not made, the need for step S404 can be eliminated.

In step S405, the Probe response frame 1003 or the association response frame (not illustrated) is transmitted by using the transmission option selected in step S404.

In step S406, the STA 100 determines whether an ACK frame 1002 has been received from the STA 200. In step S407, the STA 100 determines whether a Probe response frame 1003 or an association response frame (not illustrated) has been received from the STA 200.

If, in step S406, the STA 100 determines that the ACK frame 1002 has been received and if, in step S407, the STA 100 determines that the Probe response frame 1003 or the association response frame (not illustrated) has been received, the STA 100 determines that the STA 200 is present at a distance that enables communication using a quasi-omni antenna pattern (at a proximity distance). Thus, in step S408, the STA 100 transmits an ACK frame 1004 to the STA 200. Subsequently, in step S409, the STA 200 receives the ACK frame 1004. As a result, the STA 100 completes the discovery of the STA 200 or completes the association with the STA 200.

However, if, in step S406, the STA 100 determines that the Probe response frame 1003 or the association response frame has not been received from the STA 200, the STA 100 determines that a connection destination STA (the STA 200 or another STA (not illustrated)) is not present at a proximity distance.

In one example, the procedure indicated by steps S401 to S409 is a procedure for discovering the STA 200 in accordance with the procedure illustrated in FIG. 5, 9A, 11, 16, or 25, for example. In another example, the procedure indicated by steps S401 to S409 is a procedure for association with the STA 200 in accordance with the procedure illustrated in FIG. 34 or 42, for example.

Figure 48:
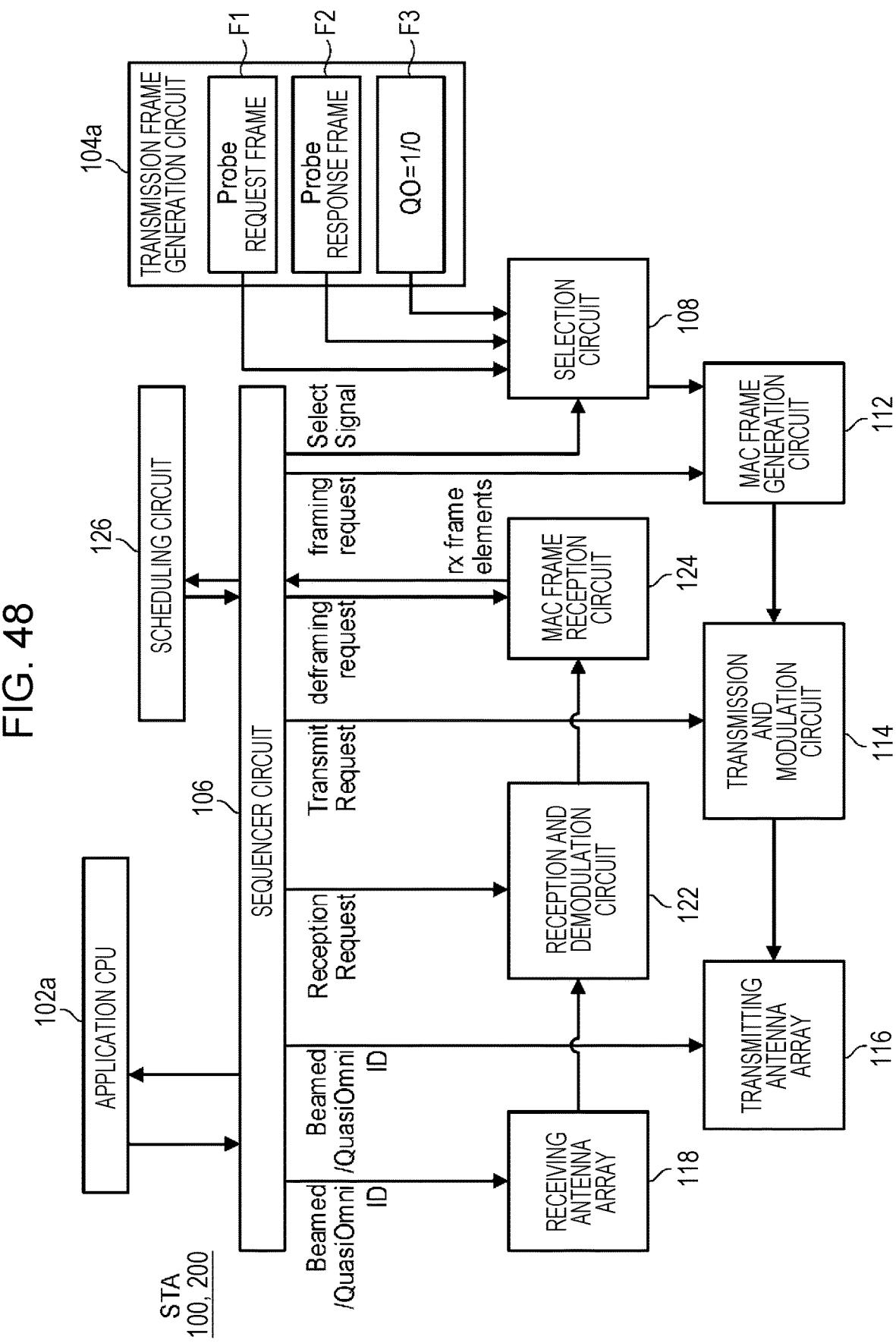
FIG. 48 is a diagram illustrating an example of the configuration of STAs according to the fourth embodiment.

FIG. 48 is a diagram illustrating an example of the configuration of the STAs 100 and 200 according to the fourth embodiment.

The application CPU 102a executes application software, such as data transfer software, a web browser, settlement software, ticket gate software, for example. The application CPU 102a may execute application software that uses tap-and-go. As used herein, the term "tap-and-go" refers to an operation to bring a device (for example, the STA 200) into contact with or close to a terminal (for example, the STA 100) to communicate with each other temporarily (for example, for a period from less than 1 second to several seconds). Examples of application software that uses tap-and-go include software for an automatic railway ticket gate and an upload/download kiosk terminal.

The application CPU 102a sends a communication in proximity request and a high-speed initial connection request to the sequencer circuit 106. In response to the requests from the application CPU 102a, the sequencer circuit 106 determines whether to transmit a Probe request frame by using a quasi-omni antenna pattern.

If for example, the application CPU 102a executes an application that uses tap-and-go, the application CPU 102a may perform an active scan on the sequencer circuit 106 to perform communication in proximity and high-speed initial connection, as illustrated in FIG. 5. In addition, for example, when executing a Web browser, the application CPU 102a may request an active scan to perform communication for beam forming, as illustrated in FIG. 2.

The other constituent elements illustrated in FIG. 48 are the same as those described above with reference to FIG. 20. Accordingly, description of the constituent elements is not repeated.

According to the fourth embodiment, the STA 100 determines whether to transmit the Probe request frame 1001 by using the quasi-omni antenna pattern in accordance with the requirements of a particular application, such as short range communication or high-speed communication. Therefore, the STA 100 can connect to an appropriate access point in accordance with the application, and a high-speed active scan and initial connection can be performed.

Fifth Embodiment

Figure 49:
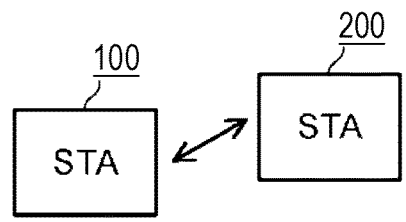
FIG. 49 is a diagram illustrating an example of the overall configuration according to a fifth embodiment.

FIG. 49 is a diagram illustrating an example of the overall configuration according to the fifth embodiment.

The STA 100 is, for example, a device for communication in proximity (for example, a kiosk). The STA 200 is, for example, a terminal to be connected to the STA 100.

Figure 50:
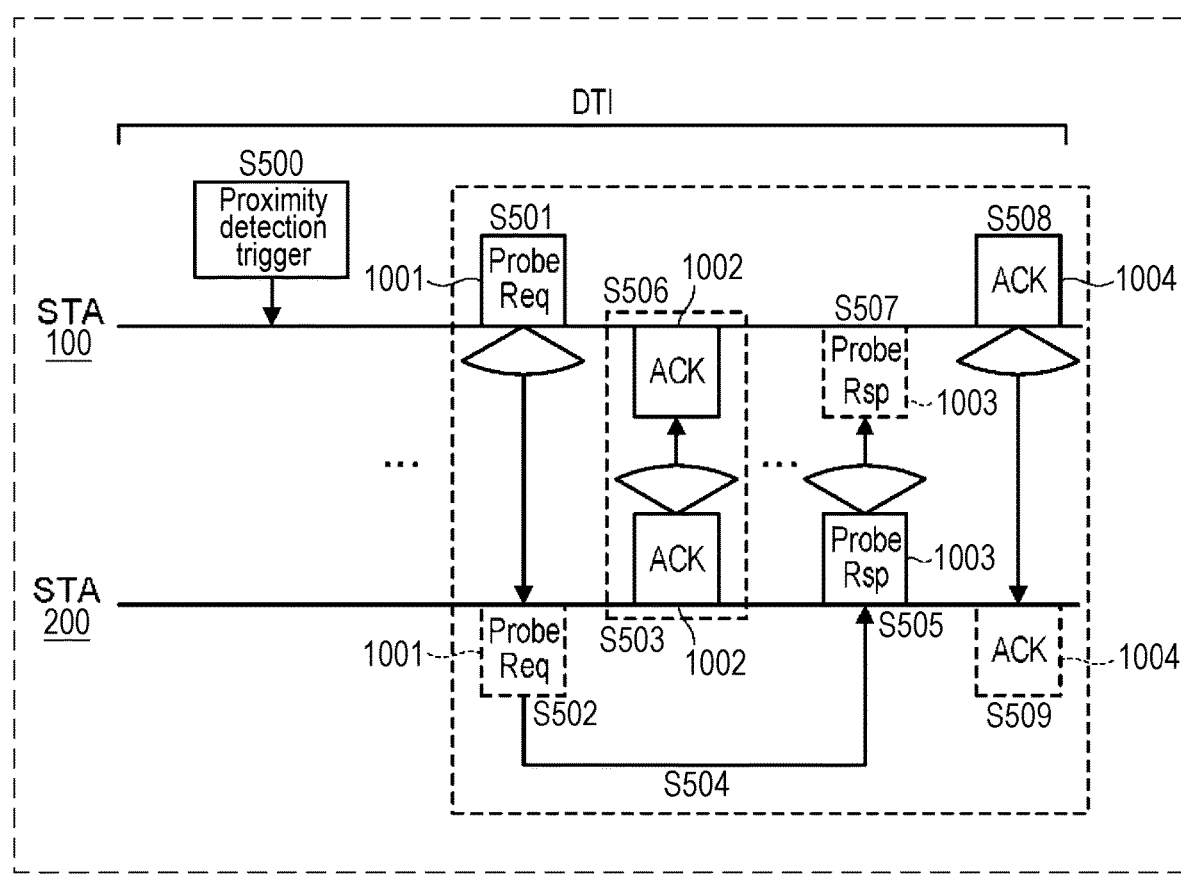
FIG. 50 is a diagram illustrating an example of the procedure by which an STA performs discovery of another STA according to the fifth embodiment.

FIG. 50 is a diagram illustrating an example of the procedure by which the STA 100 performs discovery of another STA 200 according to the fifth embodiment.

In step S500, the STA 100 detects an object that is close thereto. In step S500, in response to detection of a nearby object, the STA 100 and the STA 200 perform steps S502 to S509. Steps S502 to S509 are similar to steps S402 to S409 described above with reference to FIG. 47, respectively, and description of the steps is not repeated.

FIG. 51 is a diagram illustrating an example of the configuration of the STA 100 according to the fifth embodiment.

A proximity detection circuit 128 detects an object that is close to the STA 100 in order to detect a situation which enables quasi omni-directional communication with a connection destination STA. The proximity detection circuit 128 may be a proximity sensor, such as a capacitive proximity sensor or a magnetic proximity sensor, a sensor that detects reflection of a transmission signal, such as an infrared sensor or an ultrasonic sensor, a wireless sensor using a wireless technology that differs from the 11ad standard, or a contact sensor. Examples of a wireless technology that differs from the 11ad standard include NFC, RFID, Bluetooth (registered trademark), and Wi-Fi.

If the proximity detection circuit 128 detects an object close to the STA 100, the sequencer circuit 106 starts steps S501 to S509 illustrated in FIG. 50.

The other constituent elements illustrated in FIG. 51 are the same as those described above with reference to FIG. 20, and description of the constituent elements is not repeated.

According to the fifth embodiment, the STA 100 can start an active scan and initial connection in accordance with approach of a connection destination STA, which is a device or a terminal for communication in proximity. Consequently, the time required for an active scan and initial connection can be reduced. In addition, since transmission of a signal (for example, the Probe request frame 1001) is performed by using the quasi-omni antenna pattern, the EIRP can be reduced. Consequently, even when the human body approaches the STA 100, the intensity of an electric field radiated to the human body is decreased. Thus, the influence of radiation on the human body can be reduced.

Note that according to the fifth embodiment, the proximity detection circuit 128 may determine whether a connection destination STA is in proximity on the basis of, for example, a position detection technology, such as GPS or timing measurement.

In addition, according to the fifth embodiment, the proximity detection circuit 128 may be a circuit that detects approach of a device or a terminal for communication in proximity on the basis of, for example, reception of a data frame including a Quasi-omni indicator frame of the DMG Beacon frame 5001. For example, upon receiving the data frame, the proximity detection circuit 128 may determine that the connection destination STA is in proximity.

Furthermore, according to the fifth embodiment, the STA 100 may determine whether the connection destination STA is in proximity on the basis of the measured value of the received signal strength (for example, the received signal strength of the DMG Beacon frame 5001).

The embodiments have been described above.

It should be noted that the functional blocks used in the description of the above embodiments are typically implemented as LSIs, which are integrated circuits. The functional blocks may be formed as individual chips, or some or all of the functional blocks may be integrated into a single chip. The term "LSI" is used herein, but the term "IC", "system LSI", "super LSI" or "ultra LSI" may be used as well depending on the level of integration.

In addition, the circuit integration is not limited to LSI and may be achieved by using dedicated circuitry or a general-purpose processor other than an LSI. A field programmable gate array (FPGA), which is programmable after fabrication of the LSI, or a reconfigurable processor which allows reconfiguration of connections and settings of circuit cells in LSI may be used.

Moreover, should a circuit integration technology replacing LSI appear as a result of advancements in semiconductor technology or other technologies derived from the technology, the functional blocks could be integrated using such a technology. Another possibility is the application of biotechnology, for example.

According to the present disclosure, a method for use of a wireless terminal device includes transmitting a Probe request frame by using a quasi-omni antenna pattern in a first channel if beam-forming training with a wireless base station device is not completed, selecting the wireless base station device as a connection destination if a Probe response frame corresponding to the Probe request frame is received from the wireless base station device, and performing the beam-forming training with the wireless base station device in a second channel if a time period for receiving the Probe response frame from the wireless base station device has passed.

According to the method for use of a wireless terminal device of the present disclosure, when transmitting the Probe request frame by using the quasi-omni antenna pattern, a value indicating that the Probe request frame is transmitted by using the quasi-omni antenna pattern is set in the Probe request frame. If the beam-forming training is completed, the Probe request frame including a value indicating that the Probe request frame is not transmitted by using the quasi-omni antenna pattern is transmitted by using the best sector of a transmitting antenna array determined through the beam-forming training.

According to the present disclosure, a method for use of a wireless base station device includes receiving a Probe request frame transmitted from a wireless terminal device using a quasi-omni antenna pattern in a first channel if the beam-forming training with the wireless terminal device is not completed, transmitting the Probe response frame to the wireless terminal device on the basis of the Probe request frame, and performing the beam-forming training with the wireless terminal device without transmitting the Probe response frame if a time period for receiving the Probe response frame has passed.

According to the method for use of a wireless base station device of the present disclosure, a reception quality of the Probe request frame is measured. If a value indicating the reception quality exceeds a predetermined threshold value, the Probe response frame corresponding to the Probe request frame is transmitted by using a quasi-omni antenna pattern.

According to the method for use of a wireless base station device of the present disclosure, if the Probe request frame includes a value indicating that the Probe request frame is transmitted by using the quasi-omni antenna pattern, a Probe response frame corresponding to the Probe request frame is transmitted by using the quasi-omni antenna pattern.

According to the present disclosure, a wireless terminal device includes a receiving antenna array, a sequencer circuit, and a transmitting antenna array. If beam-forming training with a wireless base station device is not completed in a first channel, the sequencer circuit sets up an antenna pattern of the transmitting antenna array to a quasi-omni antenna pattern, and the transmitting antenna array transmits a Probe request frame to the wireless base station device. If the receiving antenna array receives a Probe response frame corresponding to the Probe request frame from the wireless base station device, the sequencer circuit selects the wireless base station device as a connection destination. If a time period for receiving the Probe response frame from the wireless base station device has passed, the sequencer circuit performs the beam-forming training with the wireless base station device in a second channel.

According to the present disclosure, a wireless base station device includes a receiving antenna array, a sequencer circuit, and a transmitting antenna array. If the beam-forming training with a wireless terminal device is not completed in a first channel, the receiving antenna array receives a Probe request frame transmitted from the wireless terminal device using a quasi-omni antenna pattern. The transmitting antenna array transmits a Probe response frame on the basis of the Probe request frame. If a time period for receiving the Probe response frame has passed, the sequencer circuit performs the beam-forming training with the wireless terminal device in a second channel.

An aspect of the present disclosure is suitable for a communication system that conforms to the Wi-Fi standard, for example, IEEE 802.11ad or IEEE 802.11 ay standard.

What is claimed is:

1. A communication method for a wireless terminal apparatus, the communication method comprising:
    transmitting a Probe request frame using a quasi-omni antenna pattern, wherein the Probe request frame is a discovery frame transmitted to discover a communication partner apparatus and includes a Receiver Address (RA) field that is set to a broadcast address; and
    monitoring for a Probe response frame for a defined time period, the Probe response frame being transmitted from a wireless base station apparatus which receives the Probe request frame before performing beam-forming training with the wireless terminal apparatus, wherein:
        in a first case in which the Probe response frame is received within the defined time period, transmitting an ACK frame to the wireless base station apparatus and skipping the beam-forming training with the wireless base station apparatus; and in a second case in which the Probe response frame is not received within the defined time period, performing the beam-forming training with the wireless base station apparatus.

2. The communication method according to claim 1, wherein
the Probe request frame includes a field that is set to a first value indicating that the Probe request frame is transmitted using the quasi-omni antenna pattern.

3. The communication method according to claim 2, comprising:
in the first case in which the Probe response frame is received within the defined time period, determining that the wireless base station apparatus is located in proximity that allows for quasi-omni communication therewith; and
in the second case in which the Probe response frame is not received within the defined time period, determining that the wireless base station apparatus is not located in proximity that allows for quasi-omni communication therewith.

4. The communication method according to claim 3, wherein
the Probe request frame is transmitted on a first channel and the beam-forming training is performed in a second channel.

5. The communication method according to claim 2, wherein
the Probe response frame is transmitted from the wireless base station apparatus using a quasi-omni antenna pattern.

6. The communication method according to claim 2, comprising:
transmitting another Probe request frame using a directional antenna pattern to another wireless base station apparatus with which the beam-forming training has been performed.

7. The communication method according to claim 6, wherein
the another Probe request frame includes a field that is set to a second value indicating that the another Probe request frame is not transmitted using the quasi-omni antenna pattern.

8. A wireless terminal apparatus, comprising:
a transmitter, which, in operation, transmits a Probe request frame using a quasi-omni antenna pattern, wherein the Probe request frame is a discovery frame transmitted to discover a communication partner apparatus and includes a Receiver Address (RA) field that is set to a broadcast address;
a receiver, which, in operation, monitors for a Probe response frame for a defined time period, the Probe response frame being transmitted from a wireless base station apparatus which receives the Probe request frame before performing beam-forming training with the wireless terminal apparatus; and
control circuitry, which:
in a first case in which the Probe response frame is received within the defined time period, instructs the transmitter to transmit an ACK frame to the wireless base station apparatus and skips the beam-forming training with the wireless base station apparatus; and
in a second case in which the Probe response frame is not received within the defined time period, performs the beam-forming training with the wireless base station apparatus.

9. The wireless terminal apparatus according to claim 8, wherein
the Probe request frame includes a field that is set to a first value indicating that the Probe request frame is transmitted using the quasi-omni antenna pattern.

10. The wireless terminal apparatus according to claim 8, wherein
in the first case in which the Probe response frame is received within the defined time period, the control circuitry determines that the wireless base station apparatus is located in proximity that allows for quasi-omni communication therewith; and
in the second case in which the Probe response frame is not received within the defined time period, the control circuitry determines that the wireless base station apparatus is not located in proximity that allows for quasi-omni communication therewith.

11. The wireless terminal apparatus according to claim 10, wherein
the transmitter, in operation, transmits the Probe request frame on a first channel and the beam-forming training is performed in a second channel.

12. The wireless terminal apparatus according to claim 8, wherein
the Probe response frame is transmitted from the wireless base station apparatus using a quasi-omni antenna pattern.

13. The wireless terminal apparatus according to claim 8, wherein
the transmitter, in operation, transmits another Probe request frame using a directional antenna pattern to another wireless base station apparatus with which beam-forming training has been performed.

14. The wireless terminal apparatus according to claim 13, wherein
the another Probe request frame includes a field that is set to a second value indicating that the another Probe request frame is not transmitted using the quasi-omni antenna pattern.

* * * * *